(12) United States Patent
Satomi et al.

(10) Patent No.: US 7,068,190 B2
(45) Date of Patent: Jun. 27, 2006

(54) INFORMATION PROVIDING APPARATUS FOR PERFORMING DATA PROCESSING IN ACCORDANCE WITH ORDER FROM USER

(75) Inventors: Hiroshi Satomi, Kanagawa (JP); Satoshi Igeta, Kanagawa (JP); Atsushi Inoue, Tokyo (JP); Satoshi Watanabe, Tokyo (JP); Kenichiro Matsuura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 561 days.

(21) Appl. No.: 10/254,570

(22) Filed: Sep. 26, 2002

(65) Prior Publication Data

US 2003/0063304 A1    Apr. 3, 2003

(30) Foreign Application Priority Data

Sep. 28, 2001    (JP) .............................. 2001-303005

(51) Int. Cl.
    *H03M 11/00*    (2006.01)
(52) U.S. Cl. .............................. 341/22; 341/21; 341/26
(58) Field of Classification Search ............ 341/21–26; 455/410; 379/93.03
    See application file for complete search history.

(56) References Cited

U.S. PATENT DOCUMENTS

| | | | | |
|---|---|---|---|---|
| 5,325,424 A | * | 6/1994 | Grube | ...................... 379/93.03 |
| 5,818,437 A | * | 10/1998 | Grover et al. | ............... 715/811 |
| 6,112,087 A | * | 8/2000 | Tayloe | ...................... 455/435.2 |
| 6,141,563 A | * | 10/2000 | Miller et al. | ................. 455/558 |
| 6,157,825 A | * | 12/2000 | Frederick | ..................... 455/410 |
| 6,185,415 B1 | * | 2/2001 | Boatwright | ................. 455/410 |
| 6,253,074 B1 | * | 6/2001 | Carlsson et al. | .......... 455/414.2 |
| 6,732,278 B1 | * | 5/2004 | Baird et al. | ................. 713/201 |
| 2003/0065585 A1 | | 4/2003 | Satomi et al. | ................. 705/26 |
| 2003/0065647 A1 | | 4/2003 | Satomi et al. | ................. 707/1 |
| 2003/0065798 A1 | | 4/2003 | Igeta et al. | ................. 709/229 |
| 2003/0065807 A1 | | 4/2003 | Satomi et al. | .............. 709/231 |
| 2003/0065951 A1 | | 4/2003 | Igeta et al. | ..................... 726/4 |

FOREIGN PATENT DOCUMENTS

| JP | 2001-175394 | 6/2001 |
|---|---|---|
| JP | 2001-204970 | 7/2001 |

* cited by examiner

*Primary Examiner*—Michael Horabik
*Assistant Examiner*—Kimberly Jenkins
(74) *Attorney, Agent, or Firm*—Fitzpatrick, Cella, Harper & Scinto

(57) ABSTRACT

This invention is a photosite which allows access from a cell phone to provide user-friendlier services. The photosite creates an ID (S6501) and creates a character string Str from the ID by combining numerals and alphabetical characters by using a storage unit which stores buttons 0 to 9 of the cell phone and the number of alphabetical characters assigned to the respective buttons in correspondence with each other (S6502–S6507). In this case, a character string is created such that any two consecutive characters are assigned to different keys.

3 Claims, 72 Drawing Sheets

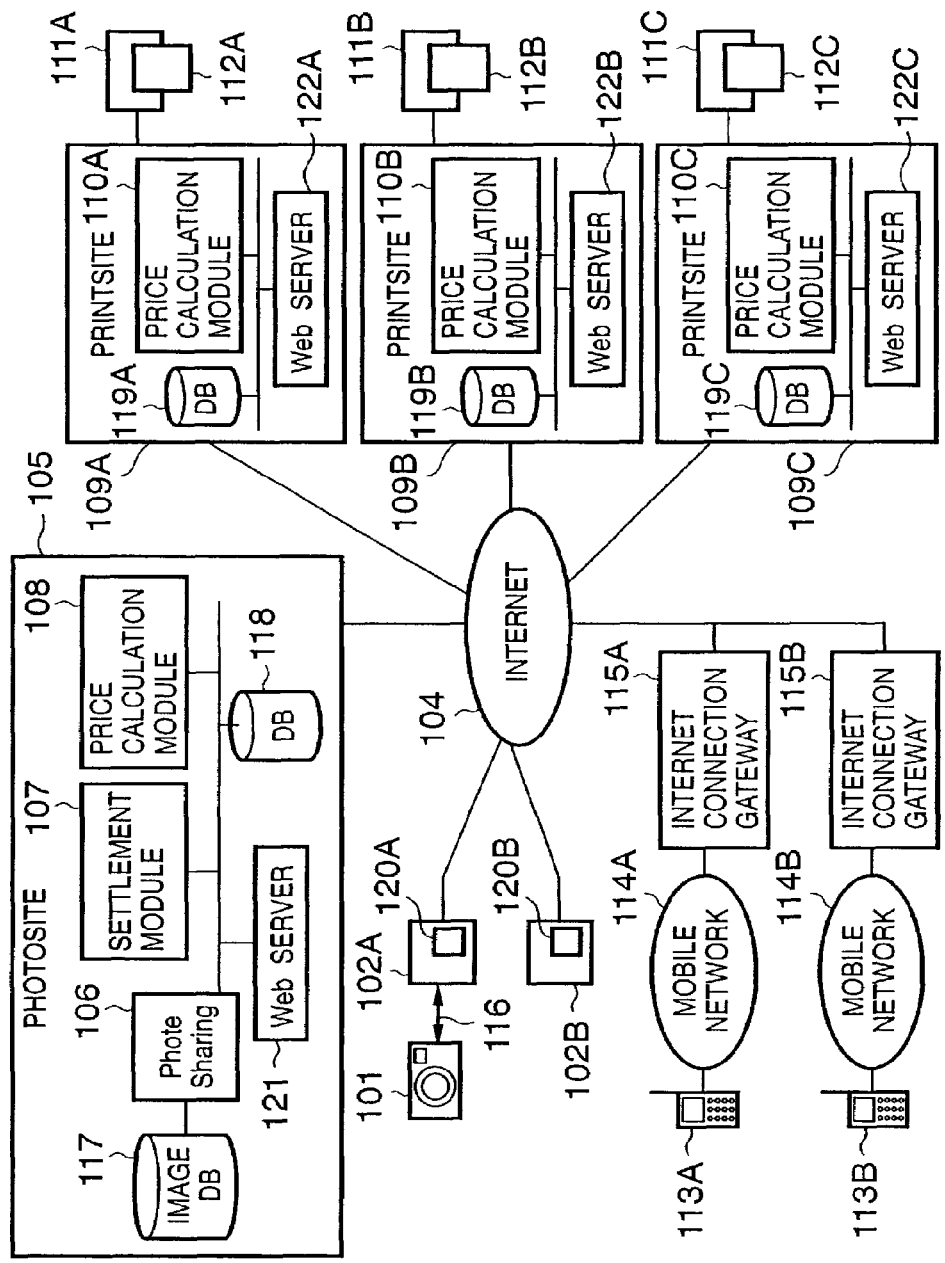

FIG. 3

CUSTOMER INFORMATION DATA TABLE 400

| ITEM | TYPE | |
|---|---|---|
| USER ID | INTEGER TYPE | 401 |
| DESTINATION E-MAIL ADDRESS | CHARACTER TYPE 64 BYTES | 402 |
| Login Name | CHARACTER TYPE 64 BYTES | 403 |
| Password | CHARACTER TYPE 64 BYTES | 404 |
| NAME (LAST NAME) | CHARACTER TYPE 64 BYTES | 405 |
| NAME (FIRST NAME) | CHARACTER TYPE 64 BYTES | 406 |
| PHONETIC TRANSCRIPTIONS IN KANA (LAST NAME) | CHARACTER TYPE 64 BYTES | 407 |
| PHONETIC TRANSCRIPTIONS IN KANA (FIRST NAME) | CHARACTER TYPE 64 BYTES | 408 |
| ZIP CODE 1 | CHARACTER TYPE 8 BYTES | 409 |
| ZIP CODE 2 | CHARACTER TYPE 8 BYTES | 410 |
| MUNICIPAL DIVISION CODE | INTEGER TYPE | 411 |
| ADDRESS 1 | CHARACTER TYPE 256 BYTES | 412 |
| ADDRESS 2 | CHARACTER TYPE 256 BYTES | 413 |
| TELEPHONE NUMBER 1 | CHARACTER TYPE 8 BYTES | 414 |
| TELEPHONE NUMBER 2 | CHARACTER TYPE 8 BYTES | 415 |
| TELEPHONE NUMBER 3 | CHARACTER TYPE 8 BYTES | 416 |
| USER REGISTRATION STATE | INTEGER TYPE | 417 |

FIG. 4

CUSTOMER STATE DATA TABLE                    500

| ITEM | TYPE |
|---|---|
| USER ID | INTEGER TYPE | ~501
| LAST DISPLAY ALBUM ID | INTEGER TYPE | ~502
| MAXIMUM DISK CAPACITY | INTEGER TYPE | ~503
| CUMULATIVE POINT | INTEGER TYPE | ~504

FIG. 5

CUSTOMER ALBUM DATA TABLE     600

| ITEM | TYPE | |
|---|---|---|
| USER ID | INTEGER TYPE | 601 |
| ALBUM ID | INTEGER TYPE | 602 |
| ALBUM DISPLAY ORDINAL NUMBER | INTEGER TYPE | 603 |

FIG. 6

ALBUM INFORMATION DATA TABLE 700

| ITEM | TYPE | |
|---|---|---|
| ALBUM ID | INTEGER TYPE | 701 |
| ALBUM NAME | CHARACTER TYPE 64 BYTES | 702 |
| COMMENT (FILE PATH) | CHARACTER TYPE 256 BYTES | 703 |
| DISCLOSURE PERMISSION/INHIBITION | INTEGER TYPE | 704 |
| PASSWORD PERMISSION/INHIBITION | INTEGER TYPE | 705 |
| ALBUM PASSWORD | CHARACTER TYPE 64 BYTES | 706 |
| PRINT PERMISSION/INHIBITION | INTEGER TYPE | 707 |
| ORIGINAL IMAGE DISPLAY PERMISSION/INHIBITION | INTEGER TYPE | 708 |
| DISPLAY FORM NUMBER | INTEGER TYPE | 709 |

FIG. 7

ALBUM IMAGE DATA TABLE                          800

| ITEM | TYPE | |
|---|---|---|
| ALBUM ID | INTEGER TYPE | ~801 |
| IMAGE ID | INTEGER TYPE | ~802 |
| IMAGE DISPLAY NUMBER | INTEGER TYPE | ~803 |

FIG. 8

IMAGE INFORMATION DATA TABLE 900

| ITEM | TYPE | |
|---|---|---|
| IMAGE ID | INTEGER TYPE | 901 |
| USER ID | INTEGER TYPE | 902 |
| IMAGE NAME | CHARACTER TYPE 64 BYTES | 903 |
| ORIGINAL IMAGE FILE PATH | CHARACTER TYPE 256 BYTES | 904 |
| THUMBNAIL IMAGE FILE PATH | CHARACTER TYPE 256 BYTES | 905 |
| DISPLAY IMAGE FILE PATH | CHARACTER TYPE 256 BYTES | 906 |
| COMMENT (FILE PATH) | CHARACTER TYPE 256 BYTES | 907 |
| IMAGE BROWSE COUNT | INTEGER TYPE | 908 |
| IMAGE PRINT COUNT | INTEGER TYPE | 909 |

FIG. 9

ORDER INFORMATION DATA TABLE                              1000

| ITEM | TYPE | |
|---|---|---|
| ORDER NUMBER | INTEGER TYPE | ~1001 |
| ORDERER ID | INTEGER TYPE | ~1002 |
| RECEIVER NAME | CHARACTER TYPE 64 BYTES | ~1003 |
| DESTINATION ZIP CODE 1 | CHARACTER TYPE 8 BYTES | ~1004 |
| DESTINATION ZIP CODE 2 | CHARACTER TYPE 8 BYTES | ~1005 |
| DESTINATION MUNICIPAL CODE | INTEGER TYPE | ~1006 |
| DESTINATION ADDRESSES 1 | CHARACTER TYPE 256 BYTES | ~1007 |
| DESTINATION ADDRESSES 2 | CHARACTER TYPE 256 BYTES | ~1008 |
| DESTINATION TELEPHONE NUMBER 1 | CHARACTER TYPE 8 BYTES | ~1009 |
| DESTINATION TELEPHONE NUMBER 2 | CHARACTER TYPE 8 BYTES | ~1010 |
| DESTINATION TELEPHONE NUMBER 3 | CHARACTER TYPE 8 BYTES | ~1011 |
| PRINTSITE ID | INTEGER TYPE | ~1012 |
| ORDER DATE | INTEGER TYPE | ~1013 |
| STATUS | INTEGER TYPE | ~1014 |

FIG. 10

ORDERED IMAGE DATA TABLE 1100

| ITEM | TYPE | |
|---|---|---|
| ORDER NUMBER | INTEGER TYPE | ~1101 |
| PRINTSITE RECEIPT NUMBER | INTEGER TYPE | ~1102 |
| IMAGE NUMBER | INTEGER TYPE | ~1103 |
| FILE PATH TO COPY THUMBNAIL IMAGE | CHARACTER TYPE 256 BYTES | ~1104 |
| FILE PATH TO COPY ORIGINAL IMAGE | CHARACTER TYPE 256 BYTES | ~1105 |
| FILE PATH TO COPY DISPLAY IMAGE | CHARACTER TYPE 256 BYTES | ~1106 |
| PRINT COUNT | INTEGER TYPE | ~1107 |
| PRINT SIZE | INTEGER TYPE | ~1108 |
| PRINT TYPE | INTEGER TYPE | ~1109 |
| IMAGE ID | INTEGER TYPE | ~1110 |

FIG. 11

ORDER SETTLEMENT DATA TABLE 1200

| ITEM | TYPE | |
|---|---|---|
| ORDER NUMBER | INTEGER TYPE | 1201 |
| SETTLEMENT METHOD | INTEGER TYPE | 1202 |
| TOTAL PRICE | INTEGER TYPE | 1203 |
| PRINT PRICE | INTEGER TYPE | 1204 |
| PRINT PRICE BENEFIT | INTEGER TYPE | 1205 |
| PRINT TAX CHARGE | INTEGER TYPE | 1206 |
| DELIVERY CHARGE | INTEGER TYPE | 1207 |
| DELIVERY TAX CHARGE | INTEGER TYPE | 1208 |
| PRINTSITE BENEFIT | INTEGER TYPE | 1209 |
| STATUS | INTEGER TYPE | 1210 |

FIG. 12

ORDERER DATA TABLE      1300

| ITEM | TYPE | |
|---|---|---|
| ORDERER ID | INTEGER TYPE | 1301 |
| USER ID | INTEGER TYPE | 1302 |
| DESTINATION E-MAIL ADDRESS | CHARACTER TYPE 64 BYTES | 1303 |
| NAME (LAST NAME) | CHARACTER TYPE 64 BYTES | 1304 |
| NAME (FIRST NAME) | CHARACTER TYPE 64 BYTES | 1305 |
| PHONETIC TRANSCRIPTIONS IN KANA(LAST NAME) | CHARACTER TYPE 64 BYTES | 1306 |
| PHONETIC TRANSCRIPTIONS IN KANA(FIRST NAME) | CHARACTER TYPE 64 BYTES | 1307 |
| ZIP CODE 1 | CHARACTER TYPE 8 BYTES | 1308 |
| ZIP CODE 2 | CHARACTER TYPE 8 BYTES | 1309 |
| MUNICIPAL DIVISION CODE | INTEGER TYPE | 1310 |
| ADDRESS 1 | CHARACTER TYPE 256 BYTES | 1311 |
| ADDRESS 2 | CHARACTER TYPE 256 BYTES | 1312 |
| TELEPHONE NUMBER 1 | CHARACTER TYPE 8 BYTES | 1313 |
| TELEPHONE NUMBER 2 | CHARACTER TYPE 8 BYTES | 1314 |
| TELEPHONE NUMBER 3 | CHARACTER TYPE 8 BYTES | 1315 |

FIG. 13

PRINTSITE DATA TABLE

1400

| ITEM | TYPE | |
|---|---|---|
| PRINTSIT ID | INTEGER TYPE | ~1401 |
| PROVIDER NAME | CHARACTER TYPE 64 BYTES | ~1402 |
| URL TO CGI FOR TEMPORARY ORDER NOTIFICATION | CHARACTER TYPE 256 BYTES | ~1403 |
| URL TO CGI FOR FORMAL ORDER NOTIFICATION | CHARACTER TYPE 256 BYTES | ~1404 |
| URL TO CGI FOR ORDER CANCELLATION | CHARACTER TYPE 256 BYTES | ~1405 |

FIG. 14

PHOTOSITE DATA TABLE IN PRINTSITE                    1500

| ITEM | TYPE | |
|---|---|---|
| PHOTOSITE ID | INTEGER TYPE | ~1501 |
| PHOTOSITE NAME | CHARACTER TYPE 64 BYTES | ~1502 |
| URL TO CGI FOR ESTIMATE NOTIFICATION | CHARACTER TYPE 256 BYTES | ~1503 |
| URL TO CGI FOR EXCEPTIONAL PROCESSING NOTIFICATION | CHARACTER TYPE 256 BYTES | ~1504 |
| URL TO CGI FOR PRINT STATUS NOTIFICATION | CHARACTER TYPE 256 BYTES | ~1505 |

FIG. 15

ORDER DATA TABLE IN PRINTSITE 1600

| ITEM | TYPE | |
|---|---|---|
| RECEIPT NUMBER | INTEGER TYPE | 1601 |
| PHOTOSITE ID | INTEGER TYPE | 1602 |
| PHOTOSITE ORDER NUMBER | INTEGER TYPE | 1603 |
| TEMPORARY ORDER DATE | INTEGER TYPE | 1604 |
| FORMAL PRINT ORDER DATE | INTEGER TYPE | 1605 |
| ORDER STATUS | INTEGER TYPE | 1606 |
| PRINT TYPE | INTEGER TYPE | 1607 |
| PRINT PRICE | INTEGER TYPE | 1608 |
| PRINTSITE BARGAIN PRICE | INTEGER TYPE | 1609 |
| PRINT TAX CHARGE | INTEGER TYPE | 1610 |
| DELIVERY CHARGE | INTEGER TYPE | 1611 |
| DELIVERY TAX CHARGE | INTEGER TYPE | 1612 |
| TOTAL PRICE | INTEGER TYPE | 1613 |

FIG. 16

PRINT IMAGE INFORMATION TABLE IN PRINTSITE 1700

| ITEM | TYPE | |
|---|---|---|
| RECEIPT NUMBER | INTEGER TYPE | 1701 |
| IMAGE NUMBER | INTEGER TYPE | 1702 |
| URL TO ACQUIRE ORIGINAL IMAGE FILE | CHARACTER TYPE 256 BYTES | 1703 |
| URL TO ACQUIRE DISPLAY IMAGE FILE | CHARACTER TYPE 256 BYTES | 1704 |
| URL TO ACQUIRE THUMBNAIL IMAGE FILE | CHARACTER TYPE 256 BYTES | 1705 |
| PRINT COUNT | INTEGER TYPE | 1706 |
| PRINT SIZE | INTEGER TYPE | 1707 |
| PRINT STATUS | INTEGER TYPE | 1708 |
| PRINT UNIT PRICE | INTEGER TYPE | 1709 |

FIG. 17

ORDER DELIVERY TABLE IN PRINTSITE      1800

| ITEM | TYPE | |
|---|---|---|
| ORDER NUMBER | INTEGER TYPE | 1801 |
| RECEIVER NAME | CHARACTER TYPE 64 BYTES | 1802 |
| DESTINATION ZIP CODE 1 | CHARACTER TYPE 8 BYTES | 1803 |
| DESTINATION ZIP CODE 2 | CHARACTER TYPE 8 BYTES | 1804 |
| DESTINATION MUNICIPAL CODE | INTEGER TYPE | 1805 |
| DESTINATION ADDRESSES 1 | CHARACTER TYPE 256 BYTES | 1806 |
| DESTINATION ADDRESSES 2 | CHARACTER TYPE 256 BYTES | 1807 |
| DESTINATION TELEPHONE NUMBER 1 | CHARACTER TYPE 8 BYTES | 1808 |
| DESTINATION TELEPHONE NUMBER 2 | CHARACTER TYPE 8 BYTES | 1809 |
| DESTINATION TELEPHONE NUMBER 3 | CHARACTER TYPE 8 BYTES | 1810 |
| DELIVERY DATE | INTEGER TYPE | 1811 |
| STATUS | INTEGER TYPE | 1812 |

FIG. 20

USER REGISTRATION WINDOW FOR PHOTOSITE — 2100

- E-MAIL ADDRESS : — 2101
- Login Name : — 2102
- PASSWORD : — 2103, 2104

NAME — 2105
- LAST NAME : ___ FIRST NAME : ___ — 2106
- PHONETIC TRANSCRIPTIONS IN KANA : ___ FIRST NAME : ___ — 2107

ADDRESS — 2108, 2109
- 〒 : ___ — MUNICIPAL DIVISION : ▼ — 2110
- CITY/DISTRICT/TOWN/VILLAGE NAME, TOWN NAME/STREET NUMBER, etc : — 2111
- APARTMENT/CONDOMINIUM NAME, ROOM NUMBER, etc : — 2112

TELEPHONE NUMBER — 2113, 2114
- ___ — ___ — ___ — 2115

REGISTER — 2116    CANCEL — 2117

FIG. 26

```
Date : Sat. 23 Jun 2001 12:13:37 +0900
From : PhotoSite (×××@○○○.com)
To : △△△@○◇◇◇.ne.jp
Subject : [USER REGISTRATION CONFIRMATION] YOU ARE REGISTERED
Content-Type : text/plain ; charset="ISO-2022-JP"
Content-Transfer-Encoding : 7bit

MR. TARO KIYANON

YOU ARE REGISTERED IN SITE

LOGIN NAME IS △△△@○◇◇◇.ne.jp

REGISTERED CONTENT IS DESTINATION E-MAIL ADDRESS : △△△@○◇◇◇.ne.jp
ADDRESS : 〒AAA-BBBB ○○CHO 1-1-2, ○○KU, TOKYO
TELEPHONE NUMBER : 03-XXXX-XXXX

IF YOU DON'T REMEMBER REGISTERING, PLEASE CONTACT
XXX-support@○○○.com
```

FIG. 44

ESTIMATE DISPLAY 4504

| PRODUCT NAME | APPLICATION | NUMBER | UNIT PRICE | TOTAL |
|---|---|---|---|---|
| DIGITAL PRINT | L | 8 | 40 | 320 |
| DIGITAL PRINT | A4 | 1 | 300 | 300 |
| PRINTSITE BENEFIT | DISCOUNT PER A4 PRINT | | −30 | −30 |
| SUBTOTAL | | | | 590 |
| CONSUMPTION TAX | | | | 29 |
| TOTAL IN PRINTSITE | | | | 619 |
| DELIVERY CHARGE | | | | 450 |
| CONSUMPTION CHARGE ON DELIVERY CHARGE | | | | 22 |
| PHOTOSITE BENEFIT | | | | −20 |
| TOTAL | | | | 1,071 |

[BENEFIT INFORMATION] [SET CREDIT INFORMATION] [CANCEL]

ORDERER INFORMATION

CREDIT CARD INFORMATION
CREDIT CARD NUMBER : 0000-0000-0000-0000
VALID DATES : 2003    6

NAME
LAST NAME : KIYANON   FIRST NAME : TARO
PHONETIC TRANSCRIPTIONS IN KANA : KIYANON   FIRST NAME : TARO

ADDRESS
〒 : aaa – bbbb   MUNICIPAL DIVISION : TOKYO ▼
CITY/DISTRICT/TOWN/VILLAGE NAME, TOWN NAME/STREET NUMBER, etc : ○○ CHO 1-1-2, ○○ KU, TOKYO
APARTMENT/CONDOMINIUM NAME, ROOM NUMBER, etc :

TELEPHONE NUMBER
03 – ○○○ – 0000

E-MAIL ADDRESS :
(WHERE TO MAKE CONTACT)   △△△@◇◇◇.ne.jp

[ ORDER ]   [ CANCEL ]
   4601         4602

FIG. 46

```
┌─────────────────────────────────────────────────────────┐ 4700
│ ┌─────────────────────────────────────────────────────┐ │
│ │ DESTINATION DESIGNATION WINDOW                      │ │
│ │   ⦿ THE SAME DESTINATION    ○ DESIGNATE             │ │
│ │     AS ORDERER                DIFFERENT DESTINATION │ │
│ │  ┌─ NAME ─────────────────────────────────────────┐ │ │
│ │  │  LAST NAME: [      ]   FIRST NAME: [      ]    │ │ │
│ │  └────────────────────────────────────────────────┘ │ │
│ │  ┌─ ADDRESS ──────────────────────────────────────┐ │ │
│ │  │  〒:[  ]-[  ]   MUNICIPAL DIVISION: [      ▼]  │ │ │
│ │  │  CITY/DISTRICT/TOWN/VILLAGE NAME, ┌──────────┐ │ │ │
│ │  │  TOWN NAME/STREET NUMBER, etc:    └──────────┘ │ │ │
│ │  │  APARTMENT/CONDOMINIUM NAME,      ┌──────────┐ │ │ │
│ │  │  ROOM NUMBER, etc:                └──────────┘ │ │ │
│ │  └────────────────────────────────────────────────┘ │ │
│ │  ┌─ TELEPHONE NUMBER ─────────────────────────────┐ │ │
│ │  │  [    ]-[    ]-[    ]       [ ORDER ] [CANCEL] │ │ │
│ │  └────────────────────────────────────────────────┘ │ │
│ └─────────────────────────────────────────────────────┘ │
└─────────────────────────────────────────────────────────┘
                                    4701     4702
```

```
<?xml version ="1.0" encode = "Shift_JIS?>
<!DOCTYPE PhotoSiteorder SYSTEM "PhotoSiteorder.dtd">
<xmlns : PhotoSiteorder = "http://www.PHOTOSITE DOMAIN NAME/">

<PhotoSiteorder>
<estimateorder PhotoSiteid = "P0001" PhotoSiteOrderid = "1001" count = "6">
 <estimateitem PhotoSiteid = "1">
  <name>PICTURE 1</name>
  <urlimg>
   <thumbnail>THUMBNAIL URL</thumbnail>
   <image>http://www.PHOTOSITE DOMAIN NAME/printdata/P0001/1.jpg</image>
   <preview>http://www.PHOTOSITE DOMAIN NAME/printdata/P0001/1_V.jpg</preview>
  </urlimg>
 </estimeteitem>
 <estimateitem PhotoSiteid = "2">
  <name>SCANNER</name>
  <urlimg>
   <thumbnail>THUMBNAIL URL</thumbnail>
   <image>http://www.PHOTOSITE DOMAIN NAME/printdata/P0001/2.jpg</image>
   <preview>http://www.PHOTOSITE DOMAIN NAME/printdata/P0001/2_V.jpg</preview>
  </urlimg>
 </estimeteitem>

...ELLIPSIS (DESCRIPTION CORRESPONDING TO IMAGES FOR WHICH
     ESTIMATION REQUESTS ARE TO BE GENERATED)

</estimateorder>
</PhotoSiteorder>
```

F I G. 54

```xml
<?xml version = "10" encode = "Shift_JIS"?>
<!DOCTYPE PhtoSiteorder SYSTEM "PhotoSiteorder.dtd">
<xmlns : PhotoSiteorder = "http://www.PHOTOSITE DOMAIN NAME/">

<PhotoSiteorder>
  <estimateresult PhotoSiteid = "P0001" PhotoSiteOrderid = "1001" count = "4">
    <resultmode>success</resultmode>
    <resultinf printsiteid = "Print0001" printsiteOrderid = "Pr-1001">
      <chargeinf total = "1091">
        <print total = "619" charge = "590" tax = "29"/>
        <ship total = "472" charge = "450" tax = "22"/>
      </chargeinf>
    </resultinf>

<printtype edge = "BRIMMED"/>
    <resultitem PhotoSiteid = "1">
      <printinf size = "L SIZE" count = "1"/>
      <printcharge rate = "40" total = "40"/>
    </resultitem>
    <resultitem PhotoSiteid = "2">
      <printinf size = "L SIZE" count = "3"/>
      <printcharge rate = "40" total = "120"/>
    </resultitem>
    <resultitem PhotoSiteid = "3">
      <printinf size = "A4 SIZE" count = "1"/>
      <printcharge rate = "300" total = "300"/>
    </resultitem>
    <resultitem PhotoSiteid = "6">
      <printinf size = "L SIZE" count = "4"/>
      <printcharge rate = "40" total = "240"/>
    </resultitem>
    <resultitem PhotoSiteid = "NONE">
      <printinf size = "A4 SIZE DISCOUNT" count = "1"/>
      <printcharge rate = "-30" total = "-30"/>
    </resultitem>
  </estimateresult>
</PhotoSiteorder>
```

FIG. 55

```
<?xml version = "1.0" encode = "Shift_JIS"?>
<!DOCTYPE PhotoSiteorder SYSTEM "PhotoSiteorder.dtd">
<xmls : PhotoSiteorder = "http://www.PHOTOSITE DOMAIN NAME/">

<PhotoSiteorder>
 <order printsiteid = "Print0001" printsiteOrderid = "Pr-1001">
            PhotoSiteid = "P0001" PhotoSiteOrderid = "1001" count = "4">
  <orderresult>success</orderresult>
  <orderinf>
    <shipinf>
       <name>KIYANON TARO</name>
       <zip>AAABBBB</zip>
       <address>○○CHO 1-1-2, ○○ KU, TOKYO</address>
       <phone>03XXXXXXXX</phone>
       <email>CANON@canon.co.jp</email>
    </shipinf>
    <chargeinf total = "1091">
        <print total = "619" charge = "590" tax = "29"/>
        <ship total = "472" charge = "450" tax = "22"/>
    </chargeinf>
  </orderinf>
  <orderitem PhotoSiteid = "1">
     <printinf size = "L SIZE" count = "1"/>
     <printcharge rate = "40" total = "40"/>
  </orderitem>
  <orderitem PhotoSiteid = "2">
     <printinf size = "L SIZE" count = "3"/>
     <printcharge rate = "40" total = "120"/>
  </orderitem>
  <orderitem PhotoSiteid = "3">
     <printinf size = "A4 SIZE" count = "1"/>
     <printcharge rate = "300" total = "300"/>
  </orderitem>
  <orderitem PhotoSiteid = "6">
     <printinf size = "L SIZE" count = "4"/>
     <printcharge rate = "40" total = "240"/>
  </orderitem>
  <orderitem PhotoSiteid = "NONE">
     <printinf size = "A4 SIZE DISCOUNT" count = "1"/>
     <printcharge rate = "-30" total = "-30"/>
  </orderitem>
 </order>
</PhotoSiteorder>
```

```
CONFIRMATION OF ORDER CONTENTS

THE FOLLOWING ORDER IS RECEIVED.
NOTE THAT ORDER CONTENTS ARE ALSO NOTIFIED TO
aaa@canon.co.jp BY E-MAIL ORDER NUMBER    : 10242678
    ORDER DATE      : MAY 10, 2001 AT 7:45 p.m.
    ORDER CONTENTS  : L SIZE BRIMLESS        8
                    : A4 SIZE                1
    AMOUNT CLAIMED  : 1,071 YEN
    NAME            : KIYANON TARO
    ADDRESS         : 〒AAA-BBBB○○CHO 1-1-2,
                      ○○KU, TOKYO TELEPHONE NUMBER: 03-XXXX-XXXX
    DESTINATION     : THE SAME AS YOUR CONTACT ADDRESS

[ OK ]
```

5700

5701

SERVICE CONTENTS DATA LIST

5800

| ITEM | SIZE ID | PRICE |
|---|---|---|
| L SIZE | 1 | 40 |
| 2L SIZE | 2 | 80 |
| POSTAL CARD | 3 | 150 |
| POSTCARD | 4 | 100 |
| A4 SIZE | 5 | 300 |

PRINTSITE BENEFIT LIST

5900

| ITEM | SIZE ID | BENEFIT UNIT | DISCOUNT |
|---|---|---|---|
| POSTAL CARD | 3 | 100 | −500 |
| POSTCARD | 4 | 100 | −500 |
| A4 SIZE | 5 | 1 | −20 |

FIG. 59

```
Date : Sat. 23 Jun 2001 01:00:00+0900
From : PhotoSite (XXX@○○○.com)
To : △△△@◇◇◇.ne.jp
Subject :[PRINT ORDER CONFIRMATION] ORDER 10242678
Content-Type : text/plain;  charset ="ISO-2022-JP"
Content-Transfer-Encoding : 7bit

THANK YOU FOR PRINT ORDER.
THE FOLLOWING ARE THE CONTENTS OF RECEIVED ORDER.

MR. TARO KIYANON
ORDER NUMBER      : 10242678
ORDER DATE        : MAY 10, 2001 AT 7:45 p.m.
ORDER CONTENTS    : L SIZE BRIMLESS     8
                  : A4 SIZE             1
AMOUNT CLAIMED    : 1,062 YEN

NAME              : KIYANON TARO
ADDRESS           : 〒AAA-BBBB ○○ CHO 1-1-2,
                    ○○ KU, TOKYO

TELEPHONE NUMBER : 03-XXXX-XXXX
DESTINATION       : THE SAME AS YOUR CONTACT ADDRESS

YOU CAN CHECK STATE OF ORDER FROM
http://www.○○○.com/photosite/
BY USING THE ABOVE ORDER NUMBER
```

FIG. 61

```
Date : Sat. 23 Jun 2001 02:34:55+0900
From : PhotoSite (△△△@canon.co.jp)
To : aaa@OO.ne.jp
Subject : DISCLOSURE ALBUM NOTIFICATION
Error-to : △△△@canon.co.jp
Content-Type : text/plain : charset = "ISO-2022-JP"
Content-Transfer-Encoding : 7bit YOU CAN BROWSE DISCLOSURE ALBUM AT PHOTOSITE WITH THE FOLLOWING URL:
http://OOO.com/PhotoSite/UserAlbum/AlbumEntry.cgi?AlbumID = AJNWDMF         6201
YOU CAN ALSO BROWSE ALBUM FROM
http://AOOO.com/PhotoSite/
BY DESIGNATING THE FOLLOWING NUMBER AT ALBUM ID:
ALBUM ID : AJNWDMF          6203

- MESSAGE FORM SENDER -
THANK YOU FOR YOUR PATRONAGE.
THE PICTURES TAKEN AT THE PRODUCT BRIEFING THE OTHER DAY WERE UPLOADED.
PLEASE LET ME KNOW WHEN YOU SEE THEM.
- END OF MESSAGE -
```

FIG. 63

PORTABLE TERMINAL
BUTTON/ALPHABET LIST                               6400

| Button | Letters | AL |
|--------|---------|----|
| 1      |         | 0  |
| 2      | ABC     | 3  |
| 3      | DEF     | 3  |
| 4      | GHI     | 3  |
| 5      | JKL     | 3  |
| 6      | MNO     | 3  |
| 7      | PQRS    | 4  |
| 8      | TUV     | 3  |
| 9      | WXYZ    | 4  |

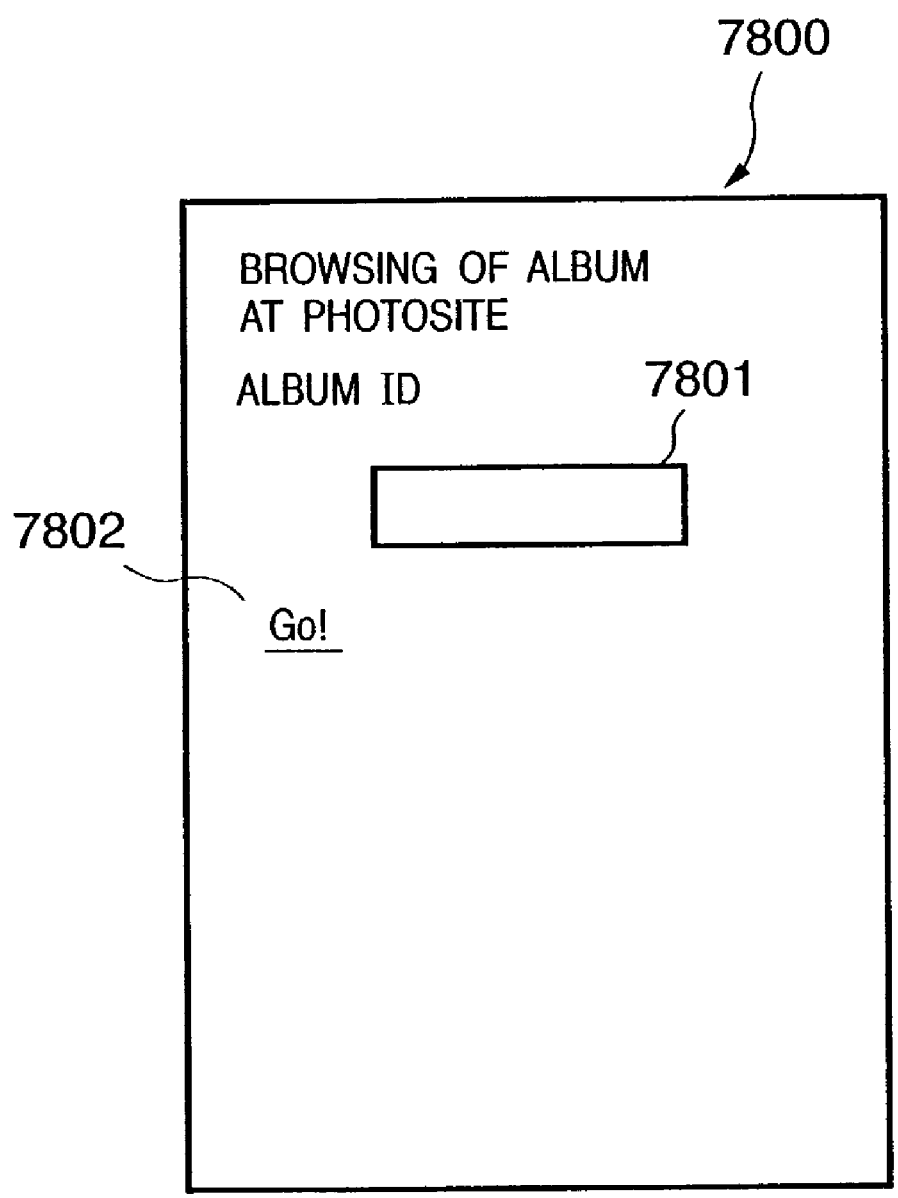

INFORMATION PROVIDING APPARATUS FOR PERFORMING DATA PROCESSING IN ACCORDANCE WITH ORDER FROM USER

FIELD OF THE INVENTION

The present invention relates to an information providing apparatus which provides data processing services for users.

BACKGROUND OF THE INVENTION

Recently, with improvements in communication infrastructures and advances in information communication techniques, online information providing services which use the Internet and the like can be provided. Many of conventional systems for providing such services demand the input of IDs from user terminals. If such an ID is constituted by only numerals, the ID can be easily input. In this case, however, as compared with a case wherein the same information is expressed by characters, the number of digits required becomes very large. This makes it inconvenient to notify or display the ID. In addition, the user has difficulty in memorizing the ID.

Recently, therefore, many systems are designed to issue IDs constituted by combinations of numerals and characters.

With improvements in communication infrastructures, users can access information providing systems even from terminals having no keyboard, e.g., cell phones and fixed telephones, other than computers.

No conventional information providing systems, however, have issued IDs in consideration of facilitating input from terminals without any keyboard.

When, for example, characters are to be input from a general telephone, three characters A, B, and C are assigned to the same button to which the numeral 2 is assigned. In general, when this button is pressed once, A is input; when pressed consecutively again, B is input; and when further pressed again, C is input. When a given button A is pressed several times first, and then another button B is pressed, a character assigned to the button A is input to the first character input column, and a character assigned to the button B is input to the next character input column. That is, when a different button is pressed, input by the preceding button is confirmed.

When a three-character string AEI is to be input by using such a telephone, the user presses button 2 once, button 3 twice, and button 4 three times. That is, the character string AEI can be input by pressing numeral buttons a total of six times. However, when a character string ABC, which is an alphabetical character string having the same number of characters as that of the above character string, is to be input, the user must presses buttons a total of eight times, i.e., once for button 2, once for the move button for character input columns, twice for button 2, once for the move button for the character input columns, and three times for button 2. That is, the input operation becomes complicated by the degree to which the move button for the character input columns must be pressed.

In addition, different operations are required to move character input columns depending on the types of telephones, and the position of the move button is not fixed unlike the numeral buttons. It therefore takes much time for a user to become accustomed to input operation.

SUMMARY OF THE INVENTION

The present invention has been proposed to solve the above problem in the prior art, and has as its object to provide user-friendlier services.

According to the present invention, the foregoing object is attained by providing an information providing apparatus which can be connected to an information processing apparatus, comprising: means for creating numerical data; storage means in which types of a plurality of keys arranged in the information processing apparatus and the number and types of characters assigned to the respective keys are stored in correspondence with each other; and creating means for creating a character string from the numerical data by combining the characters, wherein the creating means creates a character string, on the basis of the types of keys and the number and types of characters assigned to the respective keys which are stored in the storage means, such that consecutive two characters are assigned to the different keys.

According to the present invention, the foregoing object is attained by providing an information processing method using an information providing apparatus which can be connected to an information processing apparatus and includes storage means in which types of a plurality of keys arranged in the information processing apparatus and the number and types of characters assigned to the respective keys are stored in correspondence with each other; comprising: a step of assigning unique numerical data to a user; and a creating step of creating a character string from the numerical data by combining the characters, wherein in the creating step, a character string is created such that two consecutive characters are assigned to the different keys.

According to the present invention, the foregoing object is attained by providing a control program for controlling an information processing apparatus which can be connected to an information processing apparatus and includes storage means in which types of a plurality of keys arranged in the information processing apparatus and the number and types of characters assigned to the respective keys are stored in correspondence with each other, and processor; causing the processor to execute: a step of assigning unique numerical data to a user; and a creating step of creating a character string from the numerical data such that two consecutive characters are assigned to the different keys.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram showing the schematic arrangement of the overall information providing system according to the embodiment of the present invention;

FIG. 3 is a view showing a data table associated with customer information managed in a photosite according to the embodiment of the present invention;

FIG. 4 is a view showing a customer state table for managing information representing the current state of a user using the photosite according to the embodiment of the present invention;

FIG. 5 is a view showing a customer album data table managed in the photosite according to the embodiment of the present invention;

FIG. 6 is a view showing an album information data table managed in the photosite according to the embodiment of the present invention;

FIG. 7 is a view showing an album image data table managed in the photosite according to the embodiment of the present invention;

FIG. 8 is a view showing an image information table managed in the photosite according to the embodiment of the present invention;

FIG. 9 is a view showing an order information table managed in the photosite according to the embodiment of the present invention;

FIG. 10 is a view showing an ordered image data table managed in the photosite according to the embodiment of the present invention;

FIG. 11 is a view showing an order settlement data table managed in the photosite according to the embodiment of the present invention;

FIG. 12 is a view showing an orderer data table managed in the photosite according to the embodiment of the present invention;

FIG. 13 is a view showing a printsite data table managed in the photosite according to the embodiment of the present invention;

FIG. 14 is a view showing the contents of a database for managing photosite information in a printsite according to the embodiment of the present invention;

FIG. 15 is a view showing the contents of an order information table in a printsite according to the embodiment of the present invention;

FIG. 16 is a view showing the contents of a print image information table in a printsite according to the embodiment of the present invention;

FIG. 17 is a view showing the contents of an order delivery table in a printsite according to the embodiment of the present invention;

FIG. 20 is a view showing a window for user registration with respect to the information providing system according to the embodiment of the present invention;

FIG. 26 is a view showing an example of the contents of e-mail issued at the time of user registration in the photosite according to the embodiment of the present invention;

FIG. 44 is a view showing the estimate display window to be displayed when an image print order is placed according to the embodiment of the present invention;

FIG. 45 is a view showing the orderer information input display window to be displayed when an image print order is placed according to the embodiment of the present invention;

FIG. 46 is a view showing the destination information input window to be displayed when an image print order is placed according to the embodiment of the present invention;

FIG. 53 is a view showing an example of the temporary print order format notified from the photosite to a printsite according to the embodiment of the present invention;

FIG. 54 is a view showing an example of the format of estimate information notified from the printsite to the photosite according to the embodiment of the present invention;

FIG. 55 is a view showing an example of the formal print order format notified from the photosite to the printsite according to the embodiment of the present invention;

FIG. 56 is a view showing an example of the order contents confirmation window displayed in the information providing system according to the embodiment of the present invention;

FIG. 59 is a view showing an example of the email to be notified when a print order is placed according to the embodiment of the present invention;

FIG. 61 is a view showing an example of album notification mail according to the embodiment of the present invention;

FIG. 63 is a view showing a list representing the relationship between the buttons of a telephone and alphabetical characters input by pressing the buttons according to the embodiment of the present invention;

FIG. 72 is a view showing the first window to be displayed when the user browses an album from the portable phone;

DETAILED DESCRIPTION OF THE PREFERRED EMBODIMENTS

The preferred embodiments of the present invention will be described in detail below with reference to the accompanying drawings. Note that the present invention is not limited to the relative positions of constituent elements, display windows, and the like described in the embodiments unless otherwise specified.

First Embodiment

An information providing system according to an embodiment of the present invention which shares and provides digital image data through the Internet will be described.

In general, digital image information is provided by an image input device. The following is a background to this trend. With smooth decreases in semiconductor device size, the part sizes and costs of LSIs and solid-state image sensing elements which constitute image input devices represented by digital still cameras and digital video cameras have been scaled down. As a consequence, image input devices for photographing images have been widely used.

For example, the image data photographed by a digital camera is stored in a memory inside the digital camera. The data is then transferred to a recording unit represented by an HDD or the like in a personal computer owned by the user of the digital camera and managed/stored or is written in an external recording medium such as a CD-R and stored. With the widespread use of color scanners as well as digital cameras, images can be easily created and stored as electronic data.

In consideration of such a situation, the information providing system according to this embodiment includes an image service provider (to be referred to as a photosite hereinafter) and print service provider (to be referred to as a printsite hereinafter). This photosite provides services like keeping the image data photographed by users using image input devices in storage areas in servers on the Internet and allowing customers to browse the image data again at the time they require it. The printsite prints out electronic documents such as New Year's cards, wordprocessed documents, and images which are transferred through the Internet, and provides the printed matter as merchandise.

The photosite according to this embodiment does not provide any print service by itself but forms an affiliation with a printsite which can provide various print services and gives a print order to the printsite.

<Outline of System>

Figure 1:
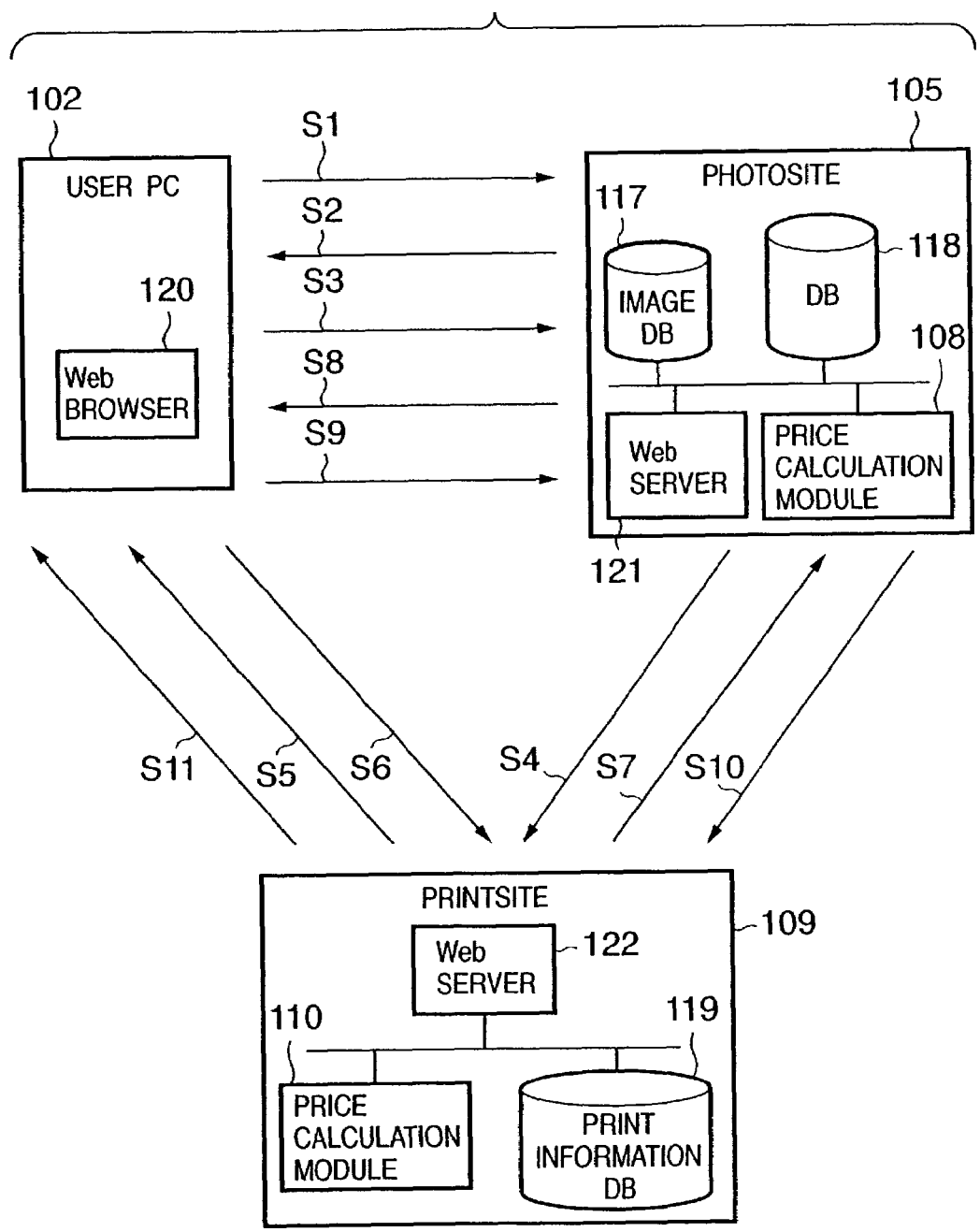
FIG. 1 is a block diagram conceptually showing an information providing system according to an embodiment of the present invention.

An outline of the information providing system according to this embodiment will be described with reference to FIG. 1. FIG. 1 is a view showing how data are exchanged among a PC (Personal Computer) 102 (to be referred to as a user PC hereinafter) or portable terminal 113 such as a mobile phone, PDA, and so on, that is used by a user who receives services, a photosite 105 which manages images and personal information of the user, and a printsite 109 which manages print processing and print unit prices between the instant at which the user generates a request to browse images and the instant at which printed matter is acquired.

In step S1, the user accesses a Web server 121 in the photosite 105 by using a browser 120 of the user PC 102, and generates a request to browse images stored in an image database (DB) 117 in the photosite 105. In step S2, the photosite 105 displays images on the browser 120 under a predetermined condition.

In step S3, the user selects an image to be printed out from the images browsed on the browser 120. In step S4, the identification information of the selected image is transferred from the photosite 105 to the printsite 109 (temporary print order). The flow advances to step S5, in which the printsite 109 adds information about a form (size and the like) that can be printed out and causes a Web server 122 to present the user PC 102 with the information together with the image, thereby prompting the user to input a print form, a print count, and the like.

In step S6, when the user inputs a print form, a print count, and the like for each selected image through the browser 120 and sends a print instruction to the printsite 109, the printsite 109 calculates a price (estimated price) requested to carry out the print instruction by using a print information database 119 and price calculation module 110.

In step S7, when the printsite 109 temporarily transfers the estimated price to the photosite 105, the photosite 105 calculates a price (offered price) on the basis of the estimated price factoring in the personal information by using a personal information database 118 and price calculation module 108.

In step S8, the photosite 105 causes the browser 120 of the user PC 102 to display the presented price by using the Web server 121.

In step S9, if the user approves the presented price and the user PC 102 returns an approval action to the photosite 105, a settlement module 107 serving as a settlement means receives this action and performs settlement processing.

In step S10, the photosite 105 sends a formal print order to the printsite 109. The printsite 109 sends the formal print order to the printsite 109. Upon reception of the formal print order, the printsite 109 performs printing in accordance with the formal print order by using the printing means owned by the printsite 109.

In step S11, the printsite 109 delivers printed matter 112 obtained by printing to the destination designated by the user of the user PC 102, who has generated the print request, by a transportation means of some kind.

<Arrangement of System>

FIG. 2 is a view showing the detailed arrangement of the information providing system according to this embodiment.

Reference numeral 101 denotes an image input apparatus which converts an optical image as image information into an electrical signal, performs predetermined image processing, and records/reproduces the resultant information as digital information. This image input apparatus may be a digital still camera capable of photographing a still image and recording the image as image data or a digital video camera capable of photographing a moving image and recording the image as moving image data.

Reference numeral 102A denotes a user personal computer; and 116, a data transfer interface for transferring image data photographed between the image input apparatus 101 and the user PC 102A. The data transfer interface 116 may be a wire interface represented by USB (Universal Serial Bus) or IEEE1394 or a wireless interface represented by IrDA or Bluetooth.

The image data photographed by the image input apparatus 101 and stored as digital information is transferred to a storage area in an information storage unit represented by the HDD of the user PC 102A through the data transfer interface 116. For image data transfer from the image input apparatus 101 to the user PC 102A, the following two cases are present. In the first case, in accordance with an instruction from the OS or special software installed in the user PC 102A, the image data stored in the image input apparatus 101 are transferred at once. In the second case, in response to the instruction of a transfer command from the image input apparatus 101, the OS or special software in the user PC 102A ensures a data recording area in the information storage unit in the user PC 102A and transfers the image data to the area.

A browser 120A having a standard protocol capable of transmitting information on the Internet 104 can run on the user PC 102A. With this browser 120A, a user can access the photosite 105 using the standard protocol such as HTTP protocol to display Web information created by a description language such as HTML or XML. Web information is linked to multimedia information such as images or sounds managed by sites on the Internet 104. With this operation, the user of the user PC 102A can receive services provided by the photosite 105 using the Internet 104.

The image data photographed by the image input apparatus 101 and stored in the information storage are in the user PC 102A is transferred to the photosite 105 in accordance with a request from the user of the user PC 102A (this transfer will be referred to as image upload hereinafter). This method of uploading an image includes a method in which image data to be transferred is selected using the above browser 120A and transferred in synchronism with the action of requesting image upload and a method in which image data is directly selected and transferred by using image upload software. Either method is executed on the basis of a protocol usable on the Internet, e.g., HTTP or FTP. A photo sharing module 106 is a module which executes this series of operations in the photosite 105.

The photo sharing module 106 checks whether the uploaded image data is data that can be used in the photosite 105. If it is determined that the data can be used, the uploaded image data is stored in the image database 117, and its attribute information or the like is stored in the database 118. The photosite 105 may put a plurality of uploaded image data into one unit and manage it as an album for browsing.

In this stage, the photo sharing module 106 notifies the user PC 102A that the image data is normally uploaded. The user of the user PC 102A can upload image data through the Web browser in this manner.

In addition to the above attribute information of image data, various data are collectively managed in the database 118. For example, such data include the data of user attribute information registered in the photosite 105 and the data of attribute information of a printsite which is requested to print out uploaded image data.

The flow of print order processing for uploaded image data will be sequentially described next. The user of the user PC 102A can browse the image data which is uploaded by himself/herself through the Web browser 120A. The methods of selecting images to be browsed include a method of selecting images to be sequentially browsed image by image, and a method of registering a plurality of images as one album, selecting an album to be browsed from a plurality of albums, and selecting/browsing each image managed in the selected album.

The photosite 105 gives a print order for the image data uploaded from the user to a print provider which provides printouts of image data. This print provider is one of printsites 109A, 109B, and 109C. For the sake of illustrative convenience, only the three printsites are illustrated. However, the number of printsites is not specifically limited and may be more than four.

The user of the user PC 102A selects image data which he/she wants to print out so as to purchase the printed matter as merchandise from the browse window of the uploaded images. The user then selects a printsite to which he/she wants to give an order from the printsites 109A, 109B, and 109C which the photosite 105 can provide. The user selects the printsite 109 to which he/she gives an order in consideration of, for example, the services provided by each printsite 109, unit price, and delivery time. For the sake of descriptive convenience, the following description will be made on the assumption that the user has selected the printsite 109A. Even if, however, the user selects the printsite 109B or 109C, since the basic flow of information remains the same, a description thereof will be omitted.

When the user selects image data for which he/she wants to give a print order from the browse window, and notifies the photosite 105 of the corresponding information, the photosite 105 creates, in a predetermined form, a temporary print order associated with the image data for which the printout request has been given, and transmits it through the Internet 104, thereby requesting the printsite 109A to make an estimate.

Upon reception of the temporary print order from the photosite 105, the printsite 109A acquires necessary image data from the image database 117 in the photosite 105 and creates selected image information. By transmitting this selected image information to the user PC 102A through the Internet 104, the user can input a print form, a print count, and the like for each selected image on the Web browser 120A of the user PC 102A.

The printsite 109A calculates an estimated price by using a price calculation module 110A on the basis of the information such as the print form and print count for each selected image, and transmits the calculated estimated price to the photosite 105 through the Internet 104.

The photosite 105 receives the information of the estimated price transmitted from the printsite 109A in real time. The photosite 105 then changes the received estimated price by using the price calculation module 108 in consideration of the personal information of the user. More specifically, the photosite 105 can accumulate "points" as alternative currency that functions as currency with respect to the photosite 105 for each registered user. When the user is to use the accumulated points, he/she can receive a discount on the print price in accordance with the points.

The Web server 121 in the photosite 105 transfers the presented price based on the estimated price factoring in the points as Web information to the user PC 102A, thereby dynamically presenting the price to the user who gives a print order.

That is, when the user selects image data for which he/she wants to give a print order and the printsite 109 and inputs a print form, a print count, and the like on the Web browser 120A of the user PC 102A, a price required for the printing operation is quickly displayed.

When the user of the user PC 102A, who has given the print order, approves of purchasing the service at this presented price and returns an approval action to the photosite 105, the settlement module 107 serving as a settlement means receives this and performs settlement processing. When the settlement is completed, the photosite 105 sends a formal print order to the printsite 109A.

When the printsite 109A receives this formal print order, it is determined that the settlement is confirmed, and the flow advances to print processing. In the print processing, first of all, the printsite 109A acquires the image data required for printing out from the image database 117 in the photosite 105. The image data acquired in this manner is printed out as printed matter 112A by a printer 111A connected to the printsite 109A. The printed matter 112A is delivered, by some transportation means, to the destination designated by the user of the user PC 102A who has given the printout request. Referring to FIG. 2, the printer 111A is connected to the printsite 109A. However, this printer need not be connected to the printsite 109A as long as the printer is under the control of the user of the printsite 109A.

The above description has been made on the outline of the system designed to allow a user who has uploaded the image data photographed by the image input apparatus 101 through the user PC 102A to browse the image data in the photosite 105 and give a print order. In this case, as a terminal for uploading image data, a PC has been exemplified. However, the information providing system according to the present invention is not limited to this. Image data may be uploaded from a portable terminal or may be directly uploaded from an image input apparatus such as a digital camera, digital video camera, scanner, or copying machine.

A method of allowing a person other than a user who has uploaded image data in the photosite 105 to browse the image data uploaded in the photosite 105 and stored in the database 117 through the Internet 104 will be described next.

The photosite 105 provides the third party designated by a user who has uploaded images with browse and print order services with respect to the "uploaded images" or "album that manages a plurality of uploaded images as one archive". The user who has uploaded the image data in the photosite 105 notifies the photosite 105, by using the Web browser 120A, of the attribute information of a user (to be referred to as a browse user hereinafter) who is permitted to browse the images, e.g., the name of the browse user, and the e-mail address.

When disclosing images to the browse user, the photosite 105 creates a URL (Universal Resource Locator) required for disclosure. As the URL to be created at this time, a unique address using a random number or the like that cannot be uniquely predicted is assigned. The following is an example:

http://oo o.com/PhotoSite/Album/
AlbumEntry.cgi?AlbumID=AJNWDMF (Such a URL that cannot be uniquely predicted will be referred to as a random URL hereinafter.)

The photosite 105 notifies the browse user of the random URL created in this manner by e-mail through the Internet 104 upon adding password information required for browsing to the e-mail as needed. Upon reception of the e-mail, the browse user accesses the Internet 104 from a user PC 102B, and inputs the random URL notified by the e-mail to a Web browser 102B. This allows the browse user to browse the images and album designated by the user who has uploaded the images.

A method of allowing a browse user who uses the user PC 102B to give a print order for image data that can be browsed in this manner will be described next. The photosite 105 gives a print order for image data from the browse user to one of the printsites 109A, 109B, and 109C which provide printouts of image data.

The browse user of the user PC 102A selects image data which he/she wants to print out so as to purchase the printed matter as merchandise from the browse window. The browse user of the user PC 102B then selects the printsite 109 to which he/she wants to give an order from the printsites 109A, 109B, and 109C which the photosite 105 can provide. The browse user selects the printsite 109 to which he/she gives an order in consideration of, for example, the services provided by each printsite 109, unit price, and delivery time. For the sake of descriptive convenience, the following description will be made on the assumption that the user has selected the printsite 109B. Even if, however, the user selects the printsite 109A or 109C, since the basic flow of information remains the same, a description thereof will be omitted.

When the browse user selects image data for which he/she wants to give a print order from the browse window, and notifies the photosite 105 of the corresponding information, the photosite 105 creates, in a predetermined form, a temporary print order associated with the image data for which the printout request has been given, and transmits it through the Internet 104, thereby requesting the printsite 109B to make an estimate.

Upon reception of the temporary print order from the photosite 105, the printsite 109B acquires necessary image data from the image database 117 in the photosite 105 and creates selected image information. By transmitting this selected image information to the user PC 102B through the Internet 104, the user can input a print form, a print count, and the like for each selected image on the Web browser 120B of the user PC 102B.

The printsite 109B calculates an estimated price by using a price calculation module 110B on the basis of the information such as the print form and print count for each selected image, and transmits the calculated estimated price to the photosite 105 through the Internet 104.

The photosite 105 receives the information of the estimated price transmitted from the printsite 109B in real time. If the browse user has no personal information, the estimated price transmitted from the printsite 109B to the user PC 102B is transferred as Web information. If the browse user has personal information, the presented price based on the estimated price factoring in points is transferred as Web information, thereby dynamically presenting the price to the browse user who has given the print order.

When the browse user of the user PC 102B, who has given the print order, approves of purchasing the service at this presented price and returns an approval action to the photosite 105, the settlement module 107 serving as a settlement means receives this and performs settlement processing. When the settlement is completed, the photosite 105 sends a formal print order to the printsite 109B. The printsite 109B receives this formal print order and acquires the image data required for printing out from the image database 117 in the photosite 105. The image data acquired in this manner is printed out as a printed matter 112B by a printer 111B serving as a printing means owned by the printsite 109B. The printed matter 112B is delivered, by some transportation means, to the browse user of the user PC 102B who has given the printout request.

The photosite 105 can provide the portable terminal owner designated by a user who has uploaded images with a service of making a notification of browsing of images (or an album) and browse function and print order services. A user can also receives notification e-mail containing a URL for browsing an album through a portable terminal, and at the same time, can browse images or an album or give a print order through the portable terminal (a user who uses the photosite 105 through a portable terminal will be referred to as a portable browse user hereinafter).

The use who has uploaded image data from the user PC 102A to the photosite 105 through the Internet 104 notifies the photosite 105, by using the Web browser 120A, of the attribute information of a user who is permitted to browse the images, e.g., the name of the browse user, and the e-mail address.

In disclosing images and an album to a portable browse user, the photosite 105 creates a random URL necessary for disclosure. The photosite 105 notifies a portable terminal 113A of the portable browse user of the random URL by using e-mail upon adding password information necessary for browsing, as needed. This email notified to the portable browse user is sent out from a mail distribution server in the photosite 105 to a mobile network 114A, which can exchange various data with the portable terminal 113A, through the Internet 104 and an Internet connection gateway 115A, and is transferred to the portable terminal 113A. Upon reception of the e-mail, the portable browse user accesses the photosite 105 through the route of the mobile network 114, Internet connection gateway 115A, and Internet 104, by inputting the random URL address notified by the e-mail.

The photosite 105 has browser information dedicated to portable terminals, which is created by a description language dedicated to portable terminals, e.g., WML or CompactHTML, in addition to Web information created by a description language such as HTML or XML which can be displayed on the Internet 104. The photosite 105 also has image data resized to a size that can be displayed on the portable terminal 113A. In accordance with a request from the portable terminal 113A, the photosite 105 discriminates the model of the terminal, and transmits information that can be displayed on the portable terminal 113A. According to an environment for portable terminals capable of browsing, pieces of browser information in various formats are prepared in the photosite 105 to provide services for portable communication terminals that can browse the browser information, including not only the portable terminal 113A but also the portable terminal 113B that differs from the portable terminal 113A in communication protocol specifications, information description languages, and mobile network environments. For the sake of descriptive convenience, FIG. 2 shows only the two usable portable terminals, namely the portable terminals 113A and 113B. However, three or more portable terminals may be used.

A browse request from the portable terminal 113B is sent from a mobile network 114B that can be used by the portable terminal 113B to an Internet connection gateway 115B. After protocol conversion, the request is sent to the photosite 105 connected to the Internet 104. In addition to the Web display information created by a description language such as HTML or XML which can be browsed on the Internet 104, the photosite 105 has the browser information created by a description language dedicated to portable terminals, such as WML or CompactHTML by resizing image data to a size that can be browsed on the portable terminal 113B. In accordance with a request from the portable terminal 113B, the photosite 105 discriminates the model of the terminal, and sends out information that can be browsed on the portable terminal 113B.

A method of allowing a portable browse user, i.e., the user of the portable terminal 113A or 113B, to select image data and give a print order will be described next.

The transmission path of information between the photosite 105 and the portable terminal 113A is photosite 105→Internet 104→Internet connection gateway 115A→mobile network 114A→portable terminal 113A.

The portable browse user can browse the images or album designed by the user who has uploaded the images by inputting the random URL notified by e-mail to the browser of the portable terminal.

The portable browse user selects a printsite to which he/she wants to give an order from the printsites 109A, 109B, and 109C which the photosite 105 can provide. The portable browse user selects the printsite 109 to which he/she gives an order in consideration of, for example, the services, unit price, and delivery time provided by each printsite 109. For the sake of descriptive convenience, the following description will be made on the assumption that the user has selected the printsite 109C. Even if, however, the user selects the printsite 109B or 109A, since the basic flow of information remains the same, a description thereof will be omitted.

When the user selects image data for which he/she wants to give a print order from the browse window, and notifies the photosite 105 of the corresponding information, the photosite 105 creates a temporary print order associated with the image data for which the printout request has been given, and transmits it through the Internet 104, thereby requesting the printsite 109C to make an estimate.

Upon reception of the temporary print order from the photosite 105, the printsite 109C acquires image data necessary for selected window information from the image database 117 in the photosite 105 and creates selected image information. By transmitting this selected image information to the portable terminal 113A through the Internet 104, the portable browse user can input a print form, a print count, and the like for each selected image on the portable terminal 113A.

The printsite 109C calculates an estimated price by using a price calculation module 110C on the basis of the information such as the print form and print count for each selected image, and transmits the calculated estimated price to the photosite 105 through the Internet 104.

The photosite 105 receives the information of the estimated price transmitted from the printsite 109C in real time. If the portable browse user has no personal information, the estimated price transferred from the printsite 109C to the portable terminal 113A is transferred as Web information. If the portable browse user has personal information, the presented price based on the estimated price factoring in points is transferred as Web information, thereby dynamically presenting the price to the portable browse user who has given the print order.

When the portable browse user of the portable terminal 113A, who has given the print order, approves of purchasing the service at this presented price and returns an approval action to the photosite 105, the settlement module 107 serving as a settlement means receives this and performs settlement processing. When the settlement is completed, the photosite 105 sends a formal print order to the printsite 109C. The printsite 109C receives this formal print order and acquires the image data required for printing out from the image database 117 in the photosite 105. The image data acquired in this manner is printed out as printed matter 112C by a printer 111C serving as a printing means owned by the printsite 109C. The printed matter 112B is delivered, by some transportation means, to the browse user of the portable terminal 113A who has given the printout request.

The above description has been made on the outline of the information providing system designed to allow a user as the third party who has received a permission to browse images or an album from a user who has uploaded the images to browse the image data and give a print order on the basis of the information received from the photosite 105.

<Arrangement of Database>

FIGS. 3 to 13 are views showing the contents of the database 118 managed by the photosite 105 in this embodiment.

FIG. 3 is a view showing a data table associated with the customer information managed by the photosite 105 in this embodiment. When a user executes user registration, one record of a customer information data table 400 is created and registered and managed and registered in the database 118 to be managed. For a registered user, a unique user ID is defined, and the user is managed on the database by the customer information data table 400 using a user ID 401 as a key. The information managed as customer information includes a notification destination mail address 402, login name 403, password 404, name (last name) 405, name (first name) 406, phonetic transcriptions in kana (last name) 407, phonetic transcriptions in kana (first name) 408, zip codes (1, 2) 409 and 410, municipal division code 411, addresses (1, 2) 412 and 413, telephone numbers (1, 2, 3) 414, 415, and 416, and user registration state 417. When the user registration state 417 is 1, it indicates that the user has already been registered and is allowed to use the photosite. When this information is 0, it indicates that the use of the photosite is inhibited.

FIG. 4 is a view showing a customer state table for managing information representing the current state of each user who uses the photosite 105 in this embodiment. When the user executes user registration, one record of a customer state data table 500 is created and registered in the database 118 to be managed. Each set value in this record is updated whenever necessary in accordance with the operation performed by the user while using the photosite 105. When, therefore, the user logs in, the state set when the user used the photosite last is stored in the customer state data table 500. The data stored in this customer state data table 500 include, by using a user ID 501 serving as a key, an album ID 502 of the album that was displayed last by the user, a maximum disc capacity 503, and a point 504 that is accumulated when the user gives a print order. With respect to the same user, the user ID 501 and user ID 401 are equal in value.

FIG. 5 is a view showing the customer album data table managed by the photosite 105 in this embodiment. When the user creates one new album while using the photosite 105, one record of a customer album data table 600 is created and registered in the database 118 to be managed. When the user deletes an album, the corresponding record is deleted from the information database 118. The data stored in the customer album data table 600 include, by using a user ID 601 of the registered user which serves as a key, an album ID 602 of the album created by the user, and a display ordinal number 603 of the album. Note that with respect to the same user, the user ID 601 and user ID 401 are equal in value.

FIG. 6 is a view showing the album information data table managed by the photosite 105 in this embodiment. When the user creates a new album while using the photosite 105, one record of an album information data table 700 is created and registered in the information database 118 to be managed. When the user deletes this album, the corresponding record is deleted from the information database 118. The album information data table 700 manages, by using an album ID 701 as a key, an album name 702, a file path 703 to a comment on the album, a disclosure permission/inhibition flag 704 for the album, a password permission/inhibition flag 705, an album password 706, a print permission/inhibition flag 707, an original image display permission/inhibition flag 708, and a display form number 709. If the disclosure permission/inhibition flag 704 for the album is 1, it indicates that the album can be disclosed. If this flag is 0, it indicates the inhibition of disclosure. If the flag is −1, it indicates that the disclosure of the album is inhibited by the managing operator of the photosite. If the password permission/inhibition flag 705 is 1, it indicates the presence of a password. If this flag is 0, it indicates the absence of a password. If the password permission/inhibition flag 705 is 1, the password is stored in the album password 706. If the print permission/inhibition flag 707 is 1, it indicates the album can be printed. If this flag is 0, it indicates that the album cannot be printed. If the original image display permission/inhibition flag 708 is 1, it indicates that display operation can be done. If this flag is 0, it indicates that display operation cannot be done. If the display form number 709 is 1, it indicates that the album is displayed in the form of a list. If this flag is 2, it indicates that the album is displayed in detail. Note that with respect to the same album, the value stored in the album ID 701 is equal to that in the album ID 602.

FIG. 7 is a view showing the album image data table managed by the photosite 105 in this embodiment. Every time the user uploads one image onto an album, one record of an album image data table 800 is increased and registered in the information database 118 to be managed. When an image is deleted, the corresponding record is deleted from the information database 118. The data managed in the album image data table 800 include an image ID 802 of an image stored in an album ID 801 and an image display number 803 indicating the display position of the image in the album. Note that with respect to the same album, the ID stored in the album ID 801 is equal to that in the album ID 701.

FIG. 8 is a view the image information data table managed by the photosite 105 in this embodiment. Every time the user uploads an image onto an album, one record of an image information data table 900 is created and registered in the information database 118 to be managed. When an image is deleted, the corresponding record is deleted from the information database 118. The data stored in the image information data table 900 includes, by using an image ID 901 serving as a key, a user ID 902 of the user who owns the image, an image name 903, a file path 904 to the original image, a file path 905 to a thumbnail file, a file path 906 to a display image, a path 907 to a comment file to the image, an image browse count 908, and an image print count 909. With respect to the same image, the value stored in the image ID 901 is equal to that in the image ID 802. With respect to the same user, the value stored in the user ID 902 is equal to that in the user ID 401.

FIG. 9 is a view showing the order information data table managed by the photosite 105 according to this embodiment. When a print order for an album is placed, one record of an order information data table 1000 is created per order and registered in the database 118 to be managed. The data stored in the order information data table 1000 includes, by using an order number 1001 serving as a key which is issued for each print order, an orderer ID 1002, a receiver name 1003, destination zip codes (1, 2) 1004 and 1005, destination municipal code 1006, destination addresses (1, 2) 1007 and 1008, destination telephone numbers (1, 2, 3) 1009, 1010, and 1011, a printsite ID 1012, an order date 1013, and an order status 1014. If the order status 1014 is 0, it indicates that no order has been given to the printsite. If it is 1, it indicates that an order has been given to the printsite. If it is 2, it indicates that delivery has done.

FIG. 10 is a view showing the ordered image data table managed by the photosite 105 according to this embodiment. When a print order for an album is placed, records are created in an ordered image data table 1100 in number equal to the number of images notified from the photosite 105 to the printsite 109 in the process of giving the print order and registered in the database 118 to be managed. The ordered image data table 1100 manages, by using an order number 1101 as a key, a receipt number 1102 of the printsite 109, an image number 1103 managed on a print order basis, file paths 1104, 1105, and 1106 to a thumbnail image copied for a print order, an original image, and an image for preview display, a print count 1107, a print size 1108, a print type 1109, and an image ID 1110. "1", "2", "3", "4", and "5" set in the print size 1108 respectively indicate L size, 2L size, postal card size, postcard size, and A4 size. "0" and "1" set in the print type 1109 respectively indicate a brimless print and brimmed print. With the respect to the same order, the number stored in the order number 1101 is equal to that in the order number 1001. The image ID 1110 indicates the image ID before coping, and in which the same value as that in the image ID 901 is held.

FIG. 11 is a view showing the order settlement data table managed by the photosite 105 according to this embodiment. One record of an order settlement data table 1200 is created per print order for an album and registered in the database 118 to be managed. The order settlement data table 1200 manages, by using an order number 1201 as a key, a settlement method 1202, a total price 1203, a print price 1204, a print price benefit 1205, a print tax charge 1206, a delivery charge 1207, a delivery tax charge 1208, a photosite benefit 1209, and a status 1210. In the settlement method 1202, "1" indicates transfer; "2", cash on delivery; and "3", "credit settlement". This embodiment will exemplify only the flow of processing for credit settlement. If the status 1210 is 0, it indicates the completion of settlement. If this status is 1, it indicates an incomplete transaction. With respect to the same order, the value stored as the order number 1201 is equal to that stored as the order number 1001.

FIG. 12 is a view showing the orderer data table managed by the photosite 105 according to this embodiment. One record of an orderer data table 1300 is created per print order for an album and registered in the database 118 to be managed. The orderer data table 1300 manages, by using an orderer ID 1301 as a key, a user ID 1302, a notification destination mail address 1303, a name (last name) 1304, a name (first name) 1305, a phonetic transcriptions in kana (last name) 1306, phonetic transcriptions in kana (first name) 1307, zip codes (1, 2) 1308 and 1309, a municipal division code 1310, addresses (1, 2) 1311 and 1312, and telephone numbers (1, 2, 3) 1313, 1314, and 1315. If the orderer is not a registered user of the photosite, 0 is assigned to the user ID 1302. With respect to the same order, the ID stored in the orderer ID 1301 is identical to that in the orderer ID 1002. If the orderer is a member of the photosite, the same ID is stored in the user ID 1302 and user ID 401 with respect to the same orderer. In this case, as the respective pieces of user information in the fields 1303 to 1315, the values input as the corresponding pieces of user information in the customer information data table 400 having the same user ID 401 are copied.

FIG. 13 is a view showing the printsite data table managed by the photosite 105 according to this embodiment. When a new printsite that can be connected to the photosite 105 is constructed, a new record of a printsite data table 1400 is created and registered in the database 118 to be managed. The printsite data table 1400 manages, by using a printsite ID 1401 as a key, a provider name 1402, a URL 1403 to a CGI (Common Gateway Interface) for notifying a temporary print order, a URL 1404 to a CGI for notifying a formal print order, and a URL 1405 to a CGI for order cancellation.

FIGS. 14 to 17 are views showing the contents of databases 119A, 119B, and 119C managed by the printsites 109A, 109B, and 109C in this embodiment. Note that since the printsites 109B and 109C have the same arrangement as that of the printsite 109A, only the arrangement of the printsite 109A will be described below.

FIG. 14 is a view showing the contents of the database for managing the information of the photosite 105 which the printsite 109A has in this embodiment. When a photosite 105 which can give an order to the printsite 109A is constructed, a new record of a photosite data table 1500 is created and registered in the database 119A. The photosite data table 1500 manages a photosite ID 1501, a photosite name 1502, a URL 1503 to a CGI for notifying an estimate, a URL 1504 to a CGI for notifying exceptional processing such as deletion of an order or changing of a price, and a URL 1505 to a CGI for notifying a print status.

FIG. 15 is a view showing the contents of an order data table which the printsite 109A according to this embodiment has. Every time a temporary print order is issued from the photosite 105, one record of an order data table 1600 is created and registered in the database 119A to be managed. When the photosite 105 notifies an order delete request for this record, it is deleted from the database 119A. The order data table 1600 in the printsite 109A manages a receipt number 1601, a photosite ID 1602 of the photosite 105 which has issued an order, an order number 1603 of the photosite 105, a temporary print order date 1604, a formal print order date 1605, an order status 1606, a print type 1607 to be set when a print order is placed, a print price 1608, a printsite bargain price 1609, a print tax charge 1610, a delivery charge 1611, a delivery tax charge 1612, and a total price 1613. If the order status 1606 is 0, it indicates a temporary print order. If this status is 1, it indicates that a formal print order is placed but printing has not been done. If the status is 2, it indicates that a formal print order is placed and printing has been done. It the status is 3, it indicates that delivery has been done. If the status 4, it indicates that settlement has been made. If the print type 1607 is 0, it indicates a brimless print. If it is 1, it indicates a brimmed print.

FIG. 16 is a view showing the contents of a print image information table 1700 which the printsite 109A according to this embodiment has. When a temporary print order is issued from the photosite 105, records of a print image information table 1700 which the printsite 109A has are created in number corresponding to the image information contained in the order and registered in the database 119A to be managed. When an order delete request is notified from the photosite 105, the corresponding record is deleted from the database 119A. The print image information table 1700 in the printsite manages a receipt number 1701, an image number 1702, a URL 1703 on the photosite 105 which is used to acquire a print image file, a URL 1704 on the photosite 105 which is used to acquire a preview display image file, a URL 1705 on the photosite 105 which is used to acquire a thumbnail image file to be displayed on a print order window when a temporary print order is placed, a print count 1706, a print size 1707, a print status 1708, and a print unit price 1709. The images sent from the photosite 105 are numbered when a temporary print order is placed, with the first image being numbered 1. This number is stored in the image number 1702. "1", "2", "3", "4", and "5" set in the print size 1707 respectively indicate L size, 2L size, postal card size, postcard size, and A4 size. If the print status 1708 is 0, it indicates that the image has not been printed. If this status is 1, it indicates that the image has been printed. With respect to the same print order, the number stored in the receipt number 1701 is equal to that in the receipt number 1601.

FIG. 17 is a view showing the contents of an order delivery table which a printsite has. When a formal print order is notified from the photosite 105, one record of an order delivery table 1800 is created and registered in the database 119A to be managed. The order delivery table 1800 in the printsite manages an order number 1801, a receiver name 1802, destination zip codes (1, 2) 1803 and 1804, a destination municipal code 1805, destination addresses (1, 2) 1806 and 1807, destination telephone numbers (1, 2, 3) 1808, 1809, and 1810, a delivery date 1811, and a status 1812. If the status 1812 is 0, it indicates that delivery has not been done. If this status is 1, it indicates that delivery has been done.

<Outline of Services>

The following services can be realized by the above system according to this embodiment:

(1) user registration: performing registration for the use of the photosite 105 by using the user PC 102A and making the photosite 105 issue a user ID to the registered user;

(2) image data upload: transferring images from the user PC 102A to the photosite 105;

(3) print order: sending an instruction to print image data from the user PC 102A to the photosite 105 and printing an image through the printsite 109A;

(4) notification of browse permission: sending e-mail from the user PC 102A to the user PC 102B to permit the browsing of image data stored in the photosite 105;

(5) browsing of image data: allowing a user to browse image data stored in the photosite 105 through the user PC 102B; and (6) browsing of images from portable terminal: allowing a user to browse image data stored in the photosite 105 through the portable terminal 113A.

The contents of the respective services will be described in detail below. Note that the services and functions realized by the system according to this embodiment are not limited those described above.

<Entrance of Photosite>

Figure 18:
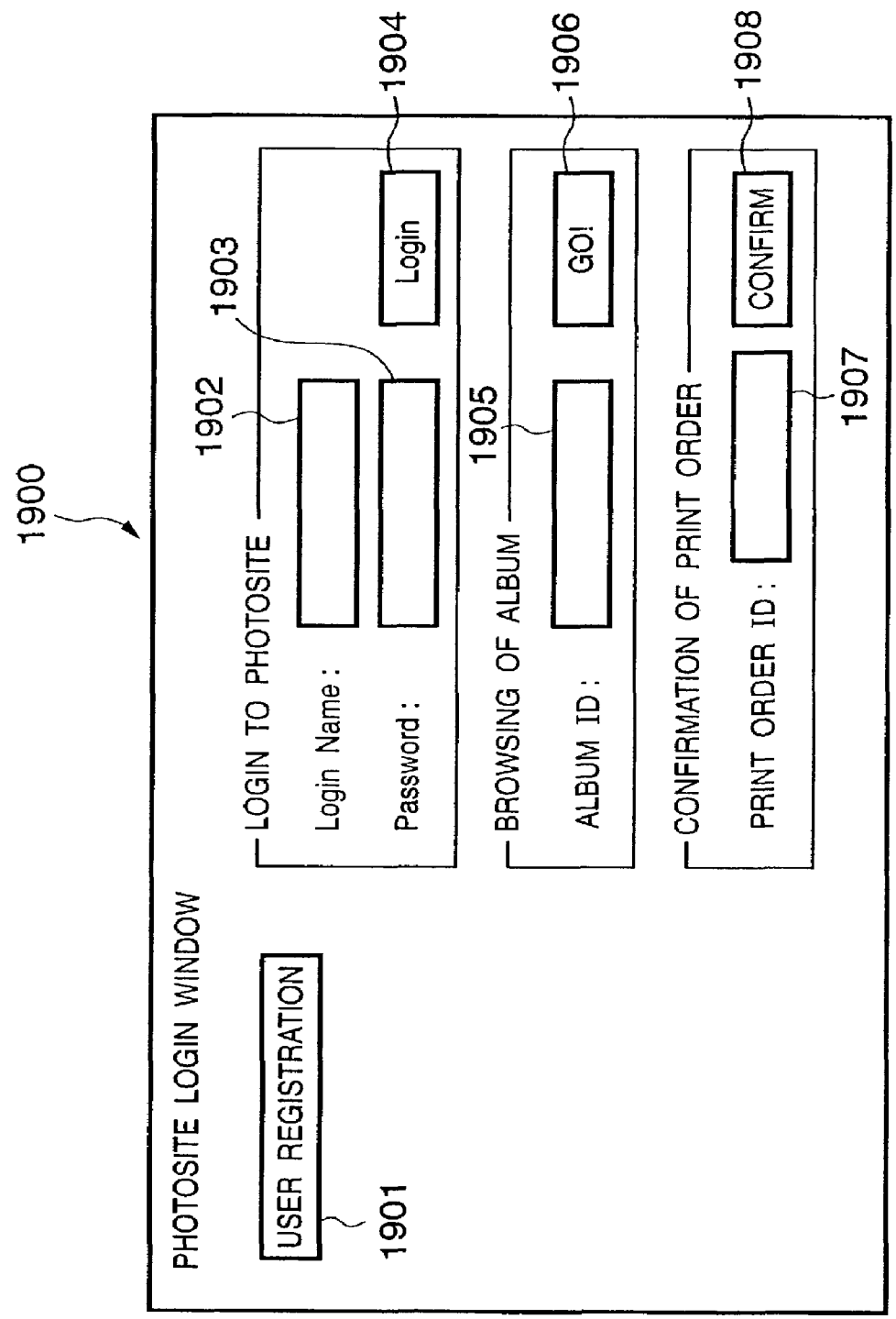
FIG. 18 is a view showing an example of the window to be displayed when a server service is started in the photosite according to the embodiment of the present invention.

FIG. 18 shows an example of the window to be displayed first when a user tries to receive a service from the photosite 105 according to this embodiment.

HTML data for displaying a window 1900 is stored in a storage medium in the photosite 105. This data can be freely downloaded through the Internet 104. When, therefore, the user activates the Web browser 120A in the user PC 102A and designates a URL representing the address of a Web server, the window 1900 shown in FIG. 18 is displayed.

The areas and buttons arranged on the window 1900 are a user registration button 1901, a login name input area 1902 which is used when the user having undergone user registration uses the photosite 105, a password input area 1903, a login button 1904, an album ID input area 1905 for album browsing, an album browse button 1906, a print order ID input area 1907 for checking the status of a print order, and a print order confirmation button 1908.

The processing to be performed when each button on the window 1900 is pressed will be described below.

<User Registration>

Figure 19:
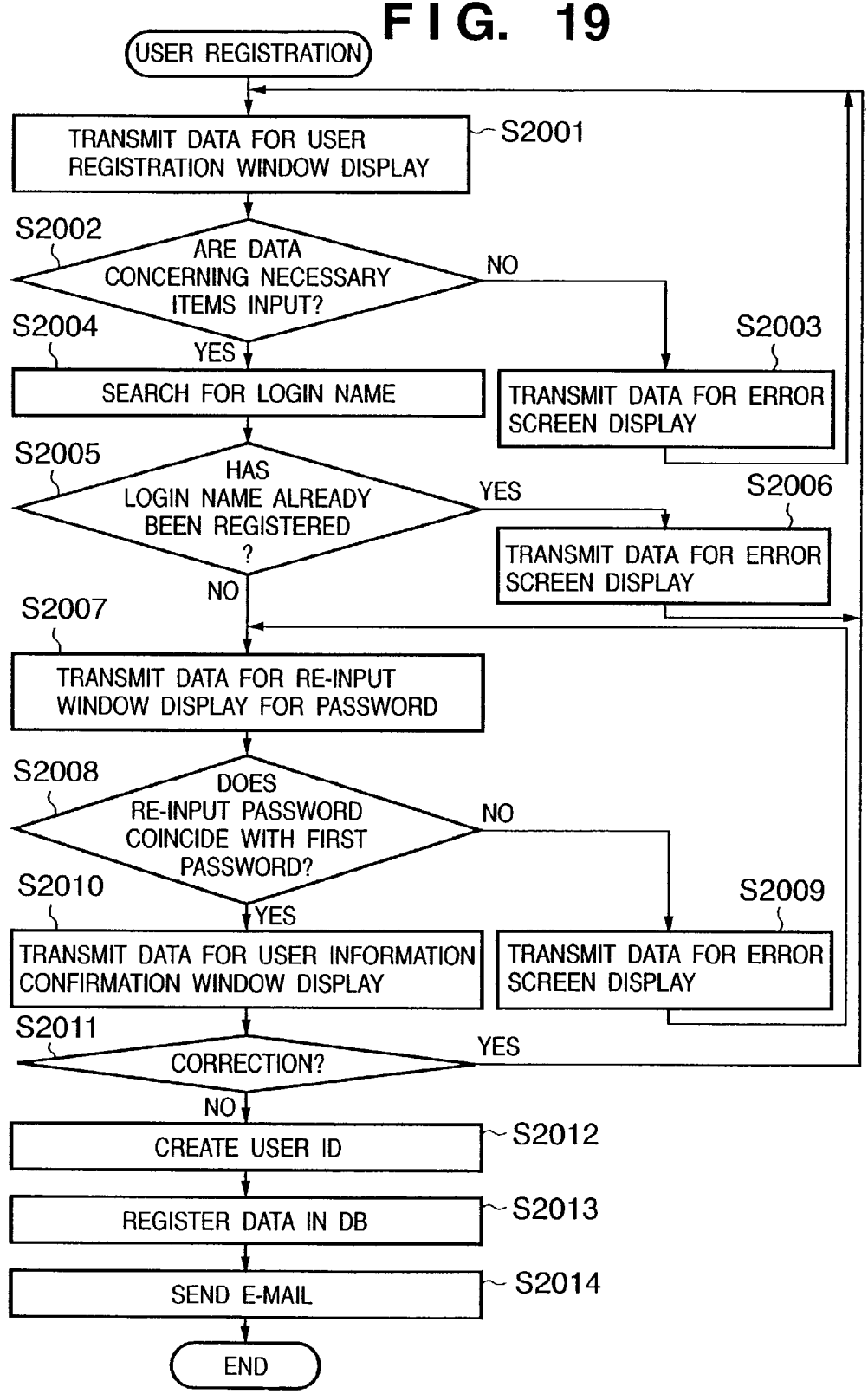
FIG. 19 is a flow chart showing processing in the photosite when user registration is performed with respect to the information providing system according to the embodiment of the present invention.

A procedure for user registration will be described first. When the user registration button 1901 on the window 1900 is pressed, the processing shown in the flow chart of FIG. 19 is performed. FIG. 19 shows the flow chart representing processing in the photosite 105 at the time of user registration. When the user registration button 1901 on the window 1900 is pressed, a window 2100 shown in FIG. 20 is displayed, and user registration processing is started (step S2001).

The window shown in FIG. 20 is a window for performing user registration in this embodiment. This window includes a notification destination address input area 2101 for a user to be registered, a login name input area 2102 for the user, a password input area 2103, name input areas 2104 and 2105, input areas 2106 and 2107 for the phonetic transcriptions of the name in kana, zip code input areas 2108 and 2109 for the user to be registered, a municipal division selection area 2110, address input areas 2111 and 2112, and telephone number input areas 2113, 2114, and 2115. Although not shown in FIG. 19, when a cancel button 2117 is pressed, the window 1900 is restored without performing user registration processing.

When the registration button 2116 is pressed, it is checked in step S2002 whether data concerning necessary items have been input. Assume that in this embodiment, the necessary items are the mail address 2101, login name 2102, password 2103, name (2104 and 2105), and telephone numbers 2113, 2114, and 2115.

Figure 21:
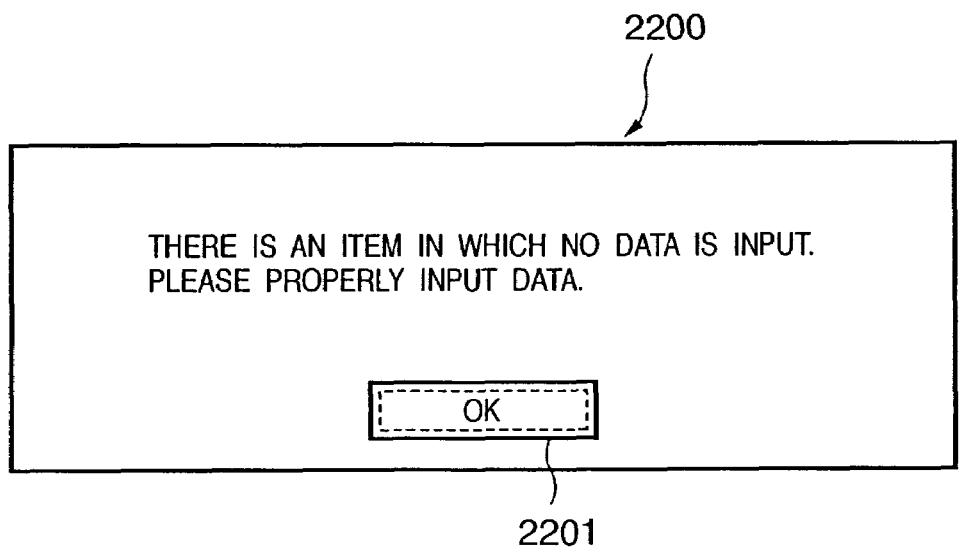
FIG. 21 is a view showing the error window to be displayed when data concerning a necessary item is not input at the time of user registration in the photosite according to the embodiment of the present invention.

If it is determined that data concerning the necessary items have not been completely input in the photosite 105, an error window is displayed in step S2003. FIG. 21 is a view showing an error window 2200 to be displayed at this time. When an OK button 2201 is pressed, the window 2100 is displayed again.

If it is determined in step S2002 that data concerning the necessary items have been input, the photosite 105 searches the customer information data table 400 in the database 118 (step S2004) to check whether the login name input in the input area 2102 has already been used (step S2005).

Figure 22:
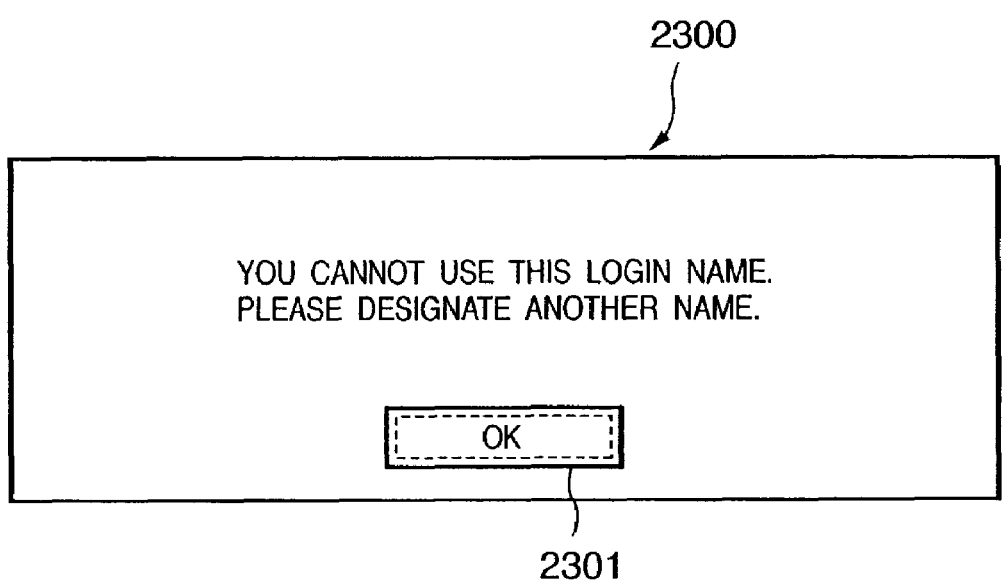
FIG. 22 is a view showing an example of the error window to be displayed when a login name has already been registered at the time of user registration in the photosite according to the present invention.

If the login name input in the input area 2102 has already been used, an error window is displayed in step S2006. FIG. 22 shows an error window 2300 displayed at this time. If an OK button 2301 is pressed, the window 2100 is displayed again.

Figure 23:
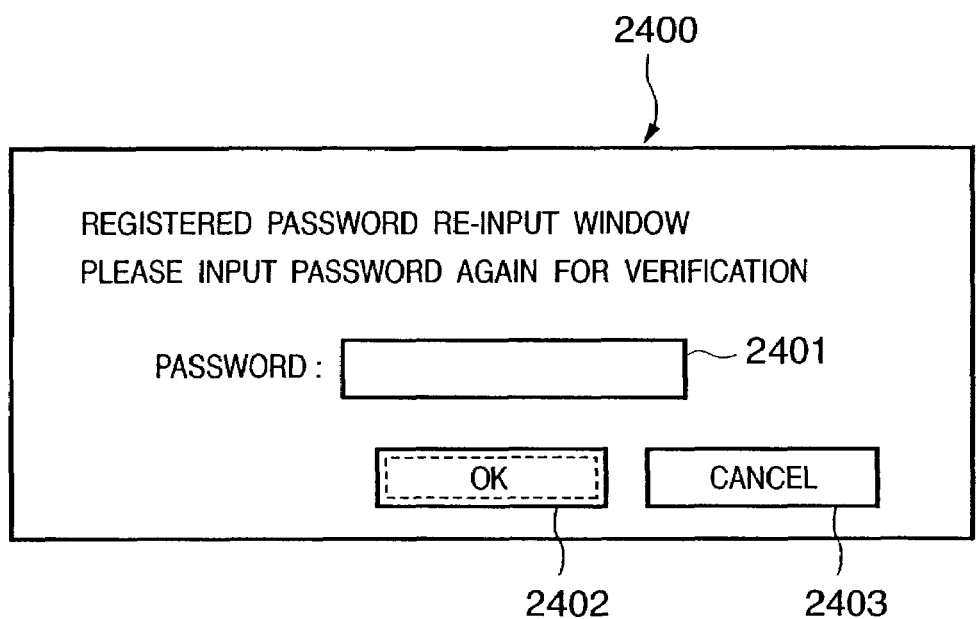
FIG. 23 is a view showing a window for prompting a user to input a password again at the time of user registration in the photosite according to the embodiment of the present invention.

If the login name input in the input area 2102 is not found in the database 118, a window 2400 shown in FIG. 23 is displayed to prompt the user to input a password again (step S2007). If a cancel button 2403 is pressed, the registration processing is interrupted, and the window 2100 is displayed, although not shown in FIG. 19.

If an OK button 2402 is pressed, it is checked whether the password input in a password input area 2401 coincides with the password input in the password input area 2103 on the window 2100 (step S2008).

Figure 24:
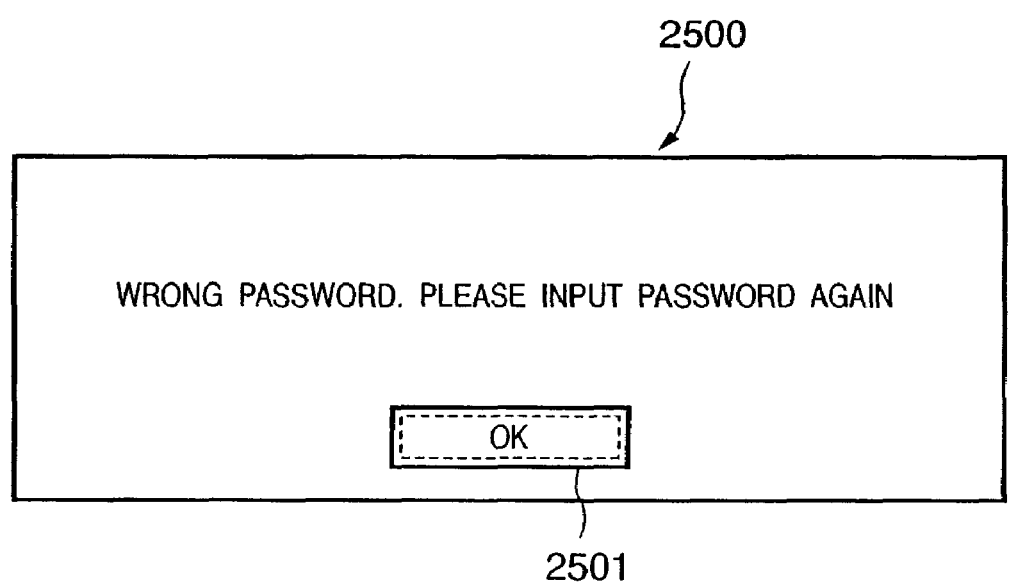
FIG. 24 is a view showing an example of the warning window to be displayed when a password is wrong at the time of user registration in the information providing system according to the embodiment of the present invention.

If it is determined in step S2008 that the input password differs from the input characters, an error window 2500 shown in FIG. 24 is displayed (step S2009). If an OK button 2501 on this window is pressed, the window 2400 is displayed again.

Figure 25:
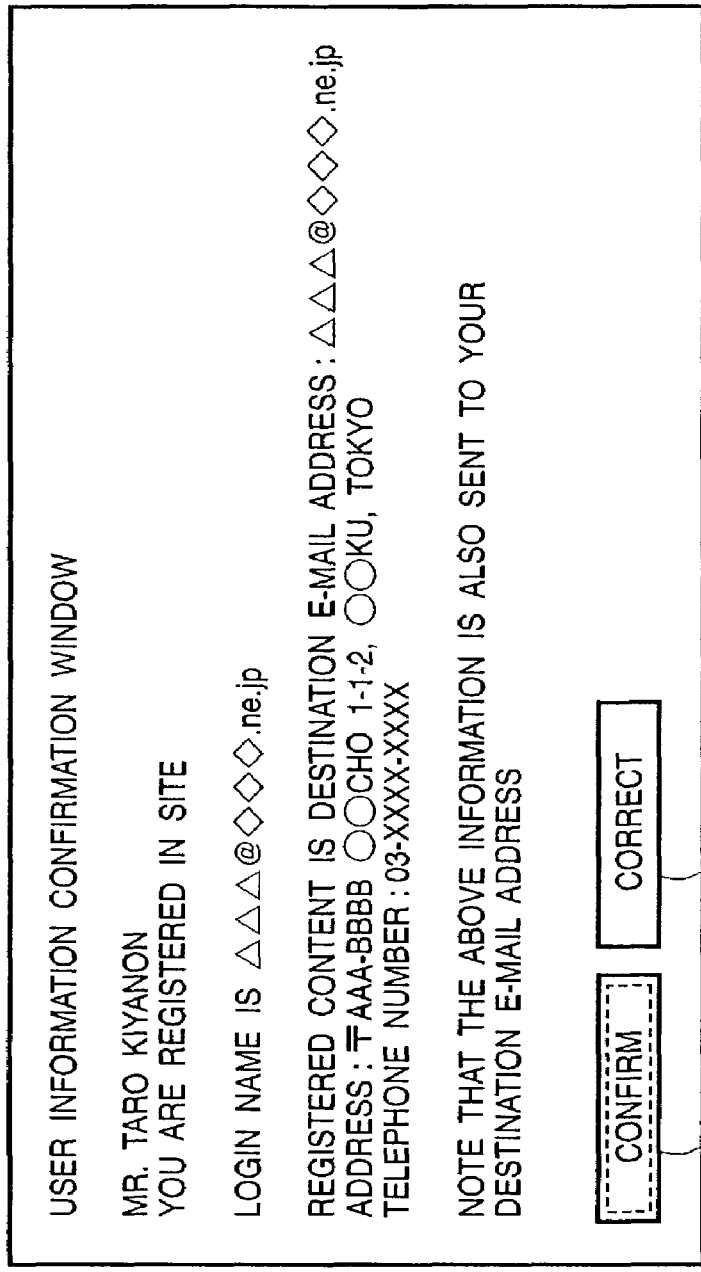
FIG. 25 is a view showing a user registration confirmation window in the photosite according to the embodiment of the present invention.

If it is determined in step S2008 that the input passwords coincide with each other, the flow advances to step S2010 to display a user information confirmation window 2600 shown in FIG. 25, determining that all the information necessary for user registration is input. The information displayed on the window 2100 is the information input by the user. If a correction button 2602 is pressed, the flow returns to step S2001 to display the window 2100 again to allow the user to edit input information.

If a confirmation button 2601 is pressed, the maximum value of the values of user IDs issued in the past is acquired from the customer information data table 400 in the database 118. The value obtained by adding 1 to the acquired value is the user ID of the user to be newly registered (step S2012).

In step S2013, a new customer information data table 400 is created on the basis of the user ID obtained in step S2012, and the information input on the window 2100 is registered in the customer information data table 400. That is, the contents of the input areas 2101, 2102, 2103, 2104, 2105, 2106, 2107, 2108, 2109, 2110, 2111, 21112, 2114, and 2115 shown in FIG. 20 are respectively stored in the fields 402, 403, 404, 405, 406, 407, 408, 409, 410, 411, 412, 413, 414, 415, and 416 shown in FIG. 3. In addition, the user registration state 417 is set to 1.

When a user is newly registered, there are no album created by the user or uploaded image. When a user is newly registered, one each of record of the customer album data table 600 shown in FIG. 5 and album information data table 700 shown in FIG. 6 may be created and registered in the database 118 in advance. In this case, the value obtained by adding one to the maximum value of the album IDs that have been issued so far by the database 118 is set in the album ID 602. In addition, 1 is set in the display ordinal number 603, and a temporary album name, e.g., "my album", may be set as a default. In addition, obviously, the initial values determined by the photosite 105 are set in the album information data table 700.

When registration in the database 118 is completed, e-mail having the same contents as those displayed on the window 2600 in FIG. 25 is created and transmitted to the e-mail address registered in the customer information data table 400 in FIG. 3 (step S2014). FIG. 26 shows an example of the contents of the e-mail issued at this time.

<Login>

A procedure for allowing a user having undergone user registration for the photosite 105 to actually receive a service from the photosite 105 will be described next. Assume that in this embodiment, all the images uploaded by users are managed in the photosite 105 on a folder (called an album) basis.

Figure 27:
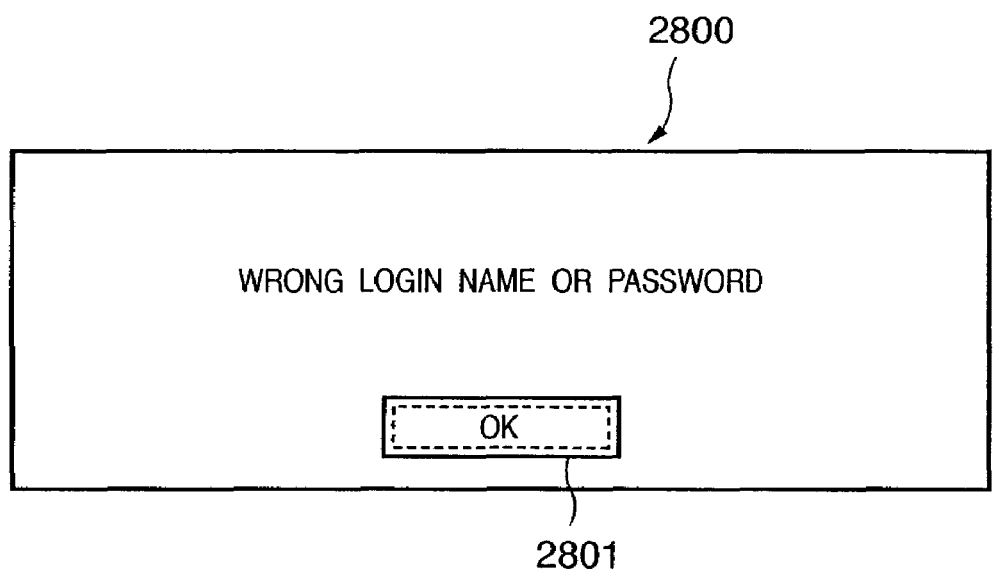
FIG. 27 is a view showing an example of the window to be displayed when the user fails to log in on a service start window in the photosite according to the embodiment of the present invention.

When the user inputs a login name and password in the login name input area 1902 and password input area 1903, respectively, and presses the login button 1904, the photosite 105 searches the customer information data table 400 in the database 118. Assume that no corresponding login name is found in the customer information data table 400 or the password in the found record differs from the character string input in the password input area 1903. In this case, a warning window 2800 shown in FIG. 27 is displayed. If a button 2801 is pressed at this time, the window 1900 is displayed again.

Figure 28:
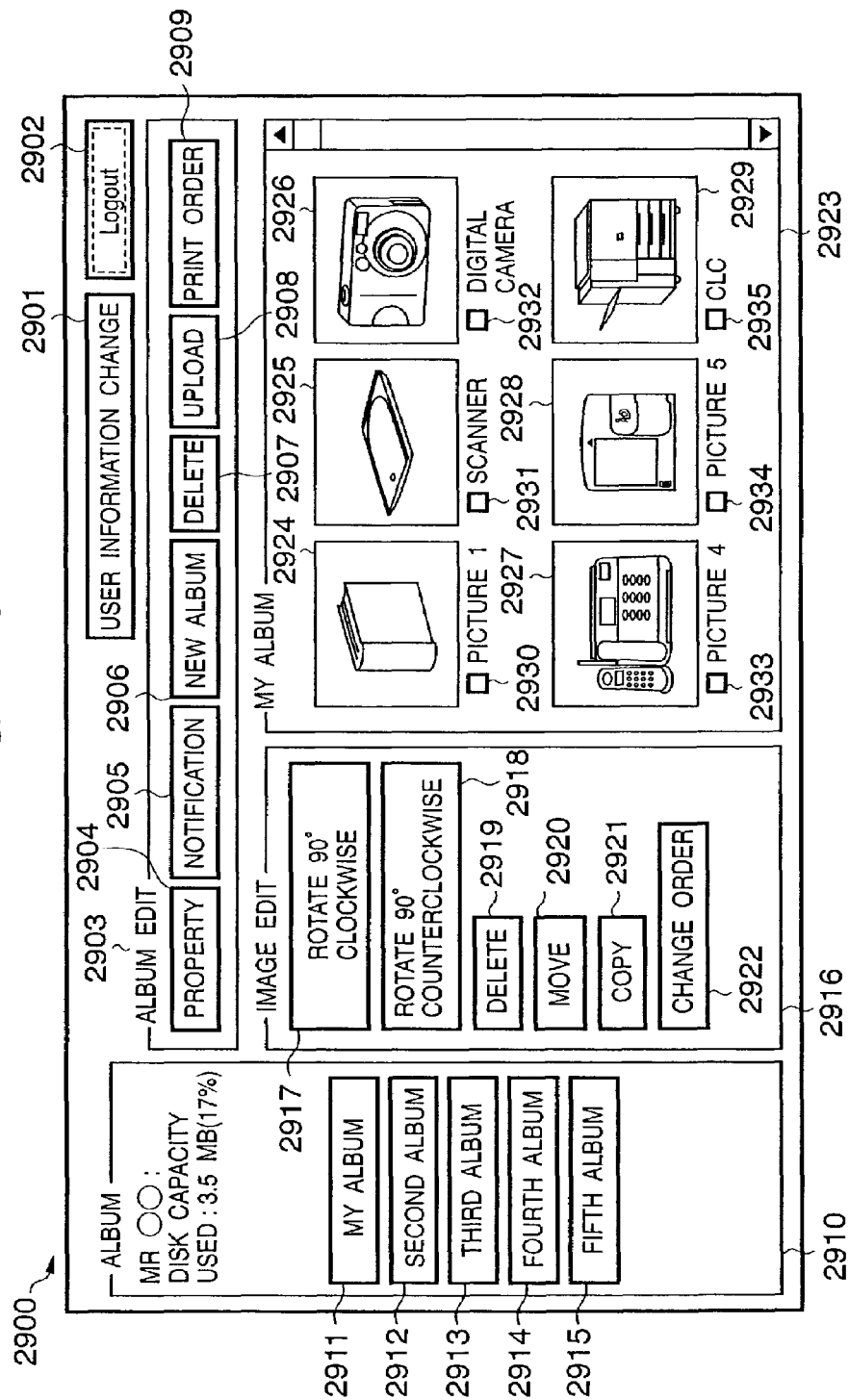
FIG. 28 is a view showing the window to be displayed when the user properly logs in to the photosite according to the embodiment of the present invention.

If the password for the found record coincides with the character string input in the input area 1903, it is determined that the photosite input user is properly authenticated, and a window 2900 shown in FIG. 28 is displayed.

On the window 2900, a button 2901 is a button for changing user information. A button 2902 is a logout button. Buttons for edit operation for the album displayed on this window are arranged in an area 2903. A button 2904 is a button for setting the properties of an album. A button 2905 is an album notification button. A button 2906 is a button for newly creating an album. A button 2907 is a button for deleting an album. A button 2908 is a button for uploading image data. A button 2909 is a print order button. An area 2910 is an area in which buttons for album selection are displayed. On the head portion of this area, the data sizes of images stored in the photosite are displayed, together with its ratio to the allowable capacity. Buttons equal in number to the albums created by the user are arranged below the head portion.

Referring to FIG. 28, buttons 2911 to 2915 indicate that five albums were created by the user. When a given one of the buttons is pressed, the photosite 105 changes the images displayed in an album display area 2923 in accordance with the selected album, and displays the album name of the album on the upper left end of the album display area. An area 2916 is an area in which buttons for editing the respective images in the album are arranged. When a given one of buttons 2917 to 2922 is pressed, edit processing corresponding to the pressed button is performed for one of the images displayed in the album display area 2923 which corresponds the check box that is checked. The area 2923 is an album image display area. In this area, the images stored in the album are sequentially displayed, and check boxes corresponding to the images are arranged. When a displayed image is pressed, a property setting window for the image is displayed.

Figure 29:
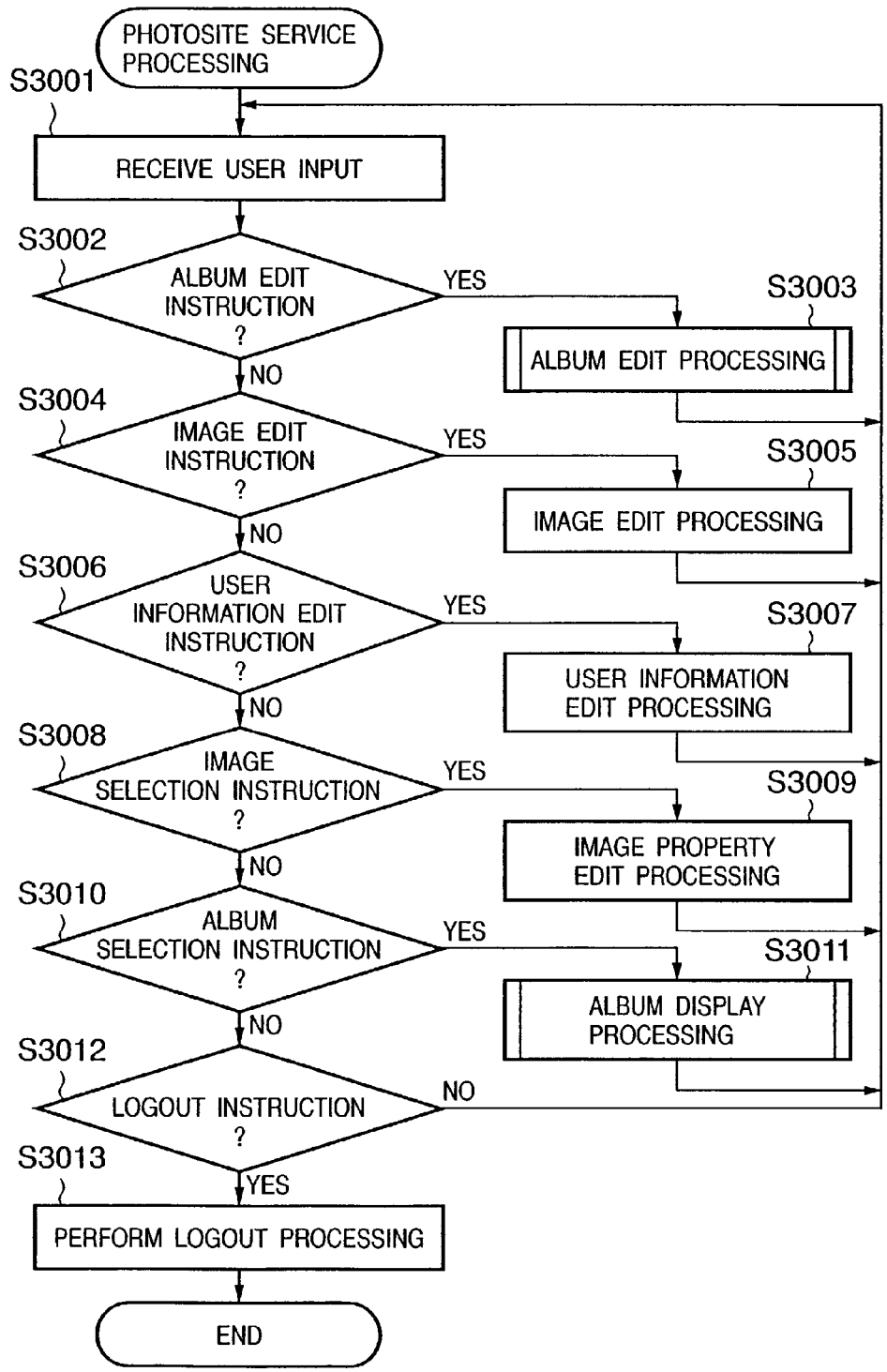
FIG. 29 is a flow chart showing processing associated with edit operation by the user in the photosite according to the embodiment of the present invention.

FIG. 29 is a flow chart showing a processing method for edit operation by a user after the window 2900 in FIG. 28 is displayed. The following processing is performed in accordance with user operation on the window 2900.

When a user input is received in step S3001, it is checked in step S3002 whether the user input is an album edit instruction. If a button in the area 2903 on the window 2900 is pressed, it is determined that the input is an album edit instruction. In this case, the flow advances to album edit processing in step S3003.

If it is determined in step S3002 that the user instruction is not an album edit instruction, the flow advances to step S3004 to check whether the user input is an image edit instruction. If a button in the area 2916 on the window 2900 is pressed, it is determined that the input is an image edit instruction, and the flow advances to step S3005. In step S3005, processing like rotating 90° clockwise/counterclockwise, deleting, moving, copying, or changing the order is performed for the image selected in the album.

If it is determined in step S3004 that the user input is not an image edit instruction, the flow advances to step S3006 to check whether the user input is a user information edit instruction. When the button 2901 on the window 2900 is pressed, it is determined that the input is a user information edit instruction. When this button is pressed, the window 2100 shown in FIG. 20 is displayed in step S3007 to allow the user to change the registered information. The user information edit processing in this case is almost the same as the user registration processing described in <User Registration> except that the pieces of information registered by the user are displayed as initial values when the window is displayed, the window 2900 is displayed when the registration button 2116 or cancel button 2117 is pressed, and registration of user information in the database amounts to the updating of existing user information instead of the registration of new information.

If it is determined in step S3006 that the user input is not a user information edit instruction, the flow advances to step S3008 to check whether the user input is an image selection instruction. If the user selects an image in the area 2923 on the window 2900 by, for example, clicking on the image with a mouse, it is determined that an image is selected, and the flow advances to image property edit processing in step S3009. As image property edit processing, editing of an image file or comment can be done.

If it is determined in step S3008 that the user instruction is not an image selection instruction, the flow advances to step S3010 to check whether the user instruction is an album selection instruction. If a button in the area 2910 on the window 2900 is pressed, it is determined that an album is selected, and album display processing in step S3011 is performed.

If it is determined in step S3010 that the user input is not an album selection instruction, it is checked in step S3012 whether the user instruction is a logout instruction. If the button 2902 on the window 2900 is pressed, it is determined that the user input is a logout instruction, and the flow advances to step S3010 to perform logout processing. In performing logout processing, the photosite 105 registers the currently displayed album ID in the last display album ID 502 in the customer state data table 500 in the database 118, thus updating the album ID. The displayed window is then restored to the window 1900.

If it is determined in step S3012 that the user input is not a logout instruction, the flow returns to step S3001 to wait for the next user input.

Step S3003 (album edit processing) and step S3011 (album display processing) will be described in detail below.

[Album Edit Processing]

Figure 30:
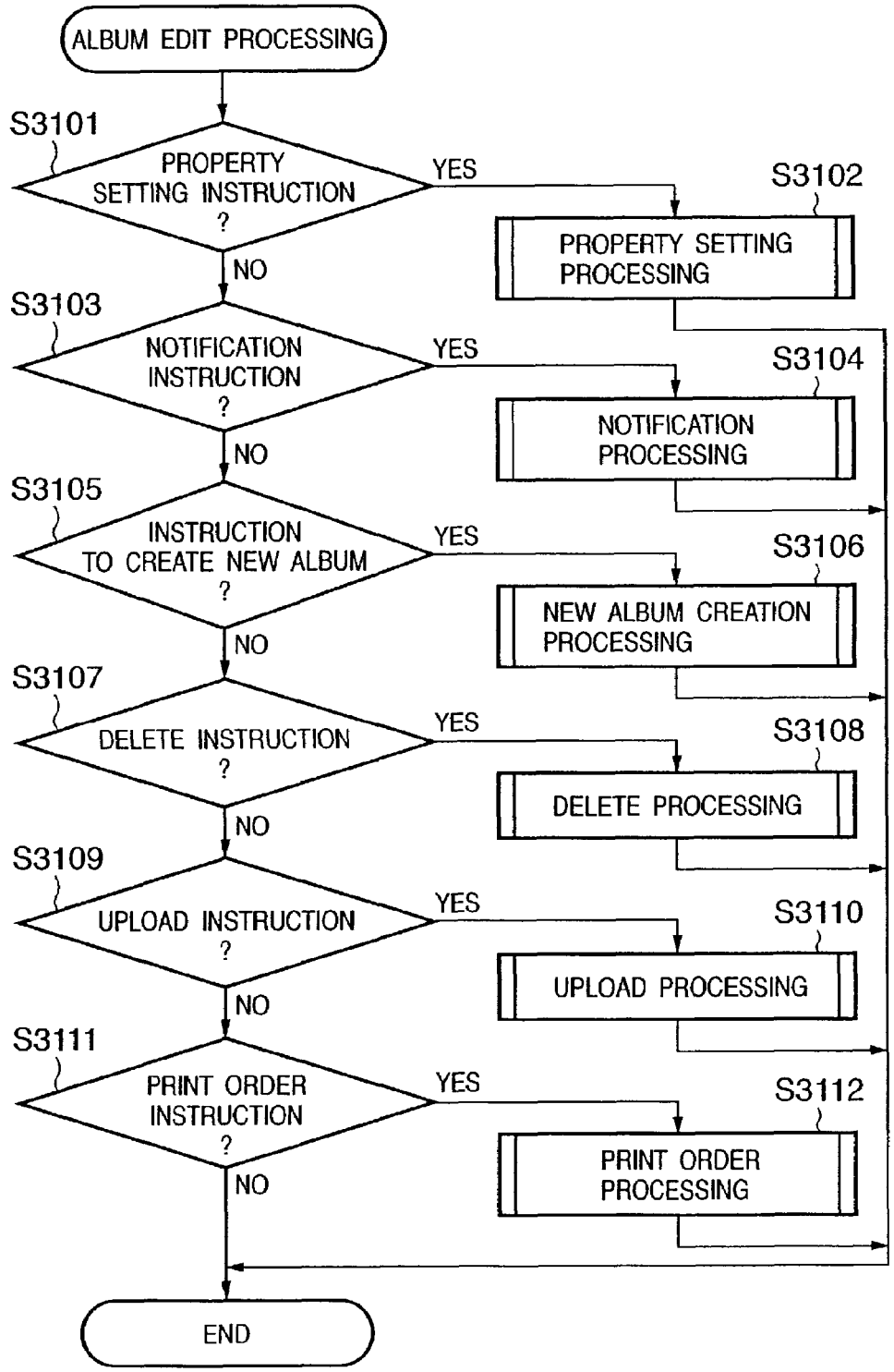
FIG. 30 is a flow chart showing a procedure for album edit processing in the photosite according to the embodiment of the present invention.

FIG. 30 is a flow chart showing a procedure for album edit processing in the photosite 105.

Figure 31:
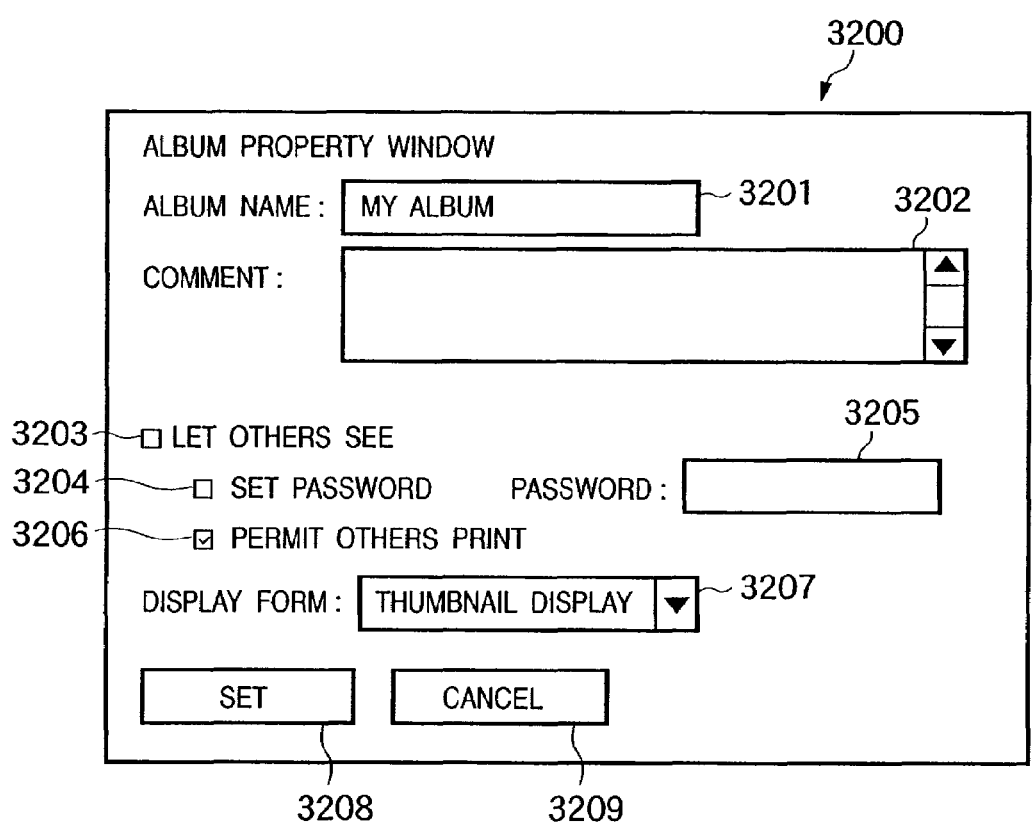
FIG. 31 is a view showing an album property setting window in the photosite according to the embodiment of the present invention.

It is checked in step S3101 whether property setting is selected. If the button 2904 on the window 2900 is pressed, it is determined that property setting is selected, and the flow advances to step S3102 to display a window 3200 shown in FIG. 31 to allow the user to set various attributes associated with the selected album (the album displayed in the album display area 2923 in FIG. 29 immediately before this operation).

If it is determined in step S3101 that property setting is not selected, the flow advances to step S3103 to check whether album notification is selected. If the button 2905 on the window 2900 is pressed, it is determined that album notification is selected, and the flow advances to step S3104 to display a window 3300 shown in FIG. 32 to allow the user to make settings to notify, by e-mail, the third party of a method of browsing the selected album.

If it is determined in step S3103 that album notification is not selected, it is checked in step S3105 whether creation of a new album is selected. If the button 2906 on the window 2900 is pressed, it is determined that creation of a new album is selected, and the flow advances to step S3106 to display a window 3200 shown in FIG. 31. If a new album name (an album name that has not been registered by the login user) is input in an album name input area 3201 on the window 3200 and a setting button 3208 is pressed, a new album is created.

Figure 33:
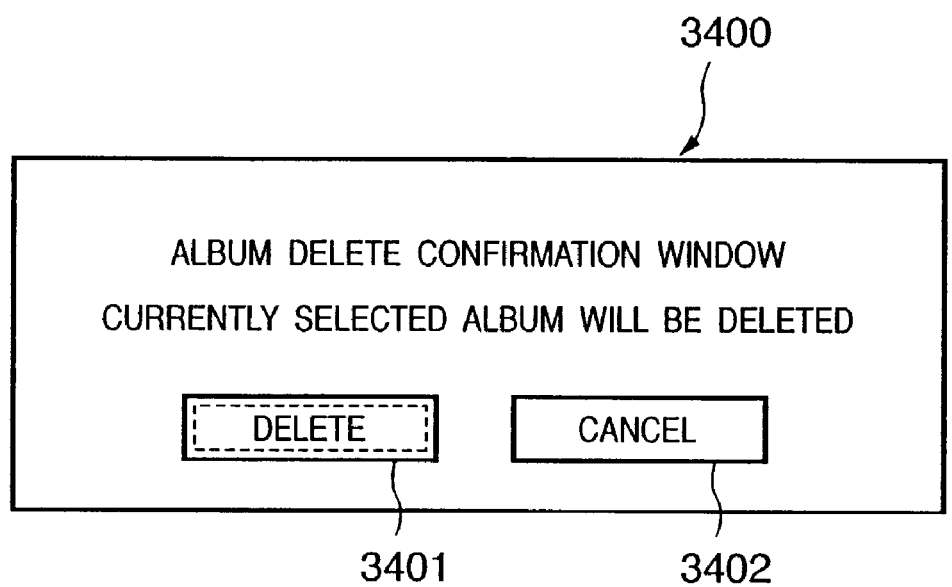
FIG. 33 is a view showing an album delete confirmation window in the photosite according to the embodiment of the present invention.

If it is determined in step S3105 that creation of a new album is not selected, it is checked in step S3107 whether deletion of an album is selected. If the button 2907 on the window 2900 is pressed, it is determined that deletion of an album is selected, and the flow advances to step S3108. If the button 2907 is pressed, a window 3400 shown in FIG. 33 is displayed to allow the user to delete the selected album.

If it is determined in step S3107 that deletion of an album is not selected, it is checked in step S3109 whether uploading of an image to a selected album is selected. If the button 2908 on the window 2900 is pressed, it is determined that uploading of an image is selected, and the flow advances to step S3110 to perform upload processing.

If it is determined in step S3109 that uploading of an image to an album is not selected, it is checked in step S3111 whether print order processing for an album is selected. If the button 2909 on the window 2900 is pressed, it is determined that print order processing for an album is selected, and the flow advances to step S3112 to perform print order processing.

[Album Display Processing]

Figure 34:
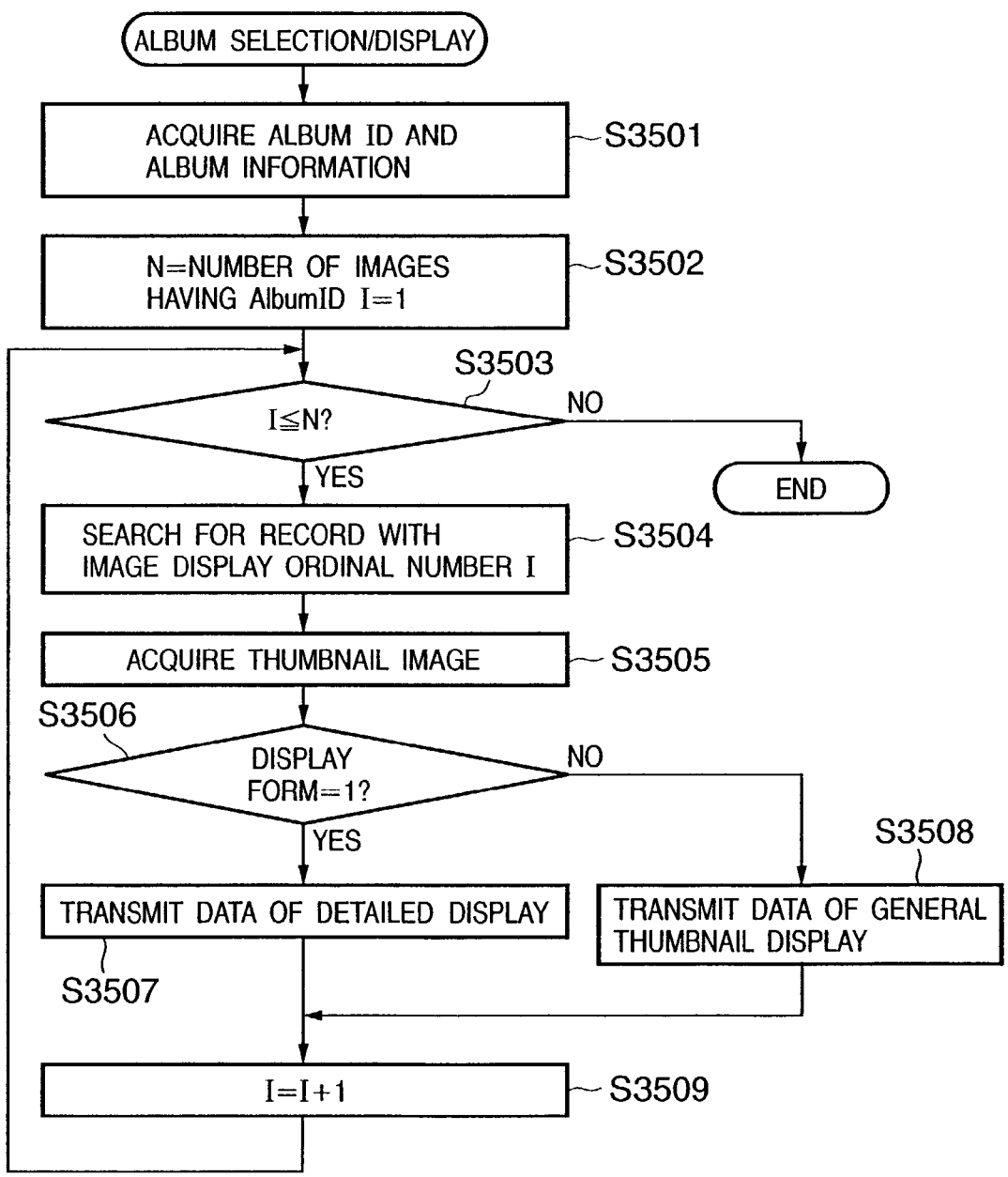
FIG. 34 is a flow chart showing processing associated with album selection and display when one of album selection buttons is pressed in the photosite according to the embodiment of the present invention.

FIG. 34 is a flow chart showing processing associated with selection and display of an album when one of the album selection buttons 2911 to 2915 in the album selection area 2910 on the window 2900 is pressed.

It is checked in step S3501 which ordinal number the pressed button has with respect to the head of the group of buttons, and the database 118 is searched for the customer album data table 600 having this number in the display ordinal number 603. The album ID 601 is then acquired as AlbumID. The album information data table 700 is specified from the album ID 601, thereby deriving album information.

In step S3502, the database 118 is searched for all the records in the album image data table 800 having AlbumID obtained in step S3501 in the album ID 801. The number of hits, i.e., found records, is represented by N, and 1 is assigned to an image count process variable I.

It is checked in step S3503 whether I≦N. The processing from step S3504 to step S3509 is repeated while I≦N, thus displaying all the images within the album.

In step S3504, the album image data table 800 having I in the image display number 803 is searched with the records found in the step S3502, and the image ID 802 of the image is obtained. When the image ID 802 is obtained, the database 118 is searched for a record in the image information data table 900 having the image ID 802 in the image ID 901.

In step S3505, the path 905 to a thumbnail file of images is acquired from the record found in step S3504.

In step S3506, it is checked whether the value of the display form number 709 in the album information data table 700 acquired in step S3501 is 1. In this embodiment, if this value is 0, it indicates thumbnail display. If the value is 1, it indicates detailed display.

Figure 35:
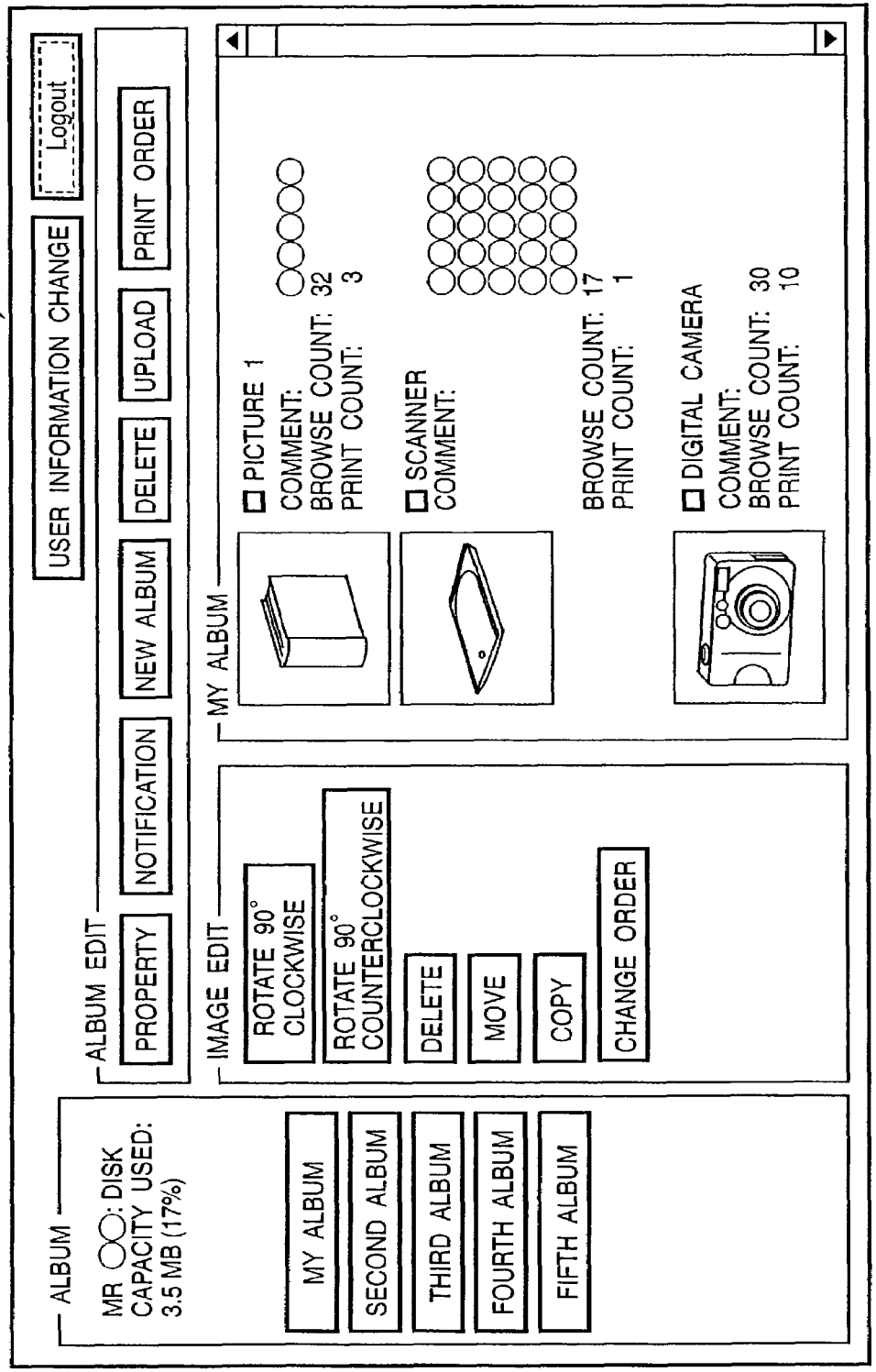
FIG. 35 is a view showing an example of an album detailed display window in the photosite according to the embodiment of the present invention.

If the display form number 709 is 1 in step S3506, the thumbnail images and the detailed information associated with the images are displayed in step S3507. In this embodiment, as the detailed information, the image names, comments, browse counts, and print counts from the image information data table 900 are displayed, together with check boxes for image edit processing. A window 3600 shown in FIG. 35 is an example of album display when detailed display is performed. Since this window 3600 is the same in function as the window 2900 except for the display method of the album display area 2923, a detailed description thereof will be omitted.

If it is determined in step S3506 that the display form number 709 is not 1, thumbnail images, image names, and image edit check boxes are displayed in step S3508. The window 2900 shown in FIG. 28 is an example of such a simple display.

If it is determined in step S3503 that I>N, since all the images in the album are displayed, the processing is terminated.

In the above embodiment, only the two display forms are described. Obviously, however, more display forms may be used.

<Image Upload>

Figure 36:
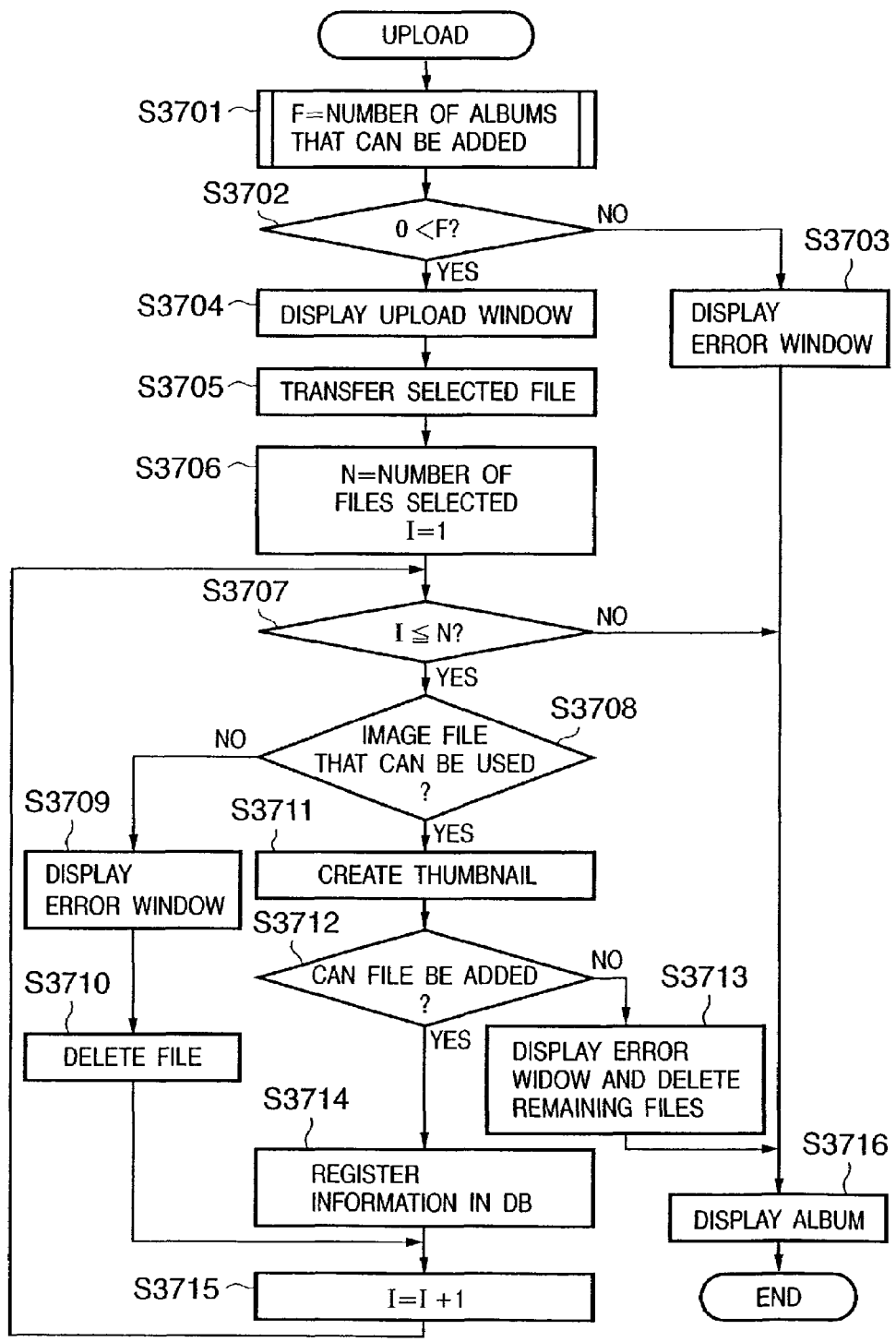
FIG. 36 is a flow chart showing a procedure for uploading images to a currently displayed/edited album in the photosite according to the embodiment of the present invention.

Image upload processing with respect to a selected album will be described next. When the upload button 2908 on the window 2900 is pressed, image upload processing is started. FIG. 36 is a flow chart showing the flow of the processing of uploading images to a selected album.

First of all, when the button 2908 on the window 2900 is pressed, the photosite 105 calculates the number of files (Files) which the login user can add in the photosite 105. Since the resources of the photosite 105 are limited, each login user can store images only to a predetermined capacity. No image file can be uploaded beyond this capacity.

Figure 37:
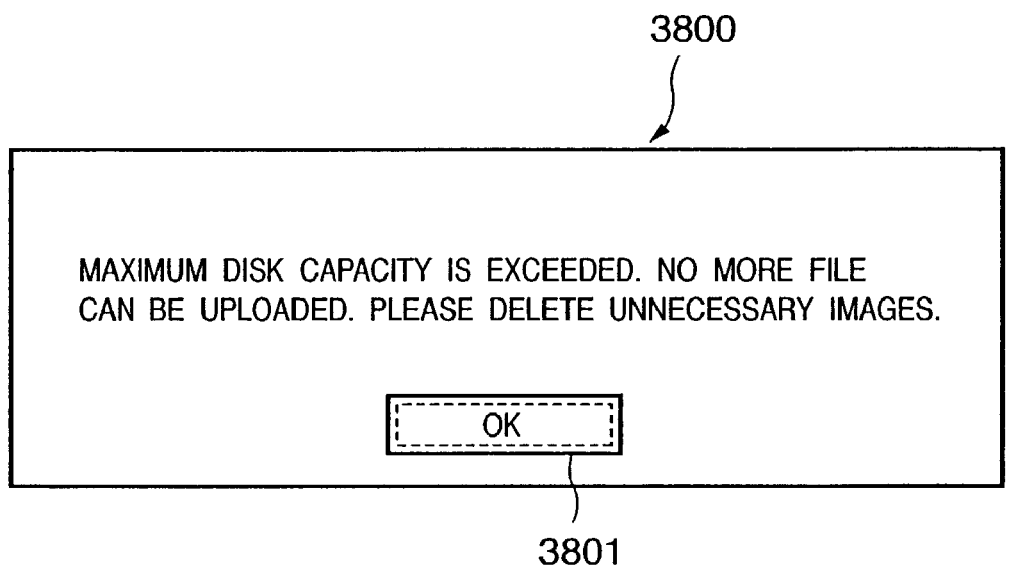
FIG. 37 is a view showing a warning window indicating that no image can be uploaded in the photosite according to the embodiment of the present invention.

Whether uploading can be done is determined by checking in step S3702 whether "Files" is a positive integer. If "Files" is less than one, it is determined that uploading cannot be done, a window 3800 shown in FIG. 37 is displayed (step S3703). When an OK button 3801 on the window 3800 is pressed, the window 2900 is restored.

Figure 38:
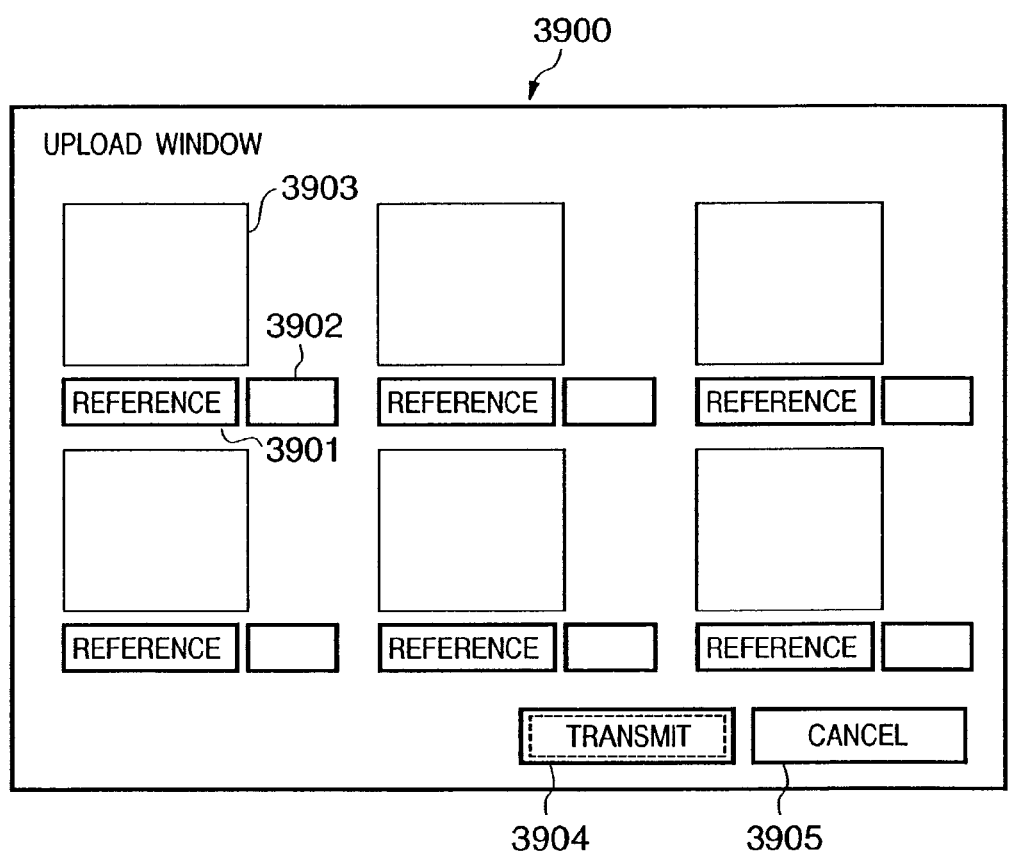
FIG. 38 is a view showing an uploaded image selection window according to the embodiment of the present invention.

If "Files" is one or more, an upload window 3900 shown in FIG. 38 is displayed in step S3704. On this window, image sets, each constituted by a reference button 3901 for selection of a file in the user PC 102A, an input area 3902 for inputting a file path, and a preview display area 3903 for displaying a thumbnail image of a selected image, are displayed in number equal to the number of files (Files) that was calculated in step S3701. When a transmission button 3904 is pressed, the flow advances to step S3705 to transfer the selected image files from the user PC 102A to a work area in the photosite 105. Although no shown in the flow chart of FIG. 36, when a cancel button 3905 is pressed, the upload processing is terminated, and the window 2900 is displayed.

The image files transferred to the photosite 105 are stored in the database 117. Let N be the number of transferred files. In addition, the process variable I is set to 1 (step S3706).

It is checked in step S3707 whether I≦N. If I>N, the window 2900 is displayed in step S3716, and the processing is terminated.

Figure 39:
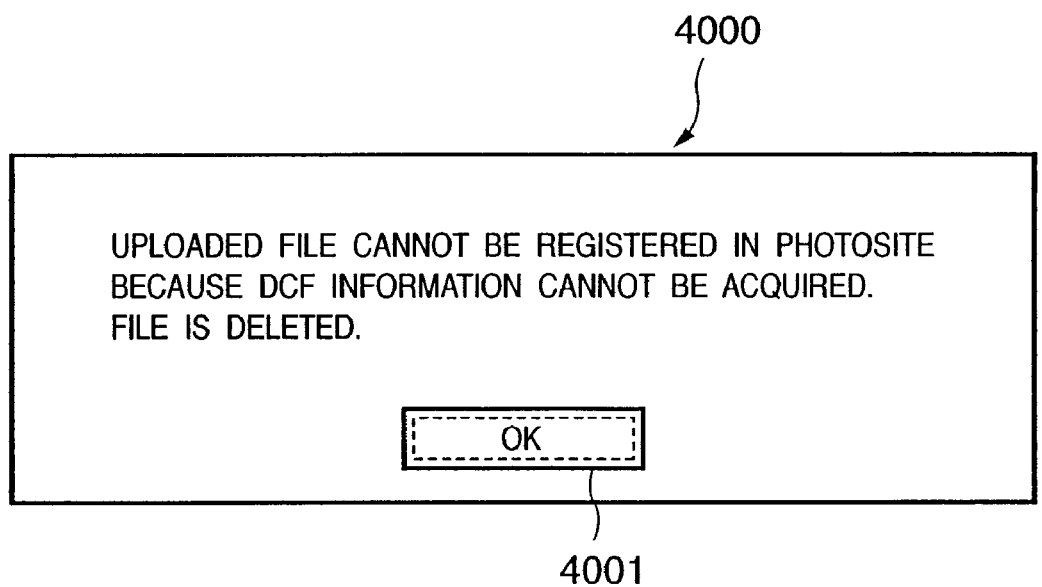
FIG. 39 is a view showing the warning window to be displayed when a file other than images to be processed in the embodiment of the present invention is uploaded.

If it is determined in step S3707 that I≦N, it is checked in step S3708 whether the Ith transferred file is an image file that can be handled by the photosite 105. In this embodiment, the transferred file is determined as a file that can be used by the photosite 105 only when the uploaded image is a JPEG file, and digital camera photographing condition information in the DCF format can be extracted from its header field. If the transferred file is anything other than the above file, a window 4000 shown in FIG. 39 is displayed in step S3709. In step S3710, this file set in the work area in the photosite 105 is deleted. Note that when an image is printed in the printsite 109A, the DCF information is used for color correction and the like for printing by using a shutter speed, information indicating whether electronic flash has been used or not, and the like. When an OK button 4001 is pressed, the flow advances to step S3715 to upload the next file.

If it is determined in step S3708 that the uploaded file is an image file having a predetermined format, the flow advances to step S3711 to create a thumbnail image of this image and store it from the work area in the photosite 105 to the image database 117.

It is then checked in step S3712 whether a file can be added. This determination is done by checking whether the maximum disk capacity is exceeded when the file in process is registered. If it is determined in step S3712 that no file can be added, the window 3800 shown in FIG. 37 is displayed, and all the image files in the work area in the photosite 105 which have not been registered in the image database 117 are deleted. In step S3716, the window 2900 is displayed.

If it is determined in step S3712 that a file can be added, the image information is registered in the database 118 in step S3714. More specifically, with respect to the uploaded image file, the image information data table 900 shown in FIG. 8 is created in such a manner that the value obtained by adding one to the maximum image ID of all the image IDs registered so far is set in the image ID 901 of the added image; a file path, in the original image file path 904; file paths to the newly created thumbnail display image and display image, in the thumbnail file path 905 and display image file path 906, respectively; 0, in the image browse count 908; and 0, in the image print count 909. The album image data table 800 is registered in which the album ID of the currently selected album is set in the album ID 801; the above image ID, in the image ID 802; and the value obtained by adding one to the number of images in the album, in the image display number 803.

I is incremented by one in step S3715, and the flow returns to step S3707.

The processing from step S3707 to step S3715 is repeated while I is equal to or less than N, thereby registering uploaded image files in the database to the maximum capacity.

Figure 40:
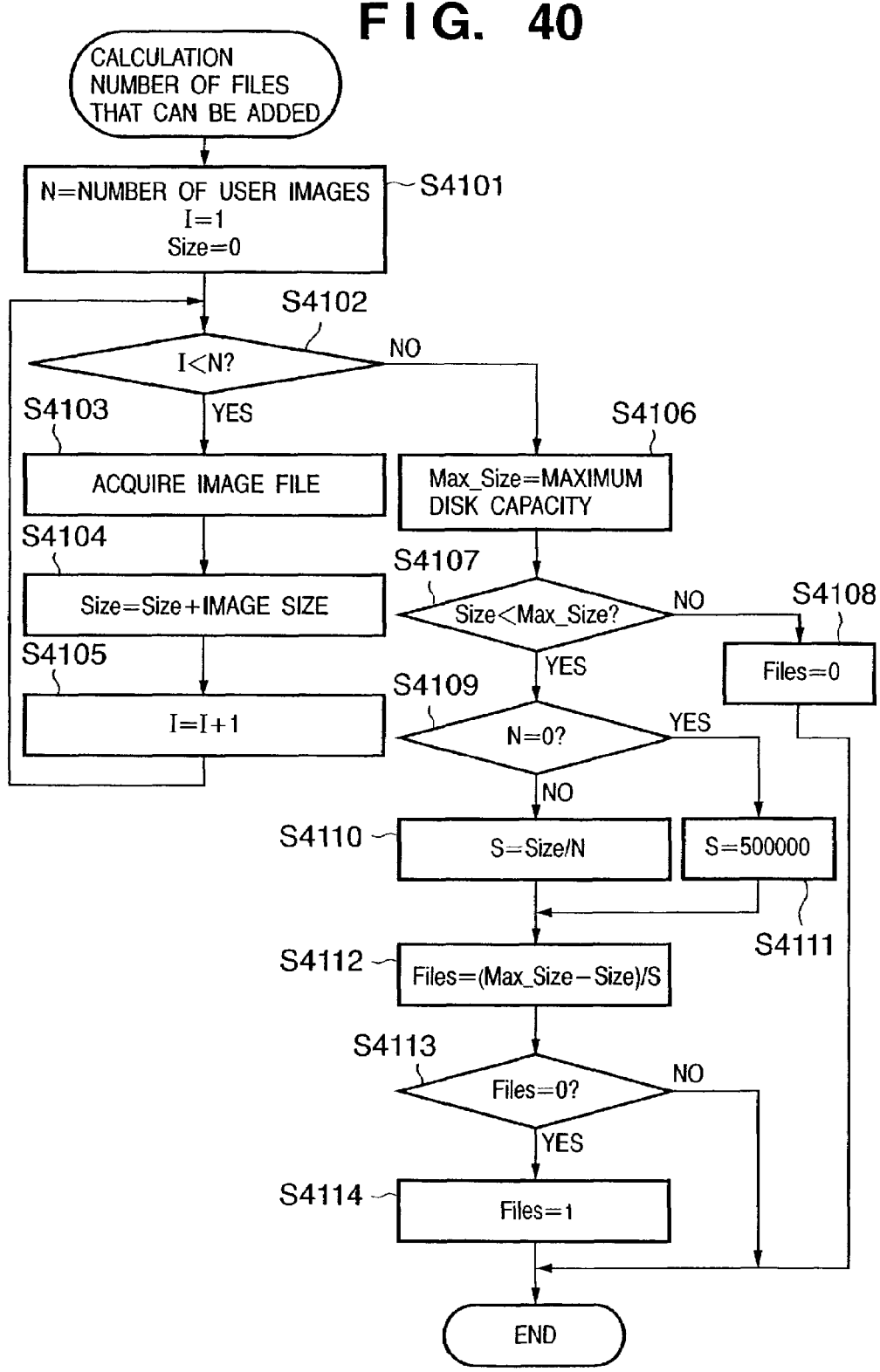
FIG. 40 is a flow chart showing processing for calculating the number of files that can be added according to the embodiment of the present invention.

FIG. 40 is a flow chart showing the processing of calculating the number of files (Files) that can be added in step S3701.

First of all, in step S4101, the database is searched for the image information data table 900 to extract records having the user ID of a login user. Let N be the number of corresponding records. In addition, 1 is assigned to the process variable I for image records, and 0 is assigned to a variable process Size for the calculation of the image size used by the user.

It is checked in step S4102 whether I≦N. If I≦N, the flow advances to step S4103 to acquire an image file by using the original image file path of the Ith record found in step S4101.

In step S4104, the size of the image file is added to Size, and 1 is added to I in step S4105.

By performing the processing from step S4103 to step S4105 while I≦N, the disk capacity Size of the disk currently used by the user can be calculated.

In step S4106, the database 118 is searched for the user state data table 500 with the user ID 501 of the login user, and the maximum disk capacity 503 is set to Max_Size.

It is checked in step S4107 whether Size<Max_Size. If NO in step S4107, since there is no disk area left for this user, 0 is assigned to Files in step S4108.

If it is determined in step S4107 that Size<Max_Size, it is checked in step S4109 whether N is 0. If N is not 0, an average file size S of one file of the user is obtained in step S4110 as $S=Size/N$ If N is 0, the average file size of images photographed by a widely used digital camera with an average number of pixels is assigned to S in step S4111. In this embodiment, an average image size of 500 kbytes (500000) obtained when images are photographed by 2,000,000-pixel digital cameras is assigned to S.

In step S4112, the number of albums that can be added (Files) is calculated by dividing the remaining user disk capacity by the average file size. That is, "Files" is obtained by $Files=(Max\_Size-Size)/S$ It is checked in step S4113 whether Files=0. If Files=0, "Files" is changed to Files=0 in step S4114.

In steps S4109 and S4110, as a file size that is expected to be used by the user, the average of the sizes of image files that have already been uploaded by the user is used. Only when no user image is uploaded, the average file size of images photographed by widely used digital cameras with an average number of pixels is used. However, the average file size of images photographed by widely used digital cameras with an average number of pixels may always be used. In this case, there is no need to perform determination in step S4109, and hence the flow directly advances from step S4107 to step S4111.

<Print Order>

Figure 41:
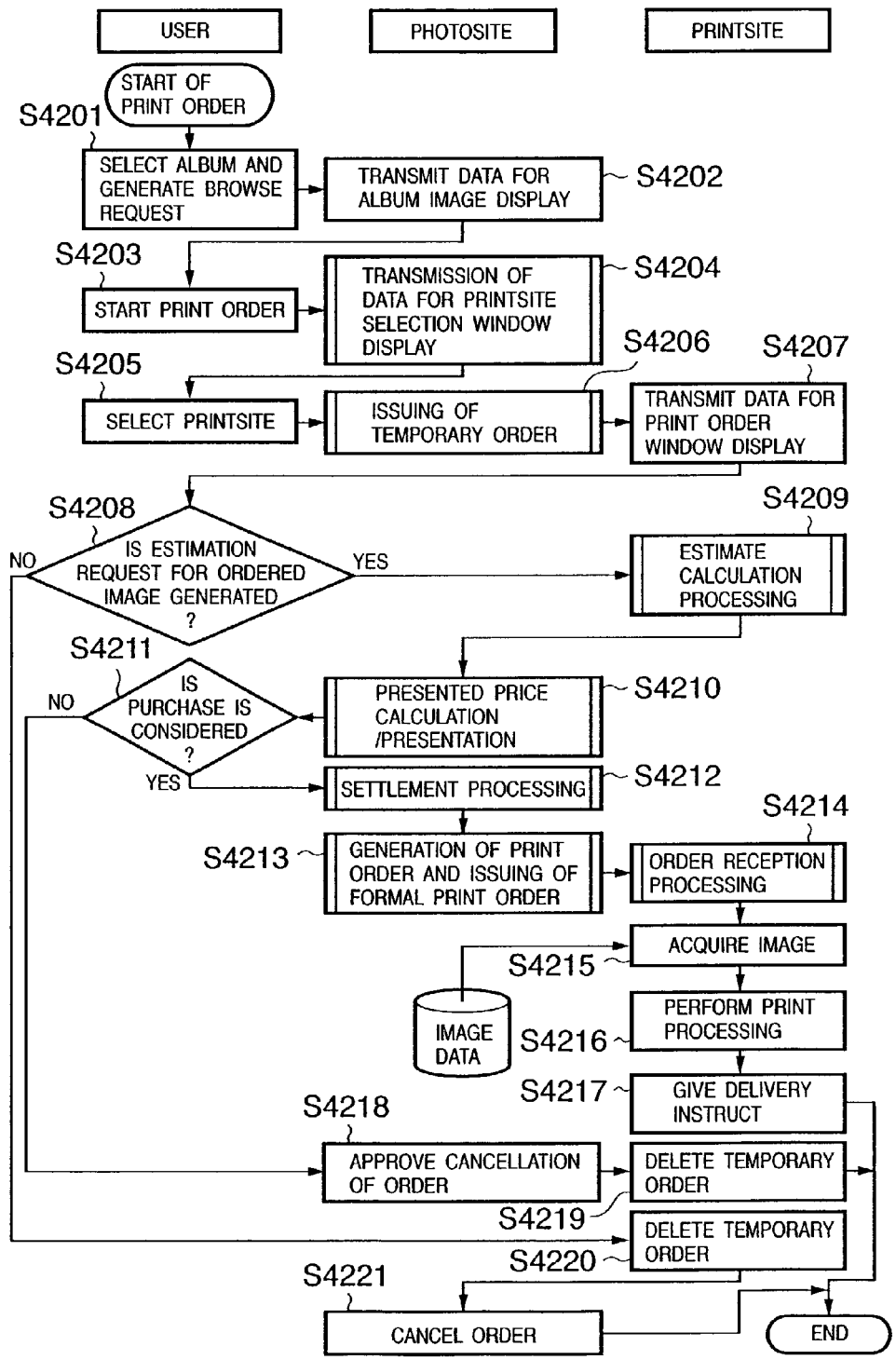
FIG. 41 is a flow chart showing the flow of processing among a client PC, the photosite, and a printsite when a print order is to be placed by using the photosite according to the embodiment of the present invention.

FIG. 41 is a flow chart showing the flow of processing among the user PC 102, the photosite 105, and the printsite 109 when the user gives a print order by using the photosite 105. The user can give a print order for an image in a selected album in the photosite by pressing the print order button 2909 on the window 2900. Note that the parenthesized steps are the corresponding steps in FIG. 1.

When the user generates an album browse request in step S4201 (step S1), the photosite 105 reads out album images and presents them to the user in step S4202 (step S2). That is, on the window 2900, album images corresponding to a pressed album selection button in the album selection area 2910 are displayed in the album display area 2923.

In step S4203 (step S3), the user gives a print order instruction. The print order instruction is issued when the print order button 2909 on the window 2900 is pressed.

Figure 42:
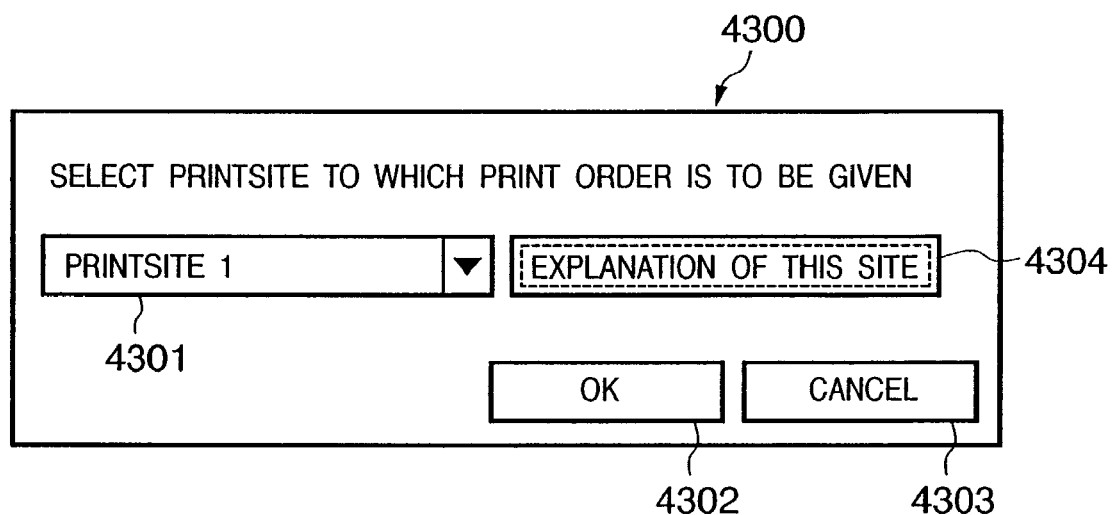
FIG. 42 is a view showing a printsite selection window according to the embodiment of the present invention.

When the print order instruction is issued, the flow advances to step S4204, in which the photosite 105 creates a window 4300 for the selection of the printsite 109 shown in FIG. 42 and presents it to the user PC 102.

When the user selects the printsite 109 from a printsite selection area 4301 and presses an OK button 4302 in step S4205, the photosite 105 issues a temporary print order to the printsite 109A selected by the user in step S4206 (step S4). FIG. 53 shows an example of the data of the temporary print order issued to the printsite 109A. Although not shown in FIG. 41, if the user presses a cancel button 4303 in step S4205, the processing is interrupted, and the photosite 105 displays the currently selected album on the window 2900 again. When a button 4304 is pressed, information about the currently selected printsite 109A is displayed.

Figure 43:
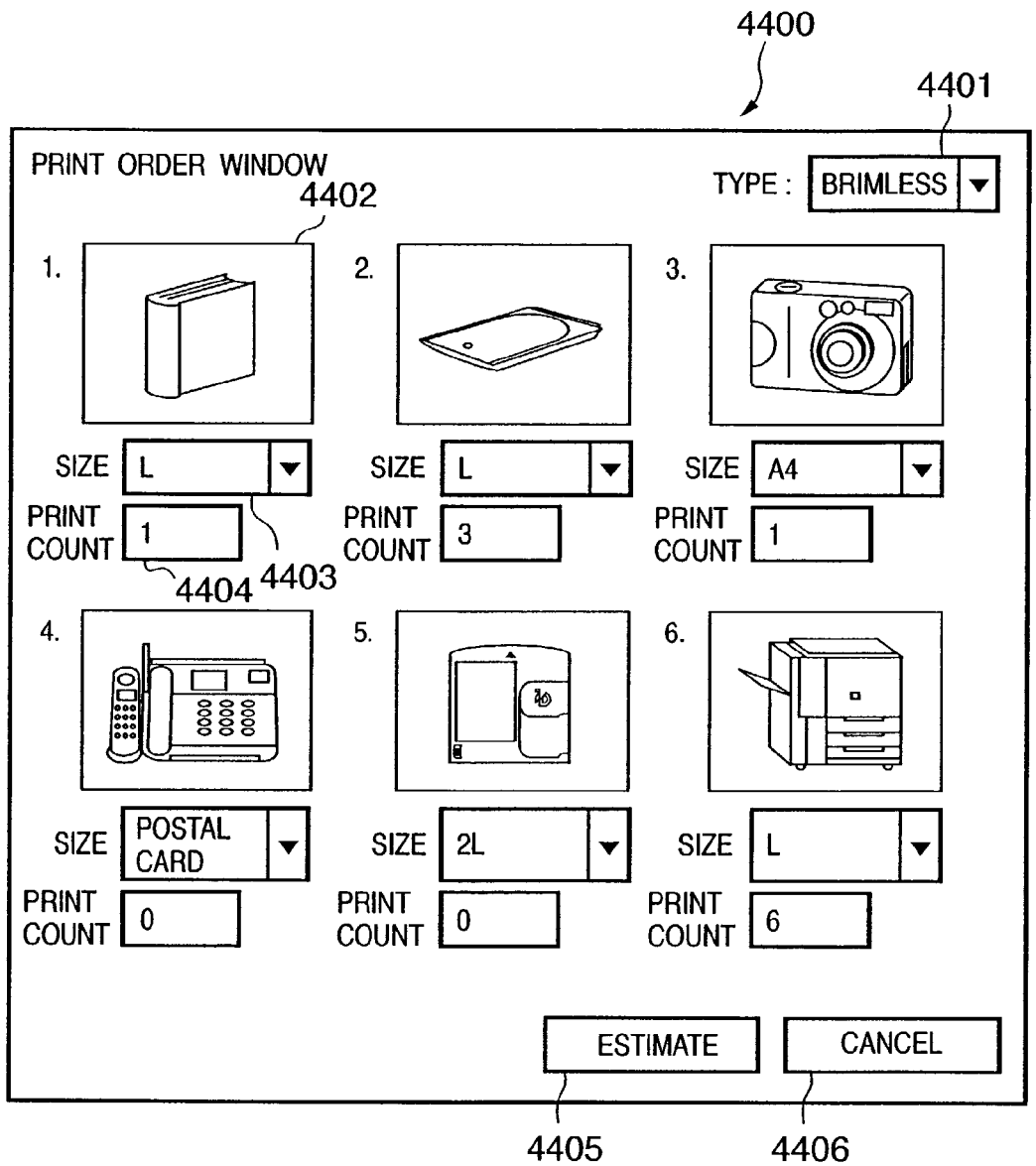
FIG. 43 is a view showing an image print order window according to the embodiment of the present invention.

Upon notification of the temporary print order, the printsite 109A creates data for displaying an image selection window 4400 shown in FIG. 43 and transmits the data to the user PC 102 in step S4207 (step S5). The window 4400 is a print order image selection window created by the printsite 109A, and includes a selection area 4401 for the selection of a print type (brimmed or brimless) at the time of printing, an area 4402 in which a thumbnail image in the album acquired from the photosite 105 is displayed, a selection area 4403 for the selection of a print size, an input area 4404 in which a print count is designated, an estimation request button 4405, and a cancel button 4406. Note that thumbnail image display areas 4402, size selection areas 4403, and print count input areas 4404 exist in number equal to the number of image data contained in the temporary print order.

When the user selects an image to be ordered from the image selection window 4400 and presses the estimation request button 4405 upon inputting a size and print count in step S4208, the flow advances to step S4209 (step S6), in which the printsite 109A performs estimation calculation processing. When estimation calculation is completed in step S4209 (step S7), the corresponding information is notified to the photosite 105. Note that an estimated price may be derived by calculation. Alternatively, a table storing calculation results may be prepared, and an estimated price may be read out from the table.

If no estimation request is generated in step S4208, i.e., the cancel button 4406 on the window 4400 is pressed, the temporary print order in the printsite 109A is deleted, and the photosite 105 is notified that the order is aborted. In step S4221, the photosite 105 cancels the order, and stops the temporary print order processing. The window 2900 is then restored.

When the estimate data is notified from the printsite 109A, the photosite 105 reads out the cumulative points 504 from the customer state data table 500 in the database 118 in the photosite 105, subtracts the cumulative points from the estimated price, and displays the result to the user. FIG. 44 shows the estimate window displayed at this time. In the case of a browse user including portable browse user, if there is no customer state data about the user, the printsite 109A displays the estimate data to the user.

When the estimate window is displayed, the user considers purchase in step S4211 (step S9). Referring to FIG. 41, this processing is briefly written as "purchase considered?" in step S4211. However, when the user considers purchase, the credit information shown in FIG. 45 and the destination shown in FIG. 46 are input between the photosite and the user. If the cancel button 4503, 4602, or 4702 is pressed during this operation, the flow shifts to order cancellation approval processing in step S4218. In this embodiment, since a uniform delivery charge is set, the above flow is used. If, however, different charges are set depending on destinations, the window in FIG. 46 is displayed in the printsite 109A before estimate calculation processing in step S4209 is performed.

If the user gives an order, the photosite 105 performs settlement processing in step S4212. In step S4213 (step S10), the photosite 105 issues a formal print order to the printsite 109A.

Upon notification of the formal print order, the printsite 109A performs order reception processing in step S4214. In step S4215, the printsite 109A acquires image data from the photosite 105, and performs print processing for the image data in step S4216. In step S4217 (step S11), a delivery instruction is issued, and the processing is terminated. Although not shown in the flow chart of FIG. 41, when processing in step S4214 to step S4217 is performed, the status of the printsite 109A is returned to the photosite 105, and the corresponding information is stored in the database 118 in the photosite 105.

When the photosite 105 approves order cancellation in step S4218, the photosite 105 gives a temporary print order delete request to the printsite 109A. In step S4219, the printsite 109A deletes the temporary print order in accordance with this request.

Figure 47:
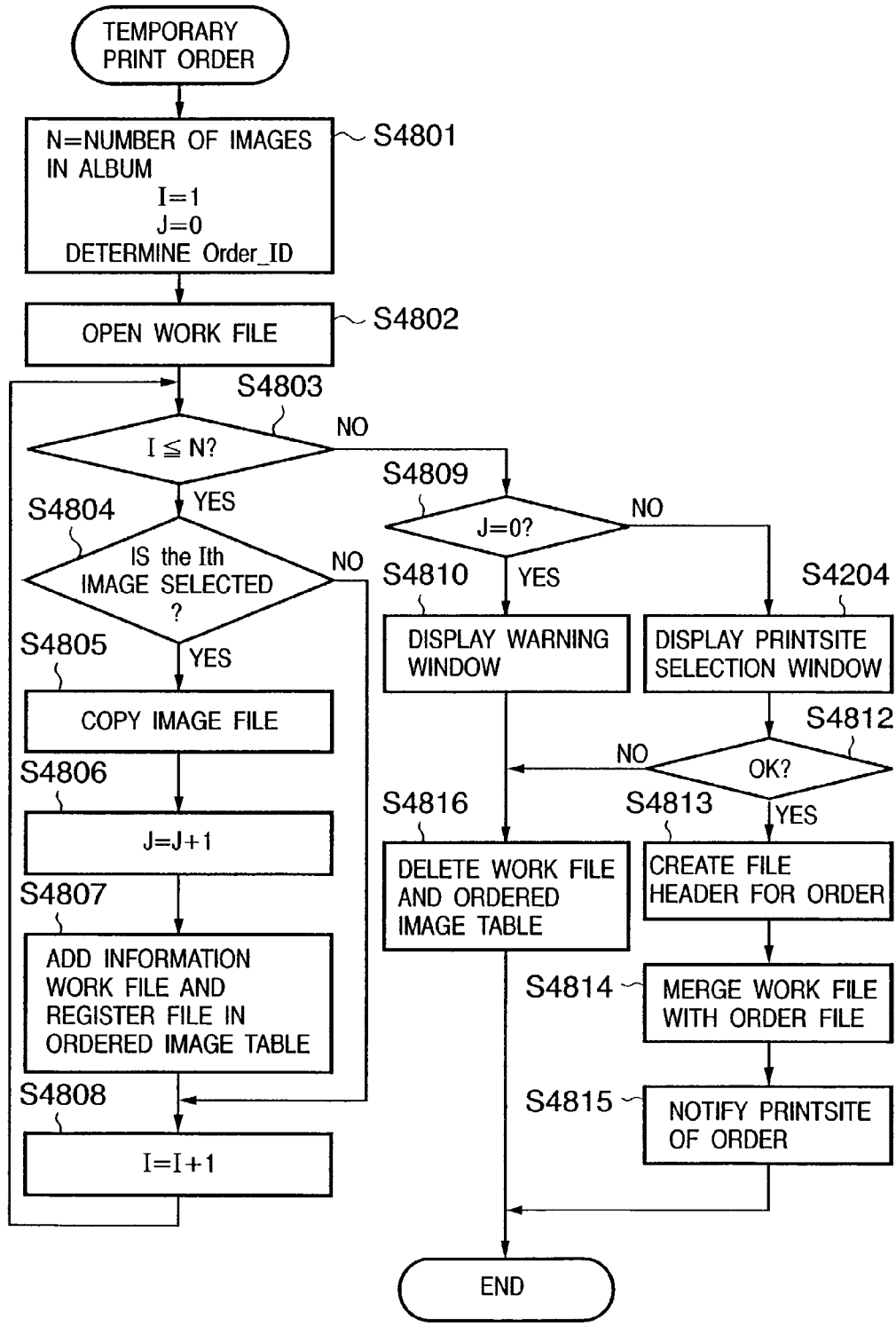
FIG. 47 is a flow chart showing the contents of temporary print order issuing processing in the photosite according to the embodiment of the present invention.

FIG. 47 is a flow chart showing the contents of temporary print order issue processing in the photosite 105 which is performed in steps S4204 and S4206. FIG. 53 shows an example of the format of a temporary print order issued by this processing.

When the print order button 2909 on the window 2900 is pressed, the photosite 105 searches the album image data table 800 to acquire an image count N of the currently selected album in step S4801. In addition, 1 is assigned to a display image work counter I, and 0 is assigned to a selected image work counter J. The maximum order number of the order numbers of orders issued in the past is acquired from the orderer data table 1300 in the database 118, and the value obtained by adding one to the acquired number is set as an order number Order_ID of the current temporary print order.

In step S4802, the photosite 105 opens a work file (Work file) for the creation of a temporary print order.

It is checked in step S4803 whether I≦N.

It is checked in step S4804 whether the Ith image is selected. If the user has checked a check box, of the check boxes indicated by buttons 2930 to 2935 on the window 2900, which is associated with the Ith image, it is determined that the Ith image is selected, and the flow advances to step S4805.

In step S4805, the photosite 105 searches the album image data table 800 in the database 118 for a record whose image display number is I, and acquires the image ID 802 of the image. The photosite 105 also searches the image information data table 900 for a record with image information having the image ID 901. From the searched image information data table 900, the photosite 105 acquires the file path 904 to the original image, the file path 905 to the thumbnail image, and the file path 906 to the display image, and copies the respective images in a folder which can be accessed from the printsite 109A.

In step S4806, the selected image counter J is incremented by one.

In step S4807, a sent image number J, the image name 903 acquired from the image information data table 900, and URLs for accessing the original image, thumbnail image, and display image copied in step S4805 from the printsite 109A are written in the Work file. In addition, the ordered image data table 1100 is created and registered. At this time, Order_ID obtained in step S4801 is set to the order number 1101; J, to the image number; and the file paths to the three copied images, to 1104 to 1106. The remaining information in the record is set when an estimate is notified from the printsite 109A, and hence 0 is assigned to all the information.

In step S4808, I is incremented by one. If it is determined in step S4804 that no image is selected, the flow also advances to step S4808. The flow then returns to step S4803. By repeating the processing in step S4804 to step S4808 while I≦N, the identification information of all selected images for which a temporary print order is placed are written in the Work file.

If it is determined in step S4803 that 1>N, it is determined that the selection of the print order associated with all the images in the album has been checked, and the flow advances to step S4809 to check whether J=0, i.e., there is a selected image.

Figure 48:
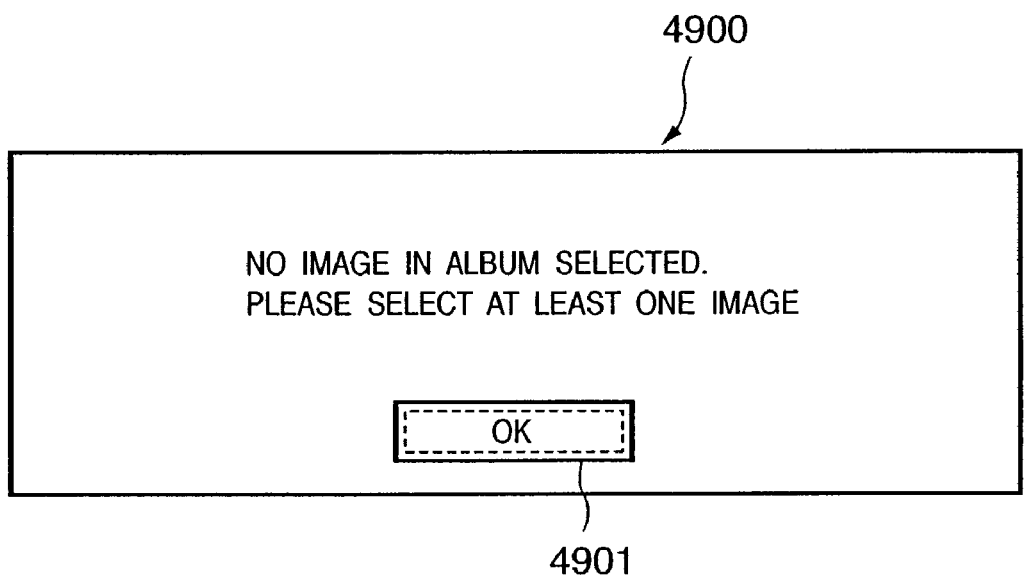
FIG. 48 is a view showing the warning window to be displayed when no image is selected at the time of print order processing according to the embodiment of the present invention.

If it is determined in step S4809 that J=0, a window 4900 shown in FIG. 48 is displayed in step S4810. When an OK button 4901 on the window 4900 is pressed, the Work file is deleted in step S4816, and the ordered image data table 1100 registered in step S4807 is completed deleted. Thereafter, the window 2900 is displayed.

If NO in step S4809, the flow shifts to step S4204 to perform display processing for the printsite selection window 4300.

In step S4812, a user input is checked (as in step S4205). If the OK button 4302 on the window 4300 is pressed, the header field (up to <Estimeteitem> tag) of a temporary print order XML file 5401 shown in FIG. 53 shown in FIG. 53 is created in step S4813. In the header field, the above order number and J are respectively assigned to PhotositeOrderid and Count, but the remaining fields are fixed.

In step S4814, the Work file is merged with the temporary print order XML file 5401. More specifically, elements expressed by <estimeteitem> tag and </estimeteitem> tag of the temporary print order XML data 5401 are created by using the identification information of a selected image in the Work file which is written by the processing in steps S4804 to S4808. By further adding the end tag of the order, the XML file 5401 to be notified from the photosite 105 to the printsite 109A is completed.

In step S4815, the XML file created in steps S4813 and S4814 is notified to the printsite 109A. A destination CGI is acquired from the URL 1403 to a temporary print order notification CGI in the printsite data table 1400.

If the cancel button 4304 on the printsite selection window 4300 is pressed, since is it is determined in step S4812 that the OK button is not pressed, the flow advances to step S4816 to delete the Work file. In step S4807, the registered ordered image data table 1100 is completely deleted. Thereafter, the window 2900 is displayed, and the processing is terminated.

Figure 49:
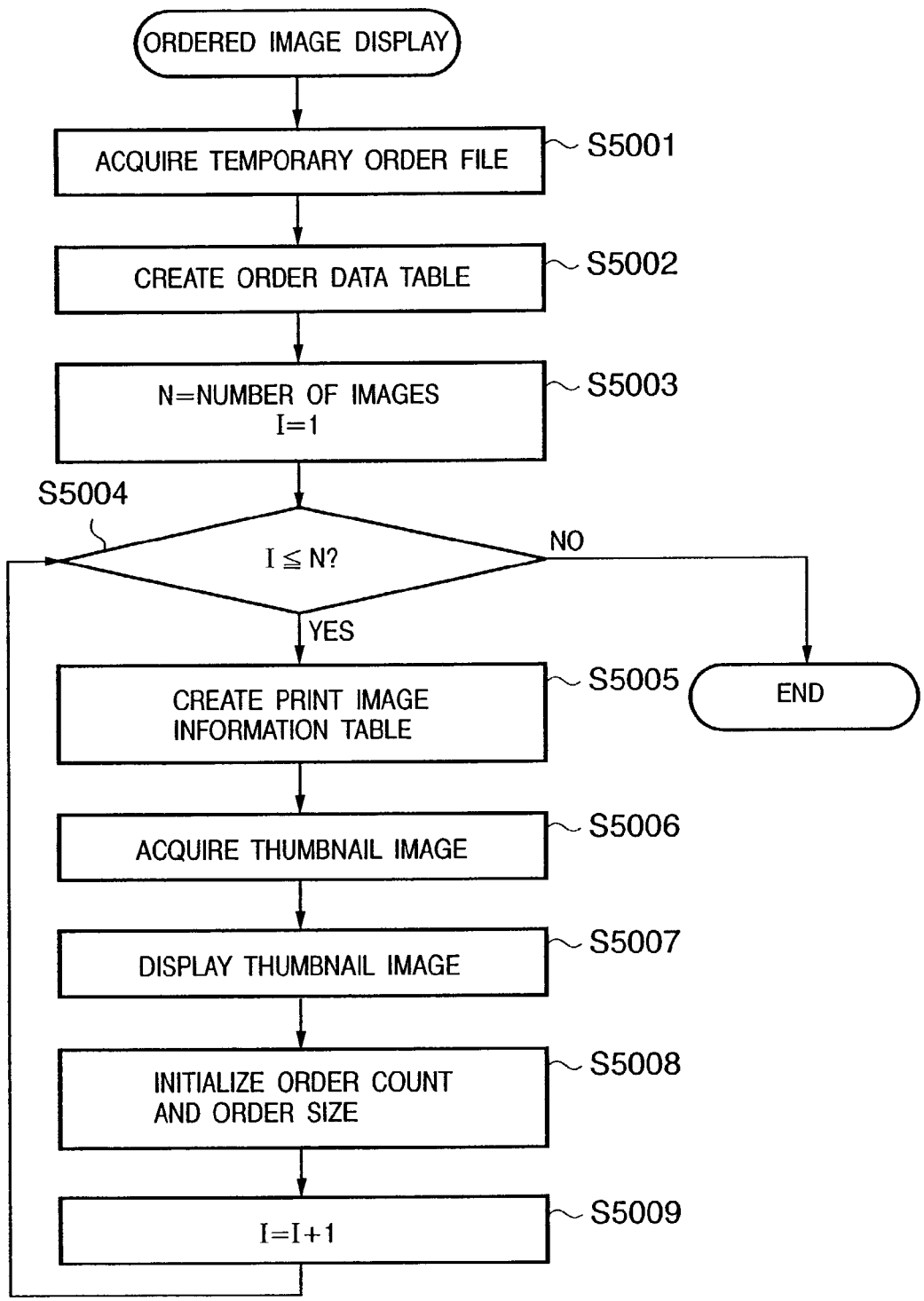
FIG. 49 is a flow chart showing the contents of display processing for a print image selection window in a printsite according to the embodiment of the present invention.

FIG. 49 is a flow chart showing the contents of display processing for a print image selection window in the printsite 109A in step S4207.

In step S5001, a temporary print order file is acquired from the photosite 105.

In step S5002, the order data table 1600 is created and registered in the database 119A. The value obtained by adding one to the maximum value of the values of receipt numbers issued in the order data table 1600 is set in the receipt number 1601, and the photosite ID 1602 and photosite order number 1603 are acquired from the acquired temporary print order file. The date when the temporary print order file was acquired is set in the temporary print order 1604, and 0 (temporary print order) is assigned to the order status. Of the items in the order data table 1600, the items 1607 to 1613 are registered when an estimate is issued, and hence 0 is set in all these items.

In step S5003, N and 1 are respectively assigned to the temporary print order image count and the work image counter I.

It is checked in step S5004 whether I≦N. If I≦N, the flow advances to step S5005.

In step S5005, the print image information table 1700 associated with the Ith image written in the temporary print order file is created. The same value as the receipt number 1601 in step S5001 is set in the receipt number 1701, and I is set in the image number 1702. As the URLs 1703, 1704, and 1705, the corresponding URLs are acquired from the temporary print order file and set. Of the items in the print image information table 1700, the items 1705 to 1708 are registered when an estimate is issued, and hence 0 is set in all these items.

In step S5006, the thumbnail image acquired in step S5005 is acquired from the photosite 105. In step S5007, the thumbnail image is displayed as the Ith image.

Figure 57:
FIG. 57 is a view showing an example of a service item data list in the printsite according to the embodiment of the present invention.

In step S5008, order count and order size input areas are created, and 1 and L size are set as initial values. As items to be selected in the order size input area, items are acquired from a service contents data list 5800 shown in FIG. 57. The service contents data list 5800 is a list for setting service contents and corresponding unit prices in advance in the printsite 109A.

In step S5009, I is incremented by one, and the flow shifts to determination in step S5004. By repeating the processing in steps S5005 to S5009 while I≦N, all the images registered in the temporary print order can be displayed on the order window. If it is determined in step S5004 that I>N, the processing is terminated.

Figure 50:
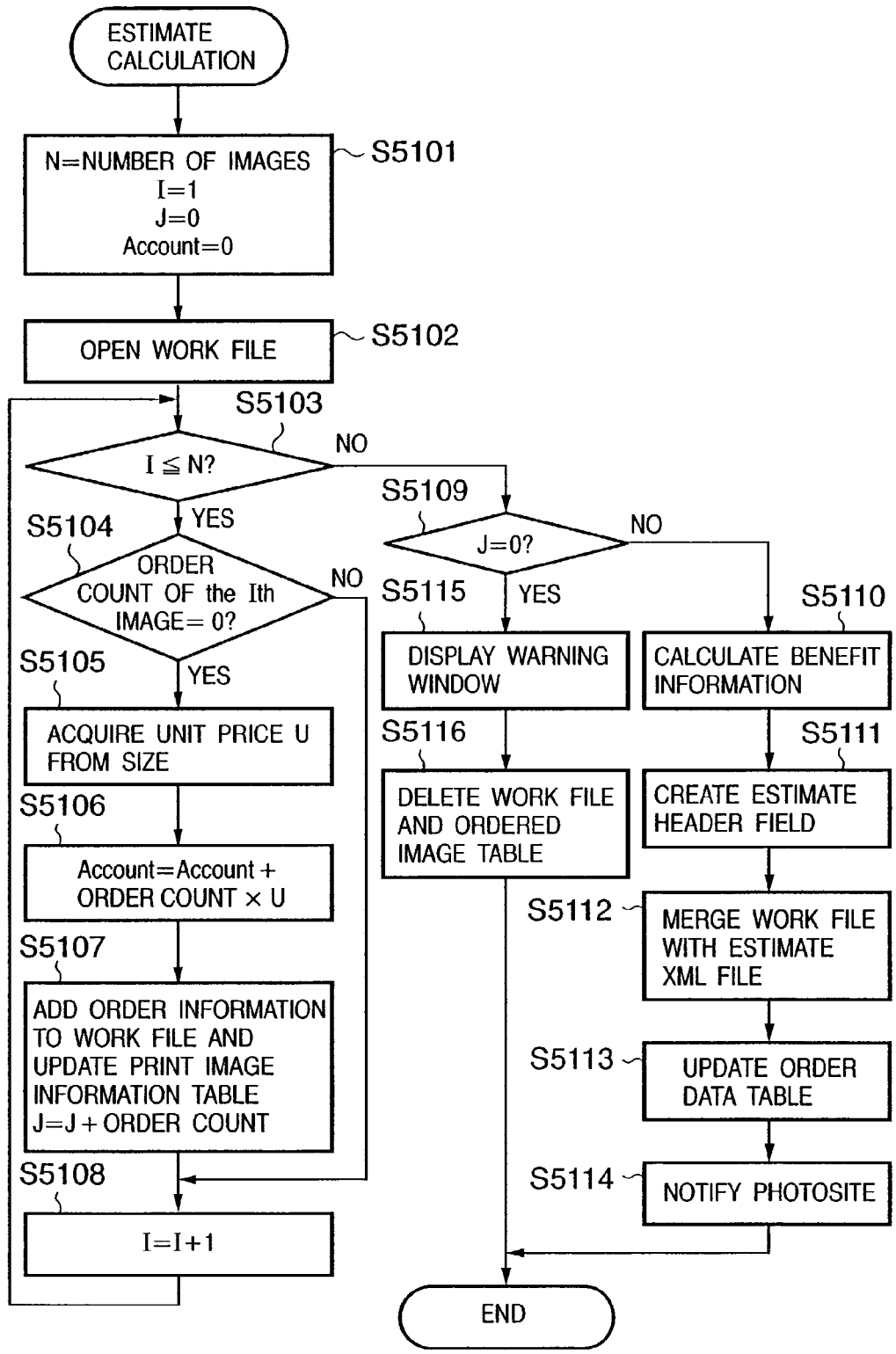
FIG. 50 is a flow chart showing estimation calculation in a printsite and notification of estimate information to the photosite according to the embodiment of the present invention.

FIG. 50 is a flow chart showing estimate calculation in the printsite 109 in step S4209 in FIG. 41 and notification of estimate information to the photosite 105. FIG. 54 shows an example of the estimate information that is created by the printsite 109A and notified to the photosite 105.

In step S5101, the number of images displayed on the window 4400 is assigned to N; 1, to the work image counter I; 0, to the work order image count J; and 0, to a work total price Account.

In step S5102, a Work file is created.

In step S5103, it is checked whether I≦N. If I≦N, the flow advances to step S5104.

In step S5104, the value of the input area 4404 associated with the Ith image on the window 4400 is acquired, and it is checked whether the value is 0. If the value is not 0, the information set in the selection area 4403 is acquired in step S5105, and a unit price U corresponding to the size is acquired from the corresponding paper size in the service contents data list 5800. If it is determined in step S5104 that the order count is 0, the flow advances to step S5108.

In step S5106, the amount obtained by multiplying the image print count by U is added to Account.

In step S5107, the order estimate information associated with the Ith image is added to the Work file. The print image information table 1700 in the database 119A is searched for a record having the current printsite receipt number in the receipt number 1701 and I in the image number 1702. The print count 1706 and print size 1707 of the found record are updated by the current set values, and the print unit price 1709 is updated by U. In addition, by adding the currently set print count to J, the number of images for which print orders have been given is stored.

In step S5108, I is incremented by one, and the flow returns to the processing in step S5103. By repeating the processing in steps S5104 to S5108 while I≦N, estimate information and a total price with respect to all the images can be obtained.

It is checked in step S5109 whether J=0. If J =0, since no print image is selected, a warning window is displayed in step S5115. The warning window displayed at this time is the same as the window 4900. When the OK button is pressed, the Work file is deleted in step S5116, and the window 4400 is displayed again.

Figure 58:
FIG. 58 is a view showing an example of a benefit list in the printsite according to the embodiment of the present invention.

If it is determined in step S5109 that J is not equal to 0, a price corresponding to a benefit, if any, in the printsite 109A is calculated in step S5110. In this case, a printsite benefit list 5900 shown in FIG. 58 is searched for a benefit. If there is a list corresponding to the size IDs in the service contents data list, the user can receive a discount written in "reduced price" in accordance with the print count in "benefit unit".

In step S5111, the header field (up to <resultitem> tag) of an estimate XML file 5501 shown in FIG. 54 is created. PrintSiteOrderid is obtained by adding "pr-" to the receipt number of the printsite 109A. J is input to count. In addition, a print price, tax charge, delivery charge, and delivery tax charge are added.

In step S5112, the contents of the Work file are merged with the estimate XML file 5501. If there is a benefit in the printsite 109A, benefit information is also added to this file, and the end tag of the estimate is finally added to the file, thereby completing the estimate information file 5501.

In step S5113, the order data table 1600 is searched for a record having the current printsite receipt number in the receipt number 1601. The print type 1607 of the found record is updated by the information input in the type input area 4401 on the window 4400, and Account is assigned to the print price 1608. In addition, the bargain price and print tax charge are respectively input to the printsite bargain price 1609 and print tax charge 1610. Furthermore, the estimated delivery charge is input to the delivery charge 1611, the delivery tax charge is input to the delivery tax charge 1612, and the sum total of the values set in 1608 to 1612 is set in the total price 1613, thus updating the record.

The estimate information created in step S5114 is notified from the printsite 109A to the photosite 105.

Figure 51:
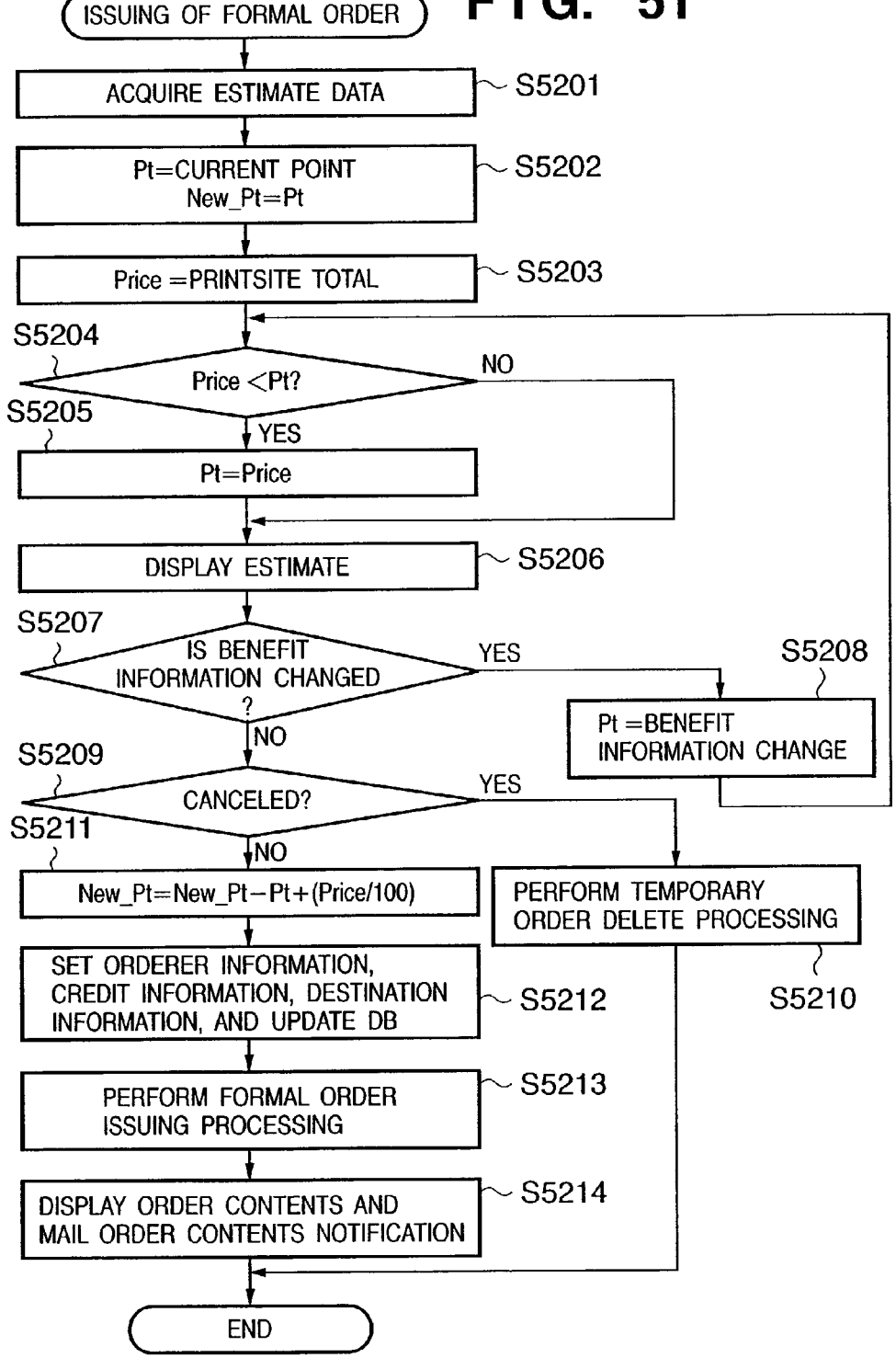
FIG. 51 is a flow chart showing processing in the photosite in the interval between the instant at which the estimate notified from the printsite is acquired and the instant at which a formal print order is issued according to the embodiment of the present invention.

FIG. 51 is a flow chart showing processing in the photosite 105 in the interval between the instant at which the estimate notified from the printsite 109A is acquired and the instant at which a formal print order is issued in step S4213 in FIG. 41.

In step S5201, estimate data is acquired from the printsite 109A.

In step S5202, the cumulative points 504 are acquired from the customer state data table 500 and assigned to Pt. In this embodiment, the cumulative points are converted into yen at a conversion rate of one yen per point. In addition, the value of Pt is assigned to a process variable New_Pt for the calculation of a point after the end of the order. In the case of a browse user including a portable browse user, if there is no customer state data with respect to the user, 0 is assigned to Pt.

In step S5203, the estimated total price for printing in the printsite 109A which is acquired from the estimate data is assigned to Price.

It is checked in step S5204 whether Price<Pt. If Price<Pt, Price is assigned to Pt.

In step S5206, the estimate is displayed. A window 4500 shown in FIG. 44 is an example of the estimate display window displayed at this time. In an estimate display area 4504, print prices are displayed on a print paper basis, and benefit information in the printsite 109A is displayed next. In addition, a tax charge, total price (print price) to be paid to the printsite 109A, delivery charge, and delivery tax charge are added, and benefit information in the photosite 105 is added, thereby displaying the amount to be paid by the user. Although not shown, in the case of a browse user including a portable browse user, if there is no customer state data with respect to the user, a benefit information button 4501 is not displayed.

Figure 52:
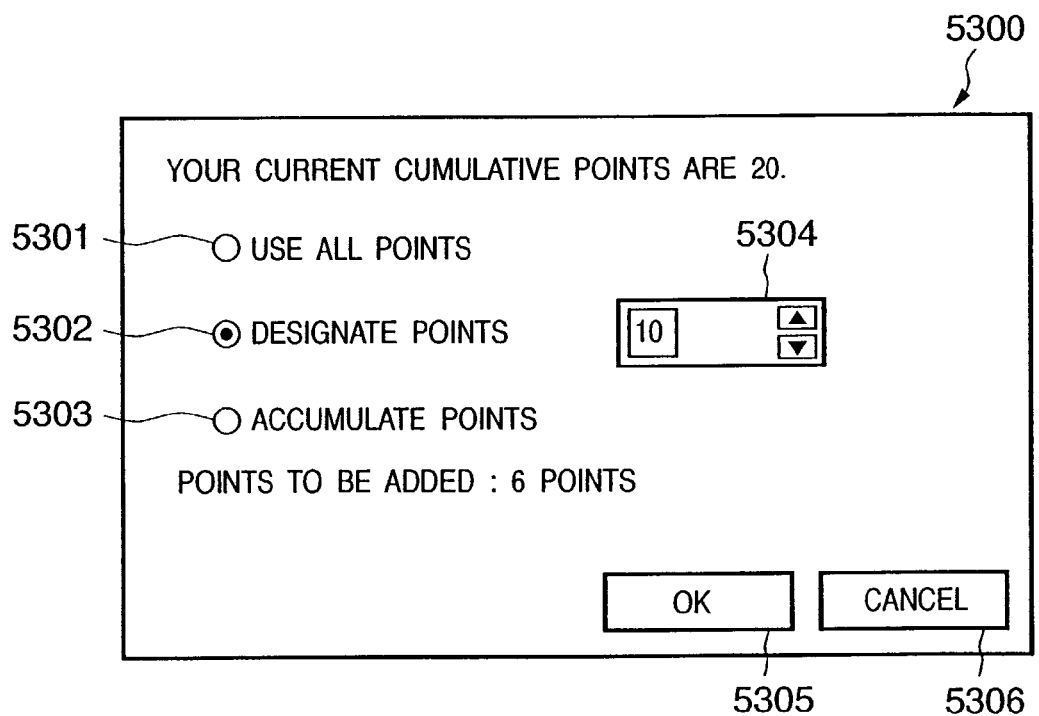
FIG. 52 is a view showing a benefit information setting window in the photosite according to the embodiment of the present invention.

When the benefit information button 4501 is pressed, it is determined in step S5207 that changing of the benefit information is selected, and a benefit information setting window 5300 shown in FIG. 52 is displayed to allow the user to determine whether to use a benefit for this payment (step S5205). If a radio button 5301 on the window 5300 is selected, the current points are used as a benefit. If a radio button 5302 is set, the points input in a point input area 5304 can be used as a benefit. If a radio button 5303 is selected, the benefit is not reflected in the estimate. If an OK button 5305 is pressed, the flow returns to step S5204 to perform addition processing for points again. If a cancel button 5306 is pressed, the flow returns to step S5206 to display the window 4500, although not shown in FIG. 51.

If a cancel button 4503 on the window 4500 is pressed, the flow shifts from step S5209 to step S5210 to perform delete processing for the temporary print order. In this processing, the order information data table 1000 associated with the print order and the image information data table 900 which are registered in the photosite 105 are deleted, and the printsite 109A is notified of the deletion of the temporary print order. The window 2900 is then restored.

When a credit information setting button 4502 is pressed, the flow shifts from step S5209 to step S5211 to subtract the point count used this time from the current point count as New_Pt and add 1% of Price.

In step S5212, a window 4600 shown in FIG. 45 is displayed to make the user give a print order and set information for payment. When an order button 4601 on the window 4600 is pressed, a window 4700 shown in FIG. 46 is displayed to prompt the user to input a destination. In the case of a browse user including a portable browse user, if there is no customer state data with respect to the user, "the same destination as orderer" is not displayed. When an order button 4701 on the window 4700 is pressed, the photosite 105 updates the respective tables in the database 118. First of all, the value of New_Pt is stored in the cumulative points 504 in the customer state data table 500. That is, the point count used for this order is subtracted, and then a point count to be added for this print order is added. In the case of a browse user including a portable browse user, if there is no customer state data with respect to the user, the customer state data table 500 is not updated. The order information about each image is acquired from the estimate information file acquired from the printsite 109A, and the print count, print size, and print type of the record of each corresponding image in the ordered image data table 1100 are updated. In addition, a new order settlement data table 1200 is created on the basis of the current order number, and the contents displayed in an estimate display area 4504 on a window 4500 are registered in the table. "1" indicating the completion of settlement is assigned to the status 1210. Furthermore, an orderer data table 1300 is created, and the current orderer information is acquired from the customer information data table 400 and copied to the orderer data table 1300. Lastly, an order information data table 1000 is created, and the destination information input on the window 4700 is registered in the table. "1" indicating that an order has been given to the printsite is assigned to the order status 1014.

The flow then advances to step S5213, in which the photosite 105 notifies the printsite 109A of a formal print order. FIG. 55 is a view showing an example of the formal print order XML data that is notified at this time. Note that this notified data 5601 is almost the same data obtained by adding a destination to the estimate data 5501 shown in FIG. 54 and changing each tag name.

In step S5214, order contents are displayed, and the orderer is notified of the contents by mail. FIG. 56 shows a display window 5700 of the order contents. When a button 5701 is pressed, the photosite 105 displays the window 2900. FIG. 59 shows an example of the mail to be notified when a print order is placed. Although not shown, in the case of a browse user including a portable browse user, if there is no customer state data with respect to the user, mail notification is not performed.

Figure 60:
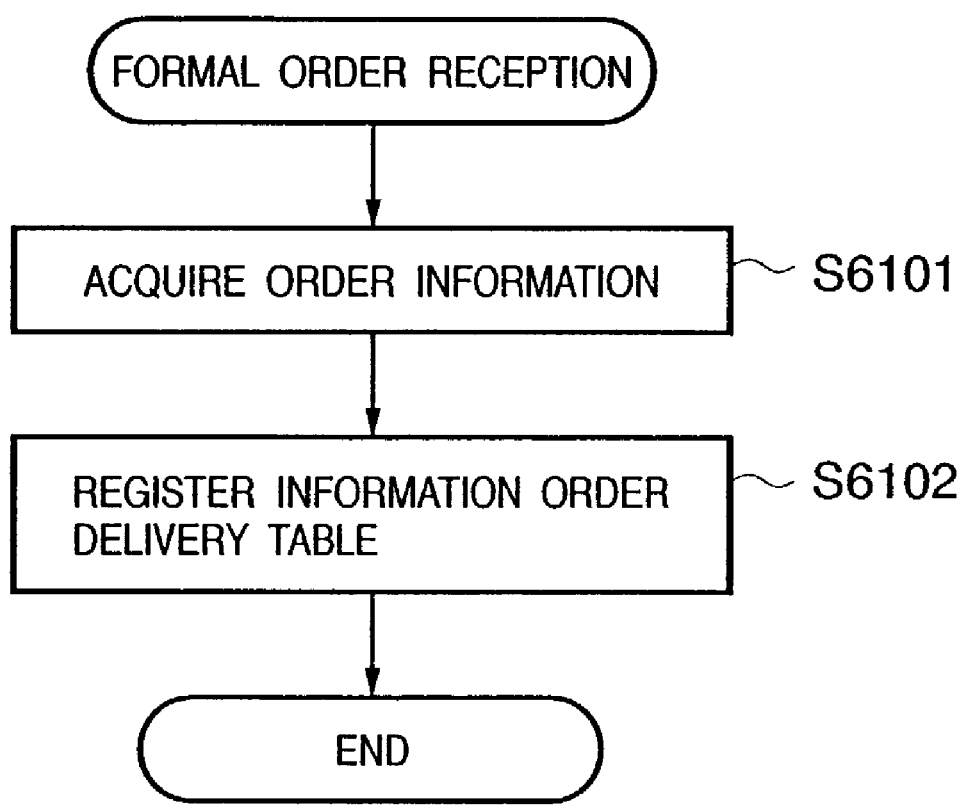
FIG. 60 is a flow chart showing the details of formal print order reception processing in the printsite according to the embodiment of the present invention.

FIG. 60 is a flow chart showing the details of order reception processing in step S4214 in FIG. 41.

First of all, in step S6101, order information is acquired and an order number is extracted from the order information to search for the order data table 1600 having the order number. Order notification time is set in the formal print order date 1605 in the order data table 1600, and the order status 1606 is changed to 1 indicating that no image corresponding to the formal order has been printed. Destination information is further acquired from the acquired order information.

In step S6102, the acquired information is registered in the order delivery table 1800. The status 1812 is set to 0 indicating that delivery has not been done.

<Notification of Album>

Figure 32:
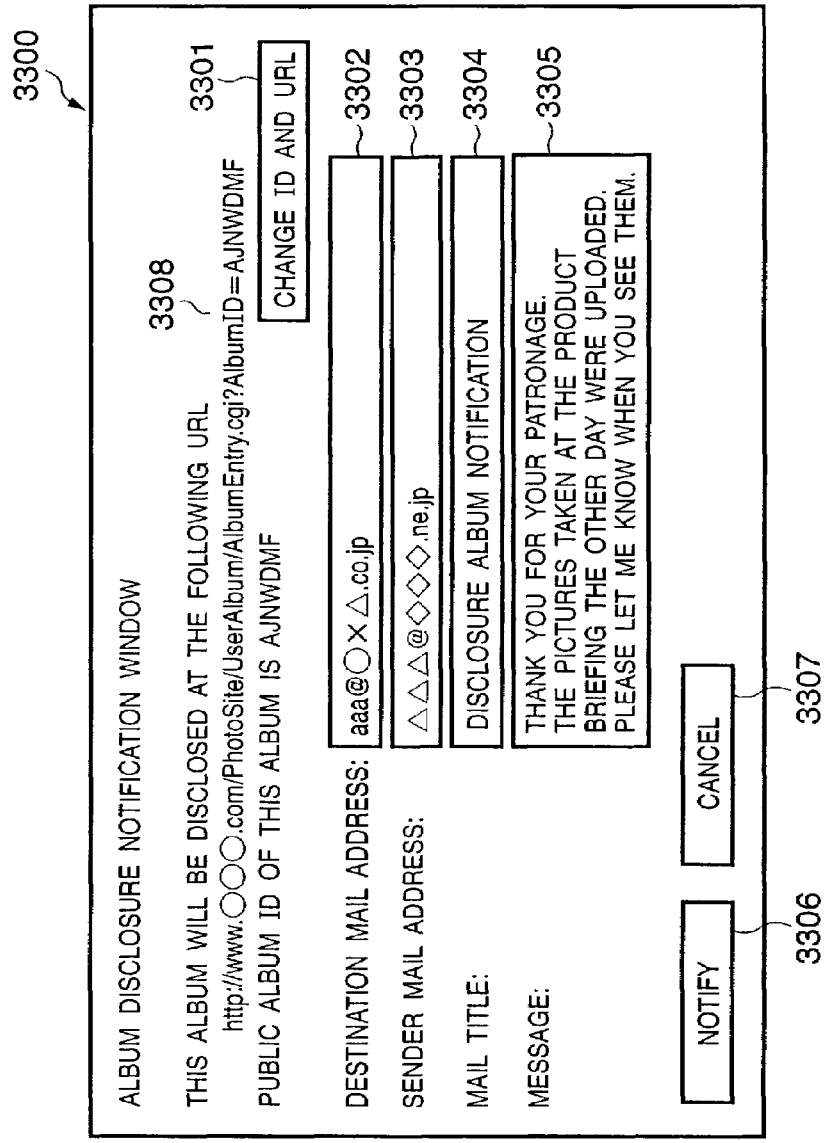
FIG. 32 is a view showing an album e-mail notification setting window in the photosite according to the embodiment of the present invention.

FIG. 32 is a view showing the window displayed when the notification button 2905 on the window 2900 is pressed.

When the user inputs a destination mail address 3302, sender mail address 3303, mail title 3304, and message 3305 on a window 3300 and presses a notification button 3306, the photosite 105 merges the above contents with the mail document created in the photosite 105 and issues album notification mail to the destination mail address.

FIG. 61 shows an example of the album notification mail. The URL and album ID contained in the notification mail are the same as the URL on the window 3300 and the contents displayed in a disclosure album ID display area 3308. Upon reception of the mail, the user can browse an album by designating the URL written in the mail. By inputting the album ID written in the mail in the album ID input area 1905 on the window 1900 and presses the OK button 1906, the user can also browse the same album as that browsed when the URL is designated. In this case, the value of parameter AlbumID=written in the URL is equal to the album ID of the disclosure album. A window 7800 shown in FIG. 72 is a window used to access an album through the portable terminal 113 that can be connected to the Internet. The user can browse the album by inputting the album ID in an input area 7801.

<Creation of Disclosure Album>

A procedure for creating a disclosure album ID will be described next. A disclosure album ID needs to have a value from which the third party cannot easily guess or infer the original album ID 701 and the disclosure album ID of another album on the basis of the number/character string of the ID.

For this purpose, a disclosure album ID must be created by encrypting an album ID managed in the photosite 105. In this case, as indicated by the flow chart of FIG. 64, in step S6501, the album ID is multiplied by 70, and a check digit is embedded in the value at the units place of the product. In steps S6502 to S6507, the resultant data is converted into a character string that can be easily input through the portable terminal 113. This makes it difficult for the third party to infer another disclosure album ID.

[Embedding of Check Digit]

Figure 62:
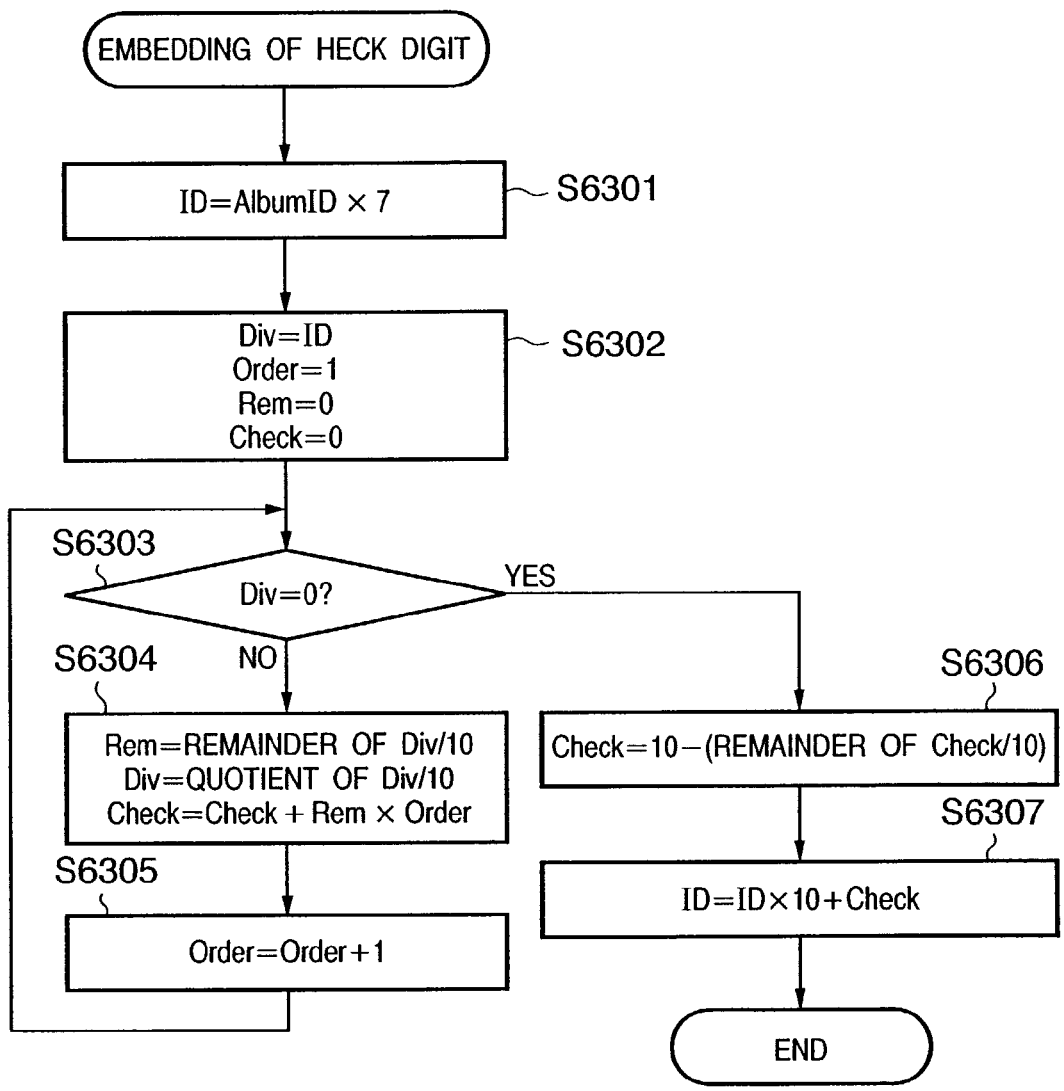
FIG. 62 is a flow chart showing check digit embedding processing in the photosite according to the embodiment of the present invention.
Figure 64:
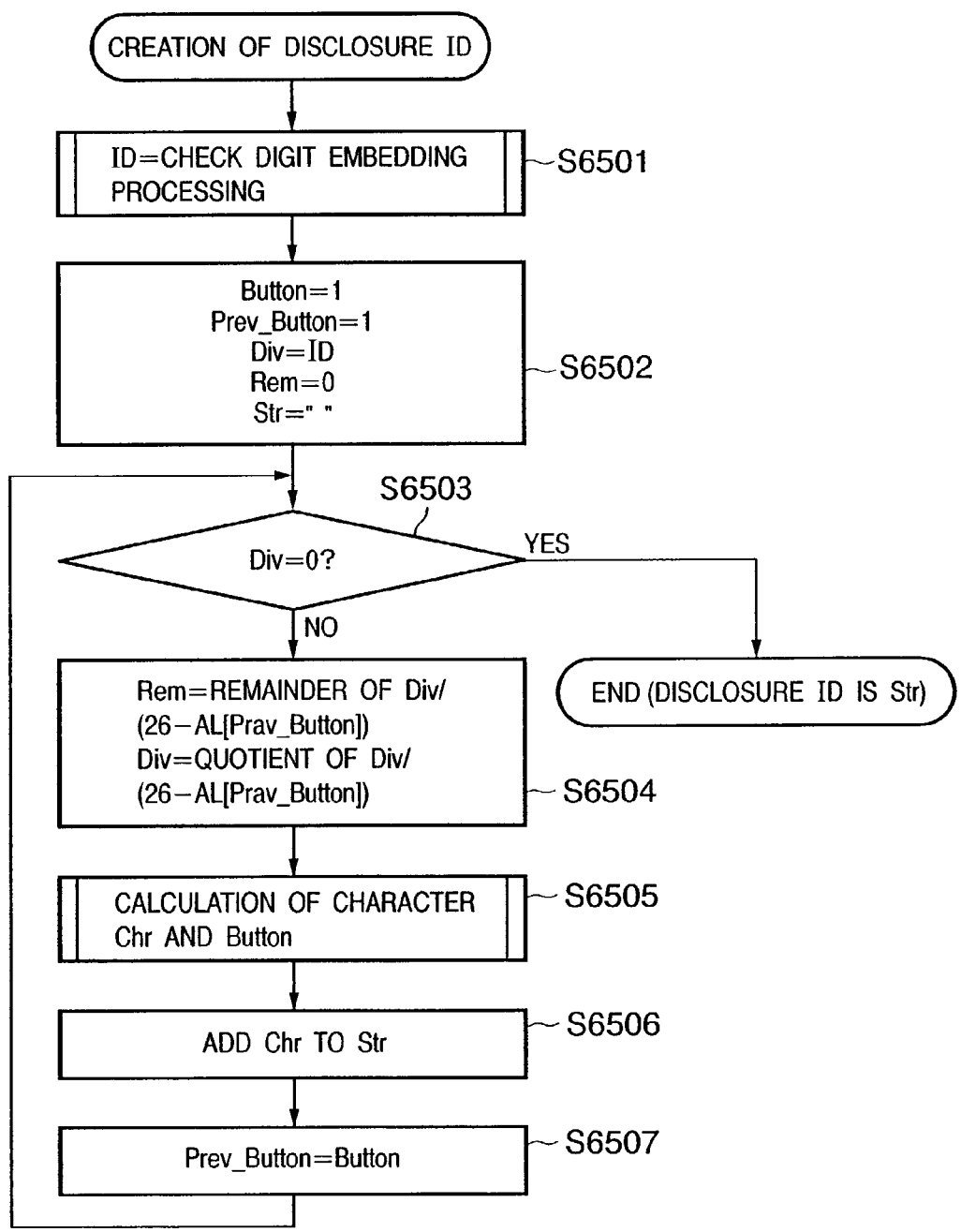
FIG. 64 is a flow chart showing disclosure album ID creating processing in the photosite according to the embodiment of the present invention.

FIG. 62 is a flow chart showing the processing of embedding a check digit in step S6501 in FIG. 64. In this embodiment, the value obtained by multiplying the album ID 701 by seven to ID, and the value at each digit place of ID expressed in decimal is multiplied by the number of digits. The sum total of the products is then obtained, and a complement to the value at the units place is set as a check digit. Each digit of ID is carried by one, and the check digit is added to the units place, thus obtaining a new ID.

In step S6301, the album ID 701 of the album for which a notification is to be currently done is obtained, and the value obtained by multiplying the ID by seven is assigned to ID.

In step S6302, a process variable Div in which the quotient obtained by sequentially dividing ID by 10 is stored is initialized to ID; a process variable Order for counting the number of digits of ID, to 1; a process variable Rem in which the remainder obtained by sequentially dividing ID by 10 is stored, to 0; and a process variable Check for check digit calculation, to 0.

In step S6303, it is checked whether Div is 0. If Div is not 0, the flow advances to step S6304.

In step S6304, the remainder of the quotient obtained by dividing Div by 10 is assigned to Rem, the quotient obtained by dividing Div by 10 is assigned to Div, and Rem×Order is added to Check.

In step S6305, one is added to Order, and the flow returns to step S6303. By repeating the processing in steps S6304 and S6305 until Div becomes 0, a sum total Check of the products of the numerical values at the respective digit places of ID and the number of digits is calculated.

If it is determined in step S6303 that Div is 0, the flow advances to step S6306, in which the remainder of the quotient obtained by dividing Check by 10 is subtracted from 10, and the resultant value is assigned to Check.

In step S6307, the value obtained by multiplying ID by 10 and adding Check to the product is set as a new ID.

The numerical values before and after ID obtained in this manner do not become album IDs. Even if a given person tries to search for other albums by manipulating the acquired disclosure album ID, the photosite 105 can detect such unauthorized access and reject album display.

<Conversion for Telephone>

The processing in step S6502 and the subsequent steps in FIG. 64 will be described next. In this processing, an encrypted disclosure album ID is converted into a character string that can be easily input by a small number of keys. In this embodiment, a character string in which characters input by the same button (e.g., A and B) do not consecutively appear is created by referring to a list 6400 for managing character codes corresponding to the respective numerical values of a telephone.

In the telephone/alphabet list 6400 in FIG. 63, the buttons (Button) of a telephone, character codes (Letters) corresponding to the buttons, and the numbers (AL) of character codes corresponding to the respective buttons are managed. The number AL of character codes corresponding to a button X is represented by AL[X].

In this embodiment, a disclosure album ID is created by selecting alphabetical characters one by one from the ID (numerical value) created in step S6501.

More specifically, the first character is determined by converting the ID into a base-26 number (using, for example, a table in which 0 to 25 are assigned to A to Z), and each of the second and subsequent characters is selected from alphabetical characters that can be input by buttons different from the button used to input the immediately preceding character that was determined. As a consequence, the ID is converted into a base-23 or base-22 number to create a character string. This processing will be sequentially described below.

In step S6502, 1 is set as an initial value in a process variable Button indicating the button to be selected; 1, in a process variable Prev_Button indicating the immediately preceding button that was pressed; ID, in a process variable Div representing the quotient obtained by dividing ID by the number of types of characters that can be used; 0, in the process variable Rem representing the remainder obtained by dividing ID by the number of types of characters that can be used; and a null character string, in a character string Str that is finally obtained.

It is checked in step S6503 whether Div is 0. At first, since ID is assigned to Div in step S6502, the flow advances to step S6504.

In step S6504, Div is divided by the number of characters that can be currently used, and the quotient and remainder are respectively set in Div and Rem. In the initial state, Prev_Button is 1 and AL[Prev_Button] is 0 according to the table shown in FIG. 63, and hence 26 types of characters can be used. Thereafter, 22 or 23 types of characters can be used in accordance with the value of Button.

In step S6505, the character chr is determined on the basis of the value of Rem and Prev_Button. That is, the (Rem)th character in all alphabetical characters except for alphabetical character assigned to the immediately preceding button is determined as chr. Furthermore, button number Button to which chr belongs is also derived.

In step S6506, chr is added to Str.

In step S6507, Button is set in Prev_Button (i.e., the currently selected button becomes an immediately preceding button with respect to the next button), and the flow returns to the processing in step S6503. Characters chr are added to the character string Str one by one by repeating the processing in steps S6504 to S6507 until Div becomes 0.

If it is determined in step S6503 that Div becomes 0, Str becomes a character string representing a disclosure album ID.

Figure 65:
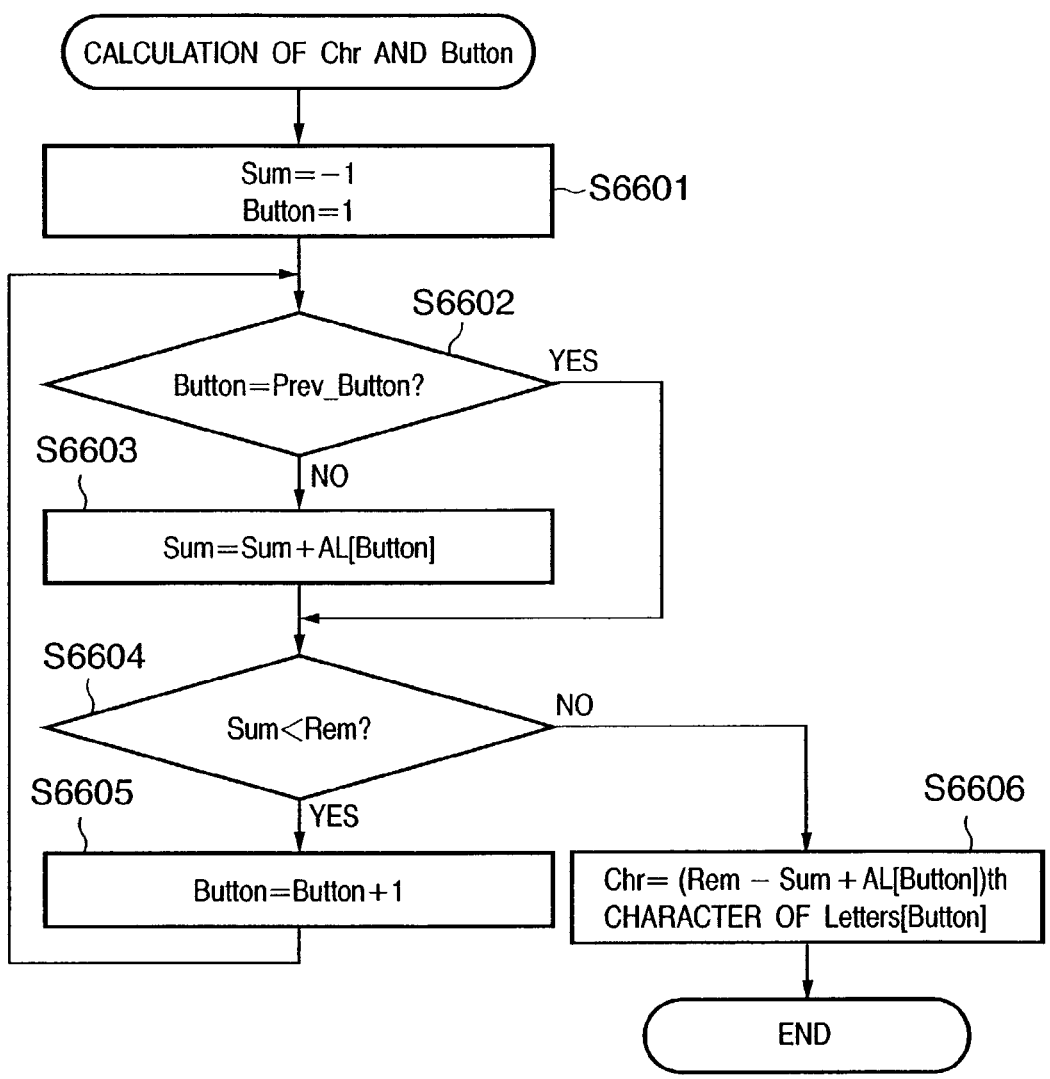
FIG. 65 is a flow chart showing the processing of associating numerals with alphabetical characters and calculating buttons of a telephone which can input the alphabetical characters.

FIG. 65 is a flow chart showing the processing of obtaining the character chr corresponding to Rem and the button number Button to which the character belongs in step S6505 in FIG. 64.

In step S6601, the process variables Sum and Button are initialized into −1 and 1, respectively.

In step S6602, it is checked whether Button is equal to Prev_Button. If they are equal, since the corresponding button cannot be used, the flow advances to step S6604. If they are not equal, the number of characters AL[Button] that can be input by using Button is added to Sum. That is, the number obtained by sequentially adding the numerical values in the AL column in the list 6400 in FIG. 63 is input to Sum. In this case, AL corresponding to the immediately preceding button is not added by the processing in step S6602.

In step S6604, it is checked whether Sum<Rem. If Sum<Rem, 1 is added to Button, and the flow returns to step S6602. If Rem≦Sum, since there is a character corresponding to Rem in Button, the flow advances to step S6606.

In step S6606, chr is obtained. Note that chr is the (Rem−Sum+AL[Button])th character in Letters[Button].

<Browsing of Album>

Figure 66:
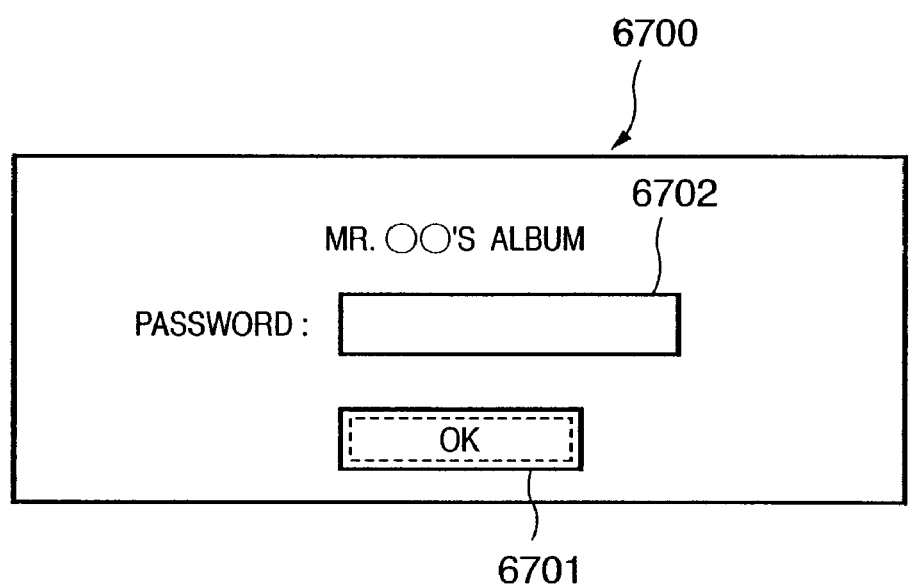
FIG. 66 is a view showing an album browse start window in the information providing system according to the embodiment of the present invention.

The user who has received the notification mail shown in FIG. 61 can display the album browse start window 6700 shown in FIG. 66 by designating a URL 6201 written in the mail document. Note that this window can also be displayed by inputting an album ID 6203 written in the notification mail in the album ID input area 1905 and pressing the "GO!" button 1906 on the window 1900.

Figure 68:
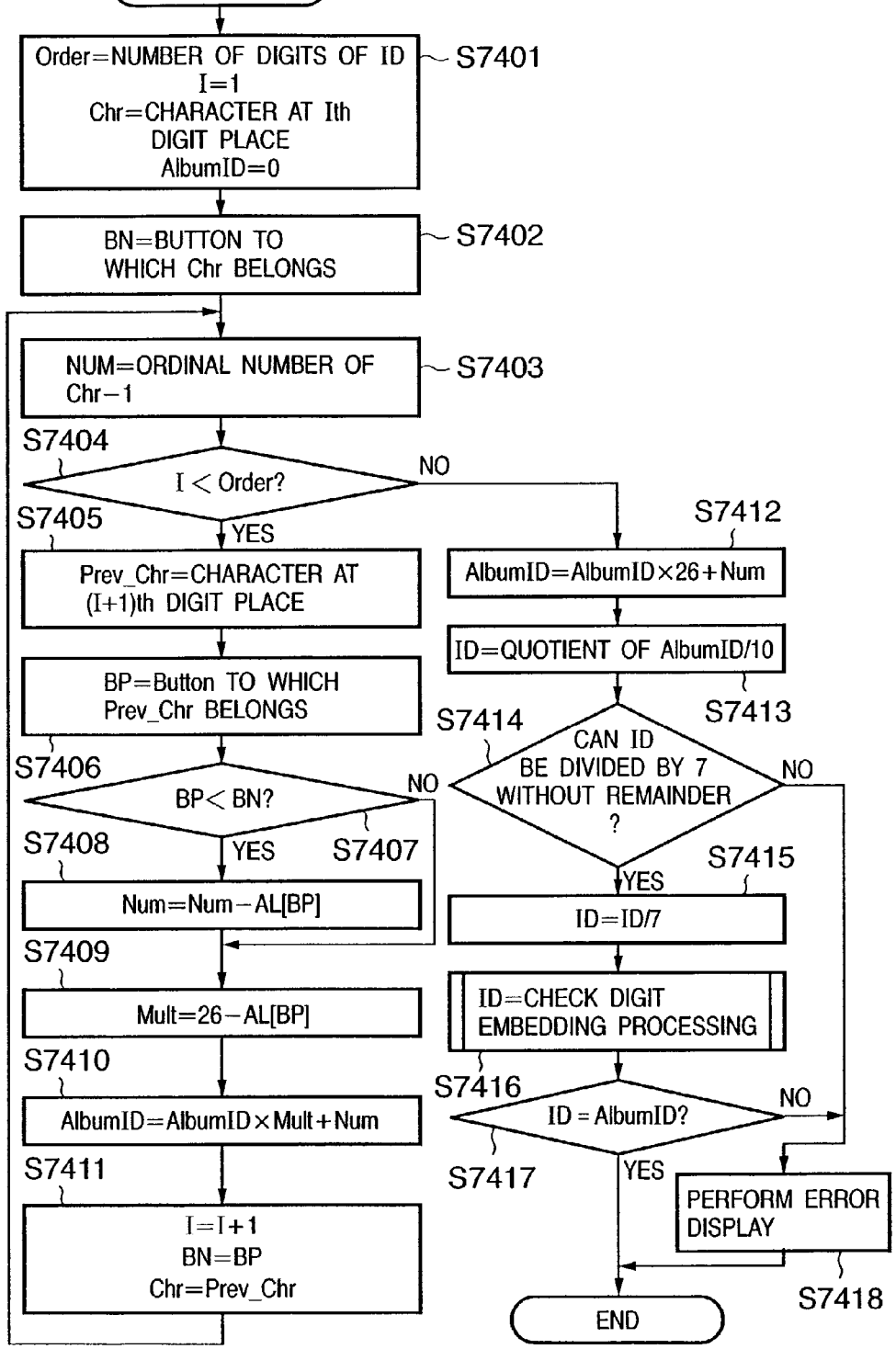
FIG. 68 is a flow chart showing the processing of checking the ID input when the user tries to browse an album in the information providing system according to the embodiment of the present invention.

FIG. 68 is a flow chart showing the processing of checking, upon designation of an album ID by the user through the portable terminal 113, whether an album corresponding to the designated album ID exists.

Figure 69:
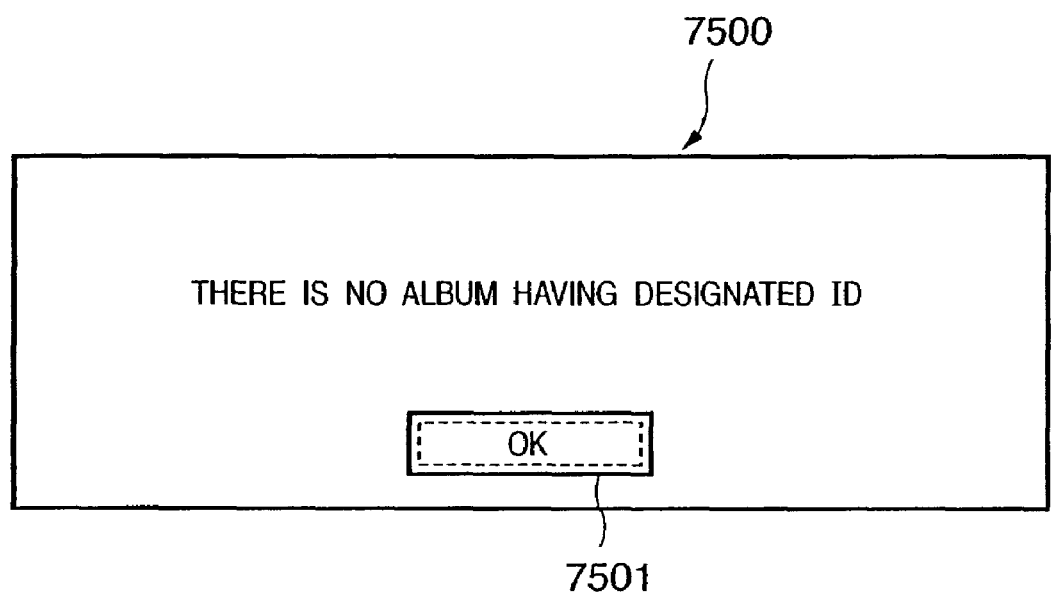
FIG. 69 is a view showing the window to be displayed when no album is found which corresponds to the ID input at the time of album browsing in the information providing system according to the embodiment of the present invention.

In step S7401, the number of digits of the input ID is initialized to Order; the process variable I for counting the number of digits, to 1; the process variable Chr representing a character, to the character at the first digit place; and AlbumID to be obtained, to 0. In this embodiment, input parameters representing an album ID are limited to English letters. If, however, unauthorized input, e.g., input of characters other than English letters, is checked, an error window 7501 shown in FIG. 69 is displayed as in the case wherein no album corresponding to the designated album ID exists.

In step S7402, a button to which the character of Chr is assigned is searched from the portable terminal button/alphabet list 6400 and set to BN.

In step S7403, a specific ordinal number in the alphabet to which Chr corresponds is obtained, 1 is subtracted from the obtained value, and the resultant value is set in Num.

In step S7404, it is checked whether I<Order.

If it is determined in step S7404 that I<Order, the character at the (i+1)th digit place is set in Prev_Chr.

In step S7406, a button to which the character of Prev_Chr is assigned is searched from the portable terminal button/alphabet list 6400 and is set in BP.

In step S7407, PB is compared with BN. Although not shown, in this embodiment, since two characters assigned to the same button are not consecutively input, if BP=BN, an error window 7500 is displayed.

If it is determined in step S7407 that BP<BN, only AL[BP] is subtracted from Num in step S7408. If it is determined in step S7407 that BP≧BN, the flow advances to step S7409 without performing the processing in step S7408.

In step S7409, the value obtained by subtracting only AL[BP] from 26 is set in a process variable Mult representing a multiplier.

In step S7410, AlbumID is multiplied by Mult, and Num is added to the product. The resultant value is then set as new AlbumID.

In step S7411, 1 is added to I, and BP and Prev_Chr are respectively assigned to BN and Chr. The flow then returns to the processing in step S7403.

If it is determined in step S7404 that I is not larger than Order, the value obtained by multiplying AlbumID by 26 and adding Num to the product is newly set in AlbumID. If the album ID input by the user is a correct value, AlbumID obtained here becomes ID shown in FIG. 62. In this embodiment, since this value is the value obtained by embedding a check digit at the first digit place of the product of the existing album ID and 7, the quotient obtained by dividing Album by 10 is set in ID in step S7413. It is then checked in step S7414 whether ID can be divided by 7 without a remainder.

If it is determined in step S7414 that ID is divided by 7 without a remainder, ID is divided by 7 in step S7415.

In step S7416, the check digit embedding processing shown in FIG. 62 is performed for this ID. In step S7417, it is checked whether ID coincides with AlbumID.

If it is determined in step S7414 that ID cannot be divided by 7 without a remainder, and it is determined in step S7417 that ID does not coincide with AlbumID, it indicates that a proper album ID is not input. In step S7418, therefore, the error window 7500 shown in FIG. 69 is displayed.

The photosite 105 analyzes AlbumID of the parameter portion of the above input URL or the album ID input to the album ID input area 1905. Only when an album exists, the photosite 105 searches the album information table 700 for a record having the ID obtained in step S7414 in the album ID 701. The photosite 105 then searches the customer album data table 600 for a user ID having the album ID, and further searches the customer information table for a record corresponding to the user ID 401.

Subsequently, the name (last name) 405 is displayed on a window 6700 shown in FIG. 66. If the password permission/inhibition flag 705 of the album information data table 700 searched in this case indicates that a password is set for the album, a password input area 6701 is displayed. Obviously, if no password is set for the album, a password input area 6701 is not displayed.

Figure 67:
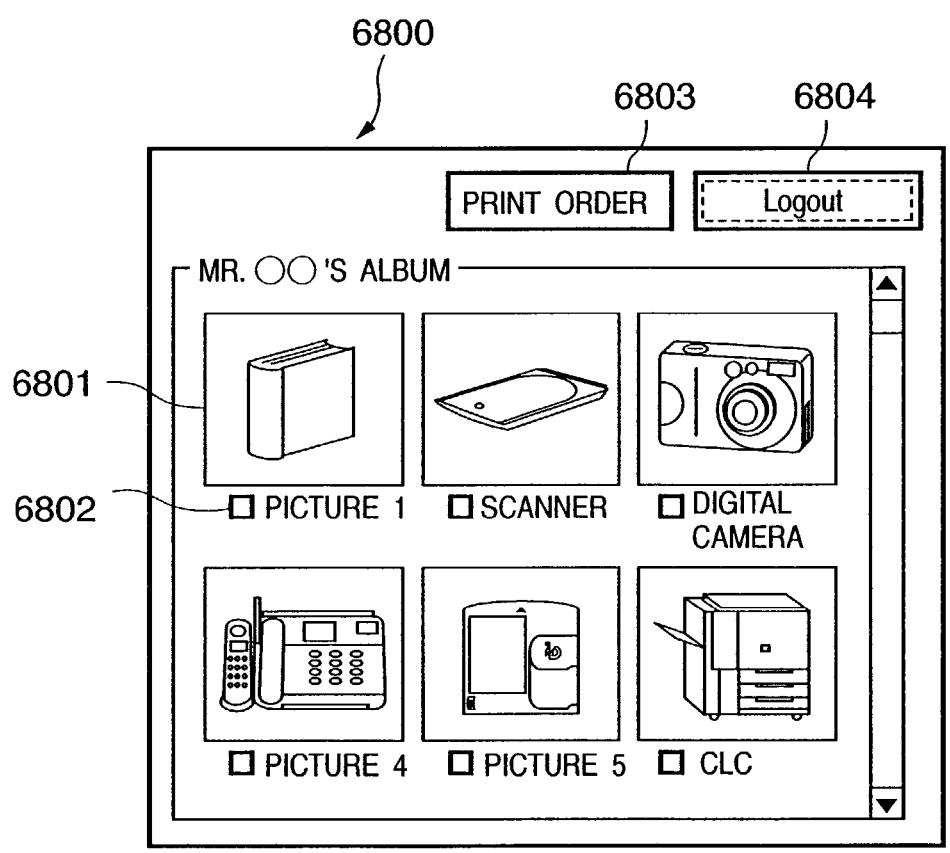
FIG. 67 is a view showing an album browse window in the information providing system according to the embodiment of the present invention.

When the OK button 6701 is pressed, for example, an album browse window 6800 shown in FIG. 67 is displayed with respect to an album for which no password is set or an album for which a password is properly input. The contents of this window are the same as those of the album display area 2923 on the window 2900. If a password is not properly input, the window 2500 shown in FIG. 24 is displayed. When the OK button 2501 is pressed, the window 6700 is displayed again.

In addition, the value of the print permission/inhibition flag 707 is acquired from the album information data table 700, and a button 6803 is displayed in association with an album that can be printed, thereby allowing the user to give a print order. In this case, the flow of print order processing is almost the same as login user processing (the processing to be done when the button 2909 on the window 2900 in FIG. 28 is pressed) except that no point is added in the photosite 105.

<Browsing from Portable Terminal>

Figure 70:
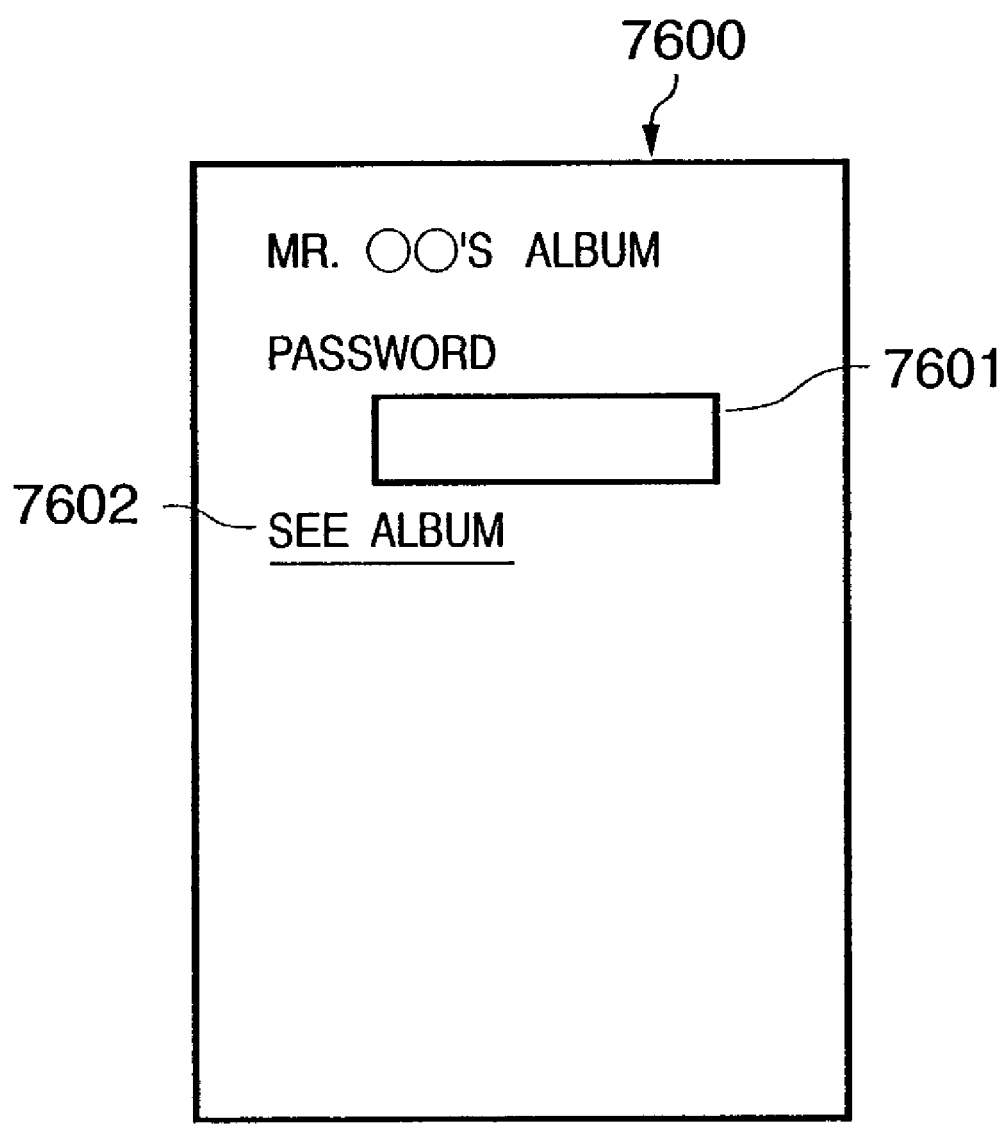
FIG. 70 is a view showing the first window to be displayed when the user browses an album through a portable phone in the information providing system according to the embodiment of the present invention.

A window 7600 shown in FIG. 70 is an example of the window displayed on the display of the portable terminal 113 at the time of browsing from the portable terminal. In response to a browse request from the user, the photosite 105 acquires the information of the terminal which has generated the request to check whether the browse request has been generated by a portable terminal or PC. If the browse request is generated by the portable terminal, the window 7600 shown in FIG. 70 is displayed. Note that the contents of this window are the same as those of the window 6700. The window 7600 is displayed when the user directly designates the URL indicated by the notification mail shown in FIG. 72. This window is also displayed when the user inputs the album ID shown in FIG. 62 in an album ID input area 7801 on a window 7800 shown in FIG. 72 and selects a button 7802.

Figure 71:
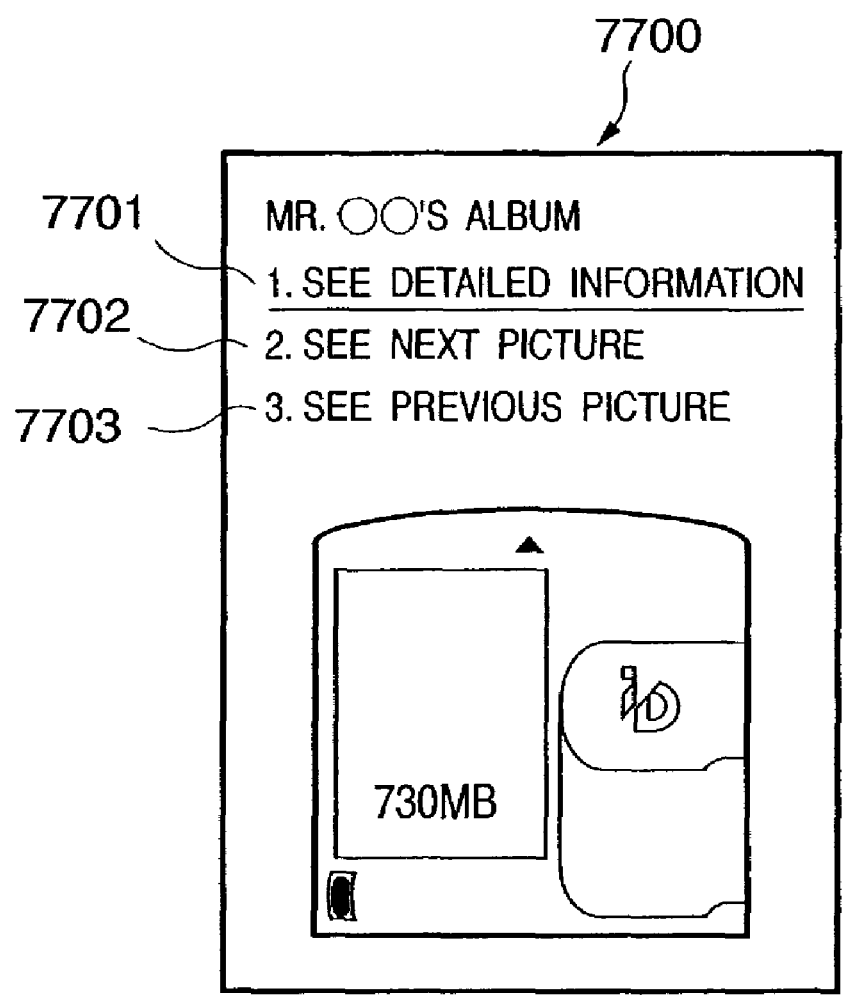
FIG. 71 is a view showing the window to be displayed when the user browses an album from the portable phone in the information providing system according to the embodiment of the present invention.

When a button 7602 on the window 7600 is pressed, a window 7700 shown in FIG. 71 is displayed. The photosite 105 displays an image with a reduced image size. In addition, the images in the album are separated from each other to be displayed one by one in accordance with selection of a next image or previous image. When a button 7701 is pressed, detailed information such as an image name and comment is displayed. The contents of this display are the same as those displayed with respect to each image shown in FIG. 35. In addition, the displayed images in the album can be updated one by one by pressing buttons 7702 and 7703.

Other Embodiment

The above embodiment has exemplified the case wherein the user browses images from the PC or portable terminal. However, the present invention is not limited to this, and the user may access the information providing system from any kind of terminal, such as a fixed telephone, which can perform data communication.

In addition, the above embodiment has exemplified the method of converting numerical values into an alphabetical character string. Obviously, however, numerical values can be converted into hiragana character string by using a table in which buttons and the types of hiragana characters assigned to the buttons are stored. In a general telephone (especially a cell phone), five characters, e.g., "あ" to "お", are assigned to buttons 1 to 7 and 9 (i.e., AL in FIG. 63 is 5), and three characters "わ", "を", and "ん" or "や", "ゆ", and "よ" are assigned to buttons 0 and 8 (ie., AL in FIG. 63 is 3).

In the above embodiment, according to the description of step S2012 in FIG. 19, a user ID is compulsorily given as a login name to the user. In this case, however, a user ID may be converted into a character string by the processing in steps S6502 to S6507 in FIG. 64, and the character string may be given as a login name to the user.

In addition, as the order number written on the window 5700 shown in FIG. 56 and in the order contents shown in FIG. 59, a character string that can be easily input by a cell phone may be provided. In this case, the state of a print order is presented upon confirming that the character string is input in the input area 1907 on the window 1900 shown in FIG. 18.

By performing such character string conversion in this manner, user-friendlier services can be provided for the user who uses a terminal with a smaller number of keys, e.g., a cell phone or fixed telephone. The object of the present invention is achieved even by supplying a storage medium (or recording medium) which stores software program for implementing the functions of the above-described embodiments to a system or apparatus and causing the computer (or a CPU or MPU) of the system or apparatus to read out and execute the program codes stored in the storage medium. In this case, the program codes read out from the storage medium implements the functions of the above-described embodiments by themselves, and the storage medium which stores the program codes constitutes the present invention. The functions of the above embodiments are realized not only when the readout program codes are executed by the computer but also when the OS (Operating System) or the like running on the computer performs part or all of actual processing on the basis of the instructions of the program codes.

The functions of the above embodiments are also realized when the program codes read out from the storage medium are written in the memory of a function expansion board inserted into the computer or a function expansion unit connected to the computer, and the CPU of the function expansion board or function expansion unit or the like performs part or all of actual processing on the basis of the instructions of the program codes.

When the present invention is applied to the above storage medium, the storage medium stores program codes corresponding to the flow charts described above (shown in FIG. 65 and/or FIG. 66).

As has been described above, according to the above embodiments, an information providing system which can easily update prices corresponding to data processing, an information providing apparatus, an information providing method, a control program, and a storage medium can be provided.

As many apparently widely different embodiments of the present invention can be made without departing from the spirit and scope thereof, it is to be understood that the invention is not limited to the specific embodiments thereof except as defined in the appended claims.

What is claimed is:

1. An information providing apparatus comprising:
   a creation unit configured to create ID data;
   a storage unit configured to store a number and characters assigned to each key of a plurality of keys of a communication apparatus; and
   a conversion unit configured to convert the ID data to a character string, on the basis of the number and characters assigned to each key which are stored in said storage unit, such that two consecutive characters in the character string are respectively assigned to different keys of the plurality of keys,
   wherein said conversion unit comprises a selection unit configured to extract characters constituting the character string one by one and, in a case where a currently selected character is assigned to a key to which an immediately preceding selected character is assigned, to change the currently selected character into a different character assigned to another key, and
   wherein said selection unit comprises:
   a dividing unit adapted to divide the number of characters of the ID data by (X-Y) obtained by subtracting the number Y of characters assigned to a preceding key to which the immediately preceding selected character is assigned, from the total number X of characters assigned to the plurality of keys; and
   a derivation unit adapted to derive a character of an order corresponding to a remainder calculated by said dividing unit from a plurality of characters obtained by removing characters assigned to the preceding key from all characters assigned to the plurality of keys.

2. An information processing method comprising the steps of:
   creating ID) data;
   storing a number and characters assigned to each key of a plurality of keys of a communication apparatus in a storage unit; and
   converting the ID data to a character string, on the basis of the number and characters assigned to each key which are stored in said storage unit, such that two consecutive characters in the character string are respectively assigned to different keys of the plurality of keys,
   wherein said converting step comprises the steps of;
   extracting characters constituting the character string one by one and, in a case where a currently selected character is assigned to a key to which an immediately preceding selected character is assigned, changing the currently selected character into a different character assigned to another key;
   dividing the number of characters of the ID data by (X-Y) obtained by subtracting the number Y of characters assigned to a preceding key to which the immediately preceding selected character is assigned, from the total number X of characters assigned to the plurality of keys; and
   deriving a character of an order corresponding to a remainder calculated in said dividing step from a plurality of characters obtained by removing characters assigned to the preceding key from all characters assigned to the plurality of keys.

3. A computer-executable program stored on a computer-readable medium, the program causing a computer to perform the steps of:
   creating ID data;
   storing a number and characters assigned to each key of a plurality of keys of a communication apparatus in a storage unit; and
   converting the ID data to a character string, on the basis of the number and characters assigned to each key which are stored in said storage unit such that two consecutive characters in the character string are respectively assigned to different keys of the plurality of keys,
   wherein said convening step comprises the steps of;
   extracting characters constituting the character string one by one and, in a case where a currently selected character is assigned to a key to which an immediately preceding selected character is assigned, changing the currently selected character into a different character assigned to another key;
   dividing the number of characters of the ID data by (X-Y) obtained by subtracting the number Y of characters assigned to a preceding key to which the immediately preceding selected character is assigned, from the total number X of characters assigned to the plurality of keys; and
   deriving a character of an order corresponding to a remainder calculated in said dividing step from a plurality of characters obtained by removing characters assigned to the preceding key from all characters assigned to the plurality of keys.

* * * * *

UNITED STATES PATENT AND TRADEMARK OFFICE
CERTIFICATE OF CORRECTION

PATENT NO. : 7,068,190 B2
APPLICATION NO. : 10/254570
DATED : June 27, 2006
INVENTOR(S) : Hiroshi Satomi et al.

It is certified that error appears in the above-identified patent and that said Letters Patent is hereby corrected as shown below:

DRAWINGS:
Sheet 2, figure 2, "Phote" should read -- Photo --;
Sheet 13, figure 13, "PRINTSIT ID" should read -- PRINTSITE ID --; and
Sheet 53, figure 53, "</estimeteitem>" should read -- </estimateitem> --.

COLUMN 1:
Line 52, "presses" should read -- press --.

COLUMN 6:
Line 20, "invention;" should read -- invention; and --; and
Line 23, "phone;" should read -- phone. --.

COLUMN 12:
Line 18, "receives" should read -- receive --; and
Line 24, "use" should read -- user --.

COLUMN 15:
Line 60, "view" should read -- view showing --.

COLUMN 16:
Line 25, "has" should read -- has been --; and
Line 46, "coping" should read -- copying --.

COLUMN 17:
Line 6, "a" should be deleted.

COLUMN 18:
Line 1, "It" should read -- If --.

COLUMN 19:
Line 6, "limited" should read -- limited to --.

COLUMN 20:
Line 42, "21112," should read -- 2112, --; and
Line 47, "album" should read -- albums --.

COLUMN 21:
Line 48, "corresponds" should read -- corresponds to --.

UNITED STATES PATENT AND TRADEMARK OFFICE
CERTIFICATE OF CORRECTION

PATENT NO. : 7,068,190 B2
APPLICATION NO. : 10/254570
DATED : June 27, 2006
INVENTOR(S) : Hiroshi Satomi et al.

It is certified that error appears in the above-identified patent and that said Letters Patent is hereby corrected as shown below:

COLUMN 24:
Line 57, "no" should read -- not --.

COLUMN 27:
Line 35, "results" should read -- result --.

COLUMN 29:
Line 27, "<Estimeteitem>" should read -- <Estimateitem> --;
Line 28, "shown in FIG. 53" (second occurrence) should be deleted;
Line 34, "<estimeteitem>" should read -- <estimateitem> --; and
Line 34, "</estimeteitem>" should read -- </estimateitem> --.

COLUMN 39:
Line 54, "ID)" should read -- ID --.

COLUMN 40:
Line 34, "unit" should read -- unit, --.

Signed and Sealed this

Twenty-sixth Day of June, 2007

JON W. DUDAS
*Director of the United States Patent and Trademark Office*